US011848745B2

(12) United States Patent
Kim et al.

(10) Patent No.: US 11,848,745 B2
(45) Date of Patent: Dec. 19, 2023

(54) METHOD AND APPARATUS FOR ACCESSING BASE STATION IN SATELLITE COMMUNICATION SYSTEM

(71) Applicant: Samsung Electronics Co., Ltd., Suwon-si (KR)

(72) Inventors: Youngbum Kim, Suwon-si (KR); Jeongho Yeo, Suwon-si (KR); Hyunseok Ryu, Suwon-si (KR); Sungjin Park, Suwon-si (KR); Cheolkyu Shin, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/734,666

(22) Filed: May 2, 2022

(65) Prior Publication Data
US 2022/0368414 A1 Nov. 17, 2022

(30) Foreign Application Priority Data

Apr. 30, 2021 (KR) ......................... 10-2021-0056771

(51) Int. Cl.
*H04B 7/185* (2006.01)
*H04W 36/00* (2009.01)

(52) U.S. Cl.
CPC .... *H04B 7/18541* (2013.01); *H04W 36/0016* (2013.01); *H04W 36/0061* (2013.01)

(58) Field of Classification Search
CPC ..... H04W 84/06; H04W 36/24; H04W 36/30; H04W 36/00; H04W 36/32; H04W 36/00837; H04W 36/0016; H04W 48/20; H04W 88/06; H04W 36/0061; H04B 7/18541

See application file for complete search history.

(56) References Cited

U.S. PATENT DOCUMENTS

| 2012/0008595 | A1 | 1/2012 | Wang |
| 2017/0041830 | A1* | 2/2017 | Davis ................... H04B 7/1851 |
| 2017/0105153 | A1* | 4/2017 | Ashrafi ......... H04W 36/008375 |
| 2018/0241464 | A1 | 8/2018 | Michaels |
| 2019/0044611 | A1* | 2/2019 | Treesh .................. H04W 36/24 |
| 2019/0082481 | A1 | 3/2019 | Ravishankar et al. |

(Continued)

FOREIGN PATENT DOCUMENTS

| WO | WO-2007047370 A2 * | 4/2007 | ......... H04B 7/18563 |
| WO | 2017/123292 A2 | 7/2017 | |
| WO | WO-2022205395 A1 * | 10/2022 | |

OTHER PUBLICATIONS

International Search Report dated Aug. 1, 2022, issued in International Patent Application No. PCT/KR2022/006279.

*Primary Examiner* — Dung Hong
(74) *Attorney, Agent, or Firm* — Jefferson IP Law, LLP

(57) ABSTRACT

A method for a user equipment (UE) to perform handover in a wireless communication system is provided. The method includes receiving, from a base station (BS), a first message indicating at least one condition for starting handover, wherein the at least one condition includes a condition based on a distance between the UE and a satellite used for current access; identifying whether the condition is satisfied based on a distance between the UE and the satellite used for current access; and performing a procedure for handover based on the condition being satisfied.

19 Claims, 43 Drawing Sheets

(56) References Cited

U.S. PATENT DOCUMENTS

| | | | |
|---|---|---|---|
| 2020/0178137 A1* | 6/2020 | Hassan Hussein | ........................... H04W 36/00835 |
| 2020/0314914 A1 | 10/2020 | Roy et al. | |
| 2022/0377625 A1* | 11/2022 | Li | ..................... H04W 36/0058 |
| 2023/0116324 A1* | 4/2023 | Eklöf | ................... H04W 24/10 370/331 |

* cited by examiner

| Orbit type | Height | Period |
|---|---|---|
| LEO | 500~1000 km | 90~120min |
| MEO | 5000~15000 km | Approx 6 hours |
| GEO | Approx 36,000 km | Approx 24 hours |

◎ Link budget between UE and satellite

· Path loss: (1600)

$FSPL(d, f_c) = 32.45 + 20 \log_{10}(f_c) + 20 \log_{10}(d)$

· RX antenna gain for UL: 24 dBi (LEO), 45.4 dBi (GEO)

◎ Link budget between UE and terrestrial gNB

· Path loss (LOS): (1610)

$PL_2 = 28.0 + 40 \log_{10}(d_{3D}) + 20 \log_{10}(f_c) - 9 \log_{10}((d_{BP}')^2 + (h_{BS} - h_{UT})^2)$ · Path loss (NLOS): (1620)

$PL'_{UMa-NLOS} = 13.54 + 39.08 \log_{10}(d_{3D}) + 20 \log_{10}(f_c) - 0.6(h_{UT} - 1.5)$ · RX antenna gain for UL: ~12 dBi ◇ Doppler shift within a beam footprint Ground station / DU

METHOD AND APPARATUS FOR ACCESSING BASE STATION IN SATELLITE COMMUNICATION SYSTEM

CROSS-REFERENCE TO RELATED APPLICATION(S)

This application is based on and claims priority under 35 U.S.C. § 119(a) of a Korean patent application number 10-2021-0056771, filed on Apr. 30, 2021, in the Korean Intellectual Property Office, the disclosure of which is incorporated by reference herein in its entirety.

BACKGROUND

1. Field

The disclosure relates to a communication system. More particularly, the disclosure relates to a method, performed by a terminal, of selecting and accessing a base station when the terminal transmits and receives signals to and from the base station via a satellite, and a handover method.

2. Description of Related Art

Due to the progress of wireless communication from generation to generation, technologies for human-targeted services, such as voice, multimedia, and data, have been developed. Connected devices, which are on an explosive increase after the commercialization of $5^{th}$ generation (5G) communication systems, are expected to connect to communication networks. Examples of things connected to the network may include vehicles, robots, drones, home appliances, displays, smart sensors installed in various infrastructures, construction machines, and factory equipment. Mobile devices are expected to evolve into various form factors, such as augmented reality glasses, virtual reality headsets, and hologram devices. In the $6^{th}$ generation (6G) era, efforts are being made to develop improved 6G communication systems in order to provide various services by connecting hundreds of billions of devices and things. For these reasons, 6G communication systems are called Beyond 5G systems.

In a 6G communication system that is predicted to be realized around 2030, a maximum data rate is tera (that is, 1,000 giga) bps, and a radio latency is 100 microseconds (μsec). That is, compared with a 5G communication system, a data rate in a 6G communication system is 50 times faster, and a radio latency in a 6G communication system is reduced to 1/10.

To achieve a high data rate and ultra low latency, the implementation of 6G communication systems in a terahertz band (e.g., a band of 95 GHz to 3 THz) is under consideration. In the terahertz band, path loss and atmospheric absorption are serious, compared with a millimeter wave (mmWave) band. Therefore, it is expected that the importance of technology capable of ensuring signal propagation distances (i.e., coverage) will increase. As the main technologies for ensuring the coverage, radio frequency (RF) elements, antennas, new waveforms that are better in terms of coverage than orthogonal frequency division multiplexing (OFDM), beamforming, and multiple antenna transmission technologies, such as multiple-input and multiple-output (MIMO), full dimensional MIMO (FD-MIMO), array antenna, and large scale antenna need to be developed. In addition, to improve the coverage of terahertz band signals, new technologies, such as metamaterial-based lenses and antennas, high-dimensional spatial multiplexing technology using orbital angular momentum (OAM), and reconfigurable intelligent surface (RIS), are being discussed.

Also, to improve frequency efficiency and system network, a full duplex technology in which an uplink and a downlink simultaneously use the same frequency resource at the same time, a network technology that integrates satellite and high-altitude platform stations (HAPS), etc., a network structure innovation technology that supports mobile base stations, etc. and enables network operation optimization, automation, etc., a dynamic spectrum sharing technology for collision avoidance based on spectrum usage prediction, an artificial intelligence (AI)-based communication technology that utilizes AI from a design stage and internalizes an end-to-end AI support function to realize system optimization, and a next-generation distributed computing technology that realizes services of complexity exceeding the limits of terminal computational capability by using ultra-high-performance communication and computing resources (mobile edge computing (MEC), cloud, etc.) are being developed in a 6G communication system. In addition, attempts to further strengthen connectivity between devices, further optimize networks, accelerate softwareization of network entities, and increase the openness of wireless communications are continuously made through the design of new protocols to be used in 6G communication systems, the implementation of hardware-based security environments, the development of mechanisms for the safe use of data, and the development of technologies on how to maintain privacy.

Due to the research and development of such 6G communication systems, it is expected that the next hyper-connected experience will become possible through the hyper-connectivity of the 6G communication system that includes not only the connection between things but also the connection between people and things. Specifically, it is expected that services, such as true immersive extended reality (XR), high-fidelity mobile hologram, and digital replica, will be provided through 6G communication systems. Also, because services such as remote surgery, industrial automation, and emergency response through security and reliability enhancement are provided through 6G communication systems, these services will be applied in various fields, such as industry, medical care, automobiles, and home appliances.

On the other hand, as the costs of launching satellites were drastically reduced in the late 2010s and 2020s, more companies are attempting to provide communication services via satellites. Accordingly, satellite networks have emerged as next-generation network systems that complement the existing terrestrial networks. Although satellite networks may not provide a user experience comparable to that of terrestrial networks, the satellite networks have an advantage of being able to provide communication services even in areas or disaster situations where it is difficult to establish terrestrial networks. As described above, the economic feasibility has also been secured due to a sharp reduction in the costs of launching satellites in recent years. In addition, some companies and $3^{rd}$ Generation Partnership Project (3GPP) standards are conducting research into direct communication between smartphones and satellites.

The above information is presented as background information only to assist with an understanding of the disclosure. No determination has been made, and no assertion is made, as to whether any of the above might be applicable as prior art with regard to the disclosure.

SUMMARY

In a satellite network, when a terminal attempts to connect to a base station via a satellite, the terminal may communicate with the base station through an initial access procedure via the satellite. The terminal may attempt to simultaneously receive downlink signals each including a synchronization signal from several satellites. The terminal may select one or more satellites and access the base station. Also, the satellite to be used for access may be changed due to the movement of the terminal or the movement of the satellite in a state of being connected to the base station. This may cause a handover procedure for changing the base station or the satellite used for access.

Aspects of the disclosure are to address at least the above-mentioned problems and/or disadvantages and to provide at least the advantages described below. Accordingly, an aspect of the disclosure is to provide a method and apparatus for the terminal to select a satellite to be used for access. The terminal may select the satellite based on the distance and time, and may access the base station through the selected satellite.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
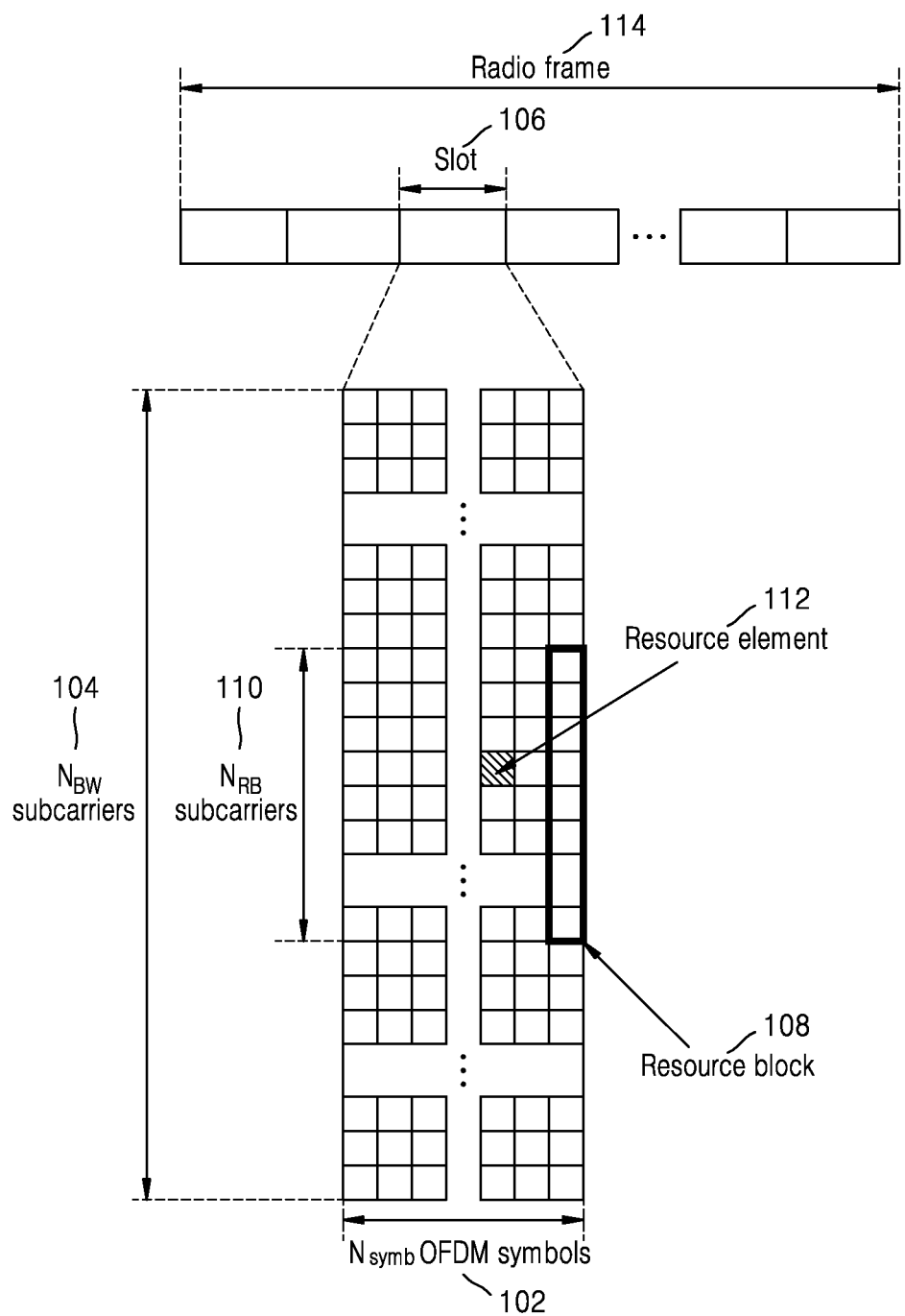
FIG. 1 is a diagram illustrating a basic structure of a time-frequency domain that is a radio resource domain in which data or a control channel is transmitted in a downlink or an uplink in a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A new radio access technology (NR) that is new $5^{th}$ generation (5G) communication is being designed so that various services are freely multiplexed on time and frequency resources. Accordingly, waveform/numerology and a reference signal may be allocated dynamically or freely according to the needs of the corresponding services. In order to provide an optimal service to a terminal in wireless communication, it is important to optimize data transmission through measurement of channel quality and interference, and accordingly, accurate channel status measurement is essential. In 4G communication, channel and interference characteristics do not change greatly depending on frequency resources. However, in 5G channels, channel and interference characteristics change greatly depending on the service. Therefore, it is necessary to support a frequency resource group (FRG)-level subset so as to measure channel and interference characteristics separately. On the other hand, in an NR system, the types of supported services may be divided into categories such as enhanced mobile broadband (eMBB), massive machine type communications (mMTC), and ultra-reliable and low-latency communications (URLLC). eMBB may be a service that aims for high-speed transmission of high-capacity data, mMTC may be a service that aims for minimization of terminal power and access of multiple terminals, and URLLC may be a service that aims for high reliability and low latency. Different requirements may be applied according to the type of service applied to the terminal.

Accordingly, in order to provide a plurality of services to a user in a communication system, there is a need for a method capable of providing each service within the same time interval according to characteristics of the corresponding service, and an apparatus using the same.

Hereinafter, embodiments of the disclosure will be described in detail with reference to the accompanying drawings.

In describing the embodiments of the disclosure, descriptions of technical contents that are well known in the technical field to which the disclosure pertains and are not directly related to the disclosure will be omitted. By omitting unnecessary description, the disclosure may be described more clearly without obscuring the gist of the disclosure.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, or a multimedia system capable of performing a communication function.

In the disclosure, a controller may be referred to as a processor.

In the disclosure, a layer (layer apparatus) may be referred to as an entity.

Advantages and features of the disclosure, and methods of achieving them will be clarified with reference to embodiments of the disclosure described below in detail with reference to the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the embodiments of the disclosure to those of ordinary skill in the art. The disclosure is only defined by the scope of the claims. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term " . . . er/or" as used herein refers to a software element or a hardware element such as field programmable gate array (FPGA) or application specific integrated circuit (ASIC), and the " . . . er/or" performs certain functions. However, the term " . . . er/or" is not limited to software or hardware. The term " . . . er/or" may be configured in an addressable storage medium or may be configured to reproduce one or more processors. Therefore, for example, the term " . . . er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the " . . . ers/ors" may be combined with fewer elements and " . . . ers/ors," or may be separated from additional elements and " . . . ers/ors." Furthermore, the elements and the " . . . ers/ors" may be implemented to reproduce one or more central processing units (CPUs) in the device or secure multimedia card. Also, in embodiments of the disclosure, the " . . . er/or" may include one or more processors.

A wireless communication system has evolved from a system providing voice-oriented services to a broadband wireless communication system providing high-speed high-quality packet data services of communication standards, such as high speed packet access (HSPA) of $3^{rd}$ generation partnership project (3GPP), long term evolution (LTE) or evolved universal terrestrial radio access (E-UTRA), LTE-advanced (LTE-A), high rate packet data (HRPD) of 3GPP2, ultra mobile broadband (UMB), and Institute of Electrical and Electronics Engineers (IEEE) 802.16e. In addition, 5G or NR communication standards for 5G wireless communication systems are being established.

In an NR system that is a representative example of the broadband wireless communication system; an orthogonal frequency division multiplexing (OFDM) scheme is employed in a downlink and an uplink. More specifically, a cyclic-prefix OFDM (CP-OFDM) scheme is employed in a downlink, and a discrete Fourier transform spreading OFDM (DFT-S-OFDM) scheme is employed in an uplink along with CP-OFDM. The uplink refers to a radio link through which a terminal (UE or MS) transmits data or a control signal to a base station (gNode B or BS), and the downlink refers to a radio link through which a base station transmits data or a control signal to a terminal. In the multiple access scheme as described above, data or control information of each user may be identified by performing allocation and operation so that time-frequency resources for carrying data or control information for each user do not overlap each other, that is, orthogonality is established.

The NR system employs a hybrid automatic repeat request (HARQ) scheme for retransmitting the corresponding data in a physical layer when a decoding failure occurs in initial transmission. In the HARQ scheme, when a receiver fails to decode data correctly, the receiver transmits information (negative acknowledgment (NACK)) indicating a decoding failure to a transmitter, so that the transmitter retransmits the corresponding data in a physical layer. The receiver combines the data retransmitted by the transmitter with the previously decoding-failed data to improve data reception performance. Also, when the receiver decodes data correctly, the receiver transmits information (acknowledgment (ACK)) indicating a decoding success to the transmitter, so that the transmitter transmits new data.

FIG. 1 is a diagram illustrating a basic structure of a time-frequency domain that is a radio resource domain in which data or a control channel is transmitted in a downlink or an uplink in an NR system according to an embodiment of the disclosure.

Figure 2:
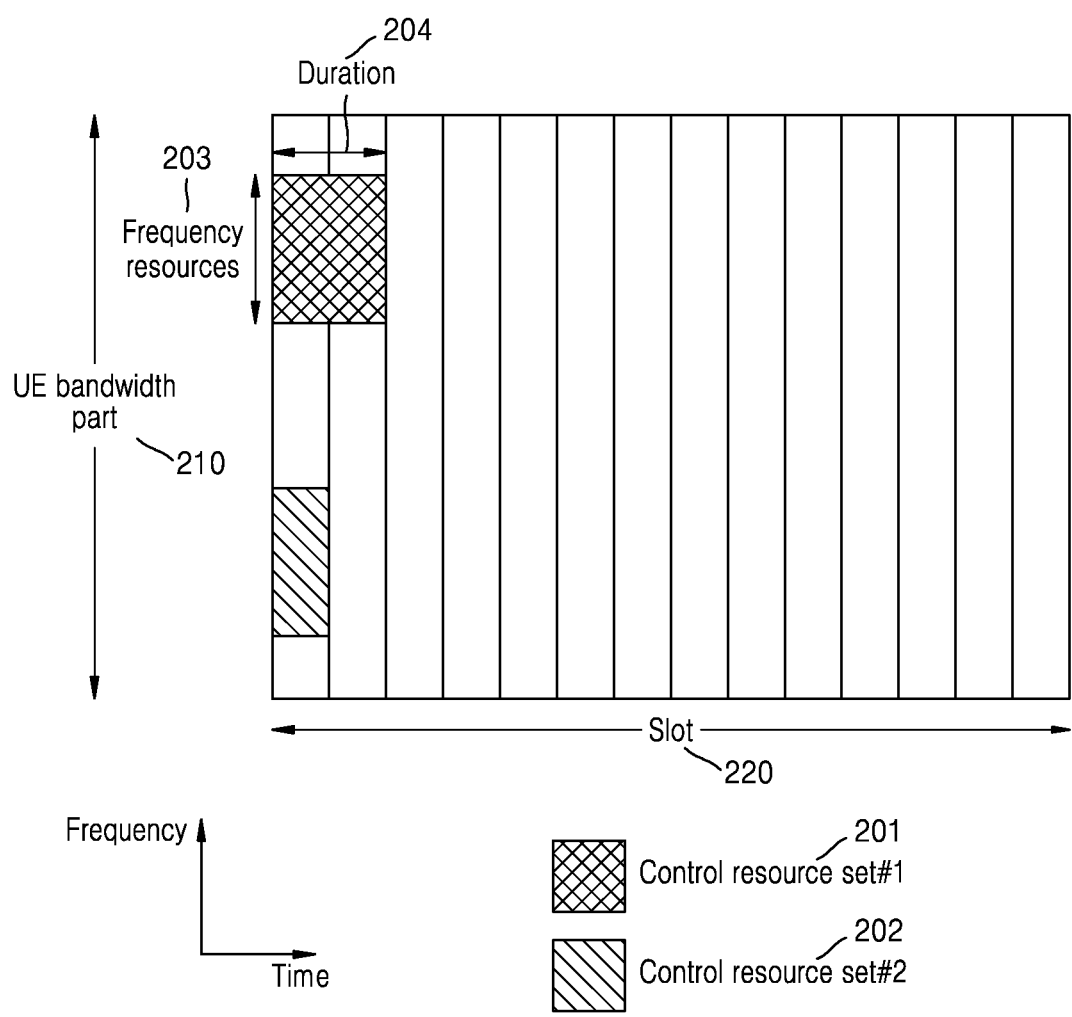
FIG. 2 is a diagram illustrating an example of a control resource set in which a downlink control channel is transmitted in a 5$^{th}$ generation (5G) wireless communication system according to an embodiment of the disclosure.

Referring to FIG. 1, the horizontal axis represents a time domain, and the vertical axis represents a frequency domain. A minimum transmission unit in the time domain is an OFDM symbol, and $N_{symb}$ OFDM symbols 102 are gathered to configure one slot 106. A length of a subframe is defined as 1.0 ms, and a radio frame 114 is defined as 10 ms. A minimum transmission unit in the frequency domain is a subcarrier, and an entire system transmission bandwidth includes $N_{BW}$ subcarriers 104. One frame may be defined as 10 ms. One subframe may be defined as 1 ms. Accordingly, one frame may include 10 subframes. One slot may be defined as 14 OFDM symbols (that is, the number ($N_{symb}^{slot}$) of symbols per slot=14). One subframe may include one or more slots. The number of slots per subframe may be changed according to a subcarrier spacing setting value μ. An example of FIG. 2 illustrates the case of μ=0 and the case of μ=1 as a subcarrier spacing setting value. When μ=0, one subframe may include one slot, and when μ=1, one subframe may include two slots. That is, the number ($N_{slot}^{subframe,\mu}$) of slots per subframe may be changed according to the subcarrier spacing setting value μ. Accordingly, the number ($N_{slot}^{frame,\mu}$) of slots per frame may be changed. $N_{slot}^{subframe,\mu}$ and $N_{slot}^{frame,\mu}$ according to each subcarrier spacing setting value μ may be defined as shown in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |

TABLE 1-continued

| μ | $N_{symb}^{slot}$ | $N_{slot}^{frame, \mu}$ | $N_{slot}^{subframe, \mu}$ |
|---|---|---|---|
| 3 | 14 | 80 | 8 |
| 4 | 14 | 160 | 16 |

The UE before radio resource control (RRC) connection may be configured with an initial bandwidth part (BWP) for initial access from the base station through a master information block (MIB). More specifically, the UE may receive configuration information about a search space and a control resource set (CORESET) in which a physical downlink control channel (PDCCH) for receiving system information (which may correspond to remaining system information (RMSI) or system information block 1 (SIB1)) required for initial access is transmittable through an MIB in an initial access stage. The control resource set and the search space set by the MIB may each be regarded as identity (ID) 0. The base station may notify the UE of configuration information, such as frequency allocation information, time allocation information, and numerology for control resource set #0, through the MIB. Also, the base station may notify the UE of configuration information about a monitoring period and occasion for control resource set #0, that is, configuration information about search space #0, through the MIB. The UE may regard the frequency domain set as control resource set #0 obtained from the MIB as the initial BWP for initial access. In this case, the ID of the initial BWP may be regarded as 0.

The MIB may include the following information. However, the disclosure is not limited to the following examples.

TABLE 2

```
MIB
-- ASN1START
-- TAG-MIB-START
MIB ::=                      SEQUENCE {
    systemFrameNumber            BIT STRING (SIZE (6)),
    subCarrierSpacingCommon      ENUMERATED {scs15or60,
                                             scs30or120},
    ssb-SubcarrierOffset         INTEGER (0..15),
    dmrs-TypeA-Position          ENUMERATED {pos2, pos3},
    pdcch-ConfigSIB1             PDCCH-ConfigSIB1,
    cellBarred                   ENUMERATED {barred, notBarred},
    intraFreqReselection         ENUMERATED {allowed,
                                             notAllowed},
    spare                        BIT STRING (SIZE (1))
}
-- TAG-MIB-STOP
-- ASN1STOP
```

TABLE 3

MIB field descriptions cellBarred
Value barred means that the cell is barred, as defined in TS 38.304 [20].
dmrs-TypeA-Position
Position of (first) DM-RS for downlink (see TS 38.211 [16], clause 7.4.1.1.2) and uplink (see TS 38.211 [16], clause 6.4.1.1.3).
intraFreqReselection
Controls cell selection/reselection to intra-frequency cells when the highest ranked cell is barred, or treated as barred by the UE, as specified in TS 38.304 [20].
pdcch-ConfigSIB1
Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13).

TABLE 3-continued

MIB field descriptions ssb-SubcarrierOffset
Corresponds to kSSB (see TS 38.213 [13]), which is the frequency domain offset
between SSB and the overall resource block grid in number of subcarriers. (See TS
38.211 [16], clause 7.4.3.1).
The value range of this field may be extended by an additional most significant bit
encoded within PBCH as specified in TS 38.213 [13].
This field may indicate that this cell does not provide SIB1 and that there is hence no
CORESET#0 configured in MIB (see TS 38.213 [13], clause 13). In this case, the
field pdcch-ConfigSIB1 may indicate the frequency positions where the UE may
(not) find a SS/PBCH with a control resource set and search space for SIB1 (see TS
38.213 [13], clause 13).
subCarrierSpacingCommon
Subcarrier spacing for SIB1, Msg.2/4 for initial access, paging and broadcast SI-
messages. If the UE acquires this MIB on an FR1 carrier frequency, the value
scs15or60 corresponds to 15 kHz and the value scs30or120 corresponds to 30 kHz. If
the UE acquires this MIB on an FR2 carrier frequency, the value scs15or60
corresponds to 60 kHz and the value scs30or120 corresponds to 120 kHz.
systemFrameNumber
The 6 most significant bits (MSB) of the 10-bit System Frame Number (SFN). The 4
LSB of the SFN are conveyed in the PBCH transport block as part of channel coding
(i.e. outside the MIB encoding), as defined in clause 7.1 in TS 38.212 [17].

In the method of configuring the BWP, the UEs before RRC connection may receive the configuration information for the initial BWP through the MIB in the initial access stage. More specifically, the UE may be configured with a control resource set for a downlink control channel, on which downlink control information (DCI) for scheduling an SIB is transmittable, from a MIB of a physical broadcast channel (PBCH). At this time, the bandwidth of the control resource set configured with the MIB may be regarded as the initial BWP, and the UE may receive a physical downlink shared channel (PDSCH), on which the SIB is transmitted, through the configured initial BWP. The initial BWP may be utilized for other system information (OSI), paging, and random access in addition to the purpose of receiving the SIB. When one or more BWPs are configured for the UE, the base station may indicate the UE to change the BWP by using a BWP indicator field in DCI.

A basic unit of a resource in the time-frequency domain is a resource element (RE) 112, which may be represented by an OFDM symbol index and a subcarrier index. A resource block (RB) 108 (or a physical resource block (PRB)) is defined as $N_{RB}$ consecutive subcarriers 110 in the frequency domain. In general, a minimum transmission unit of data is an RB unit. In the NR system, $N_{symb}=14$, $N_{RB}=12$, and $N_{BW}$ is proportional to the system transmission bandwidth. A data rate may increase in proportion to the number of RBs scheduled for the UE.

In the NR system, in the case of a frequency division duplex (FDD) system operating while dividing a downlink and an uplink by a frequency, a downlink transmission bandwidth may be different from an uplink transmission bandwidth. A channel bandwidth represents a radio frequency (RF) bandwidth corresponding to the system transmission bandwidth. Table 4 and Table 5 show part of the corresponding relationship between a system transmission bandwidth, subcarrier spacing (SCS), and a channel bandwidth defined in the NR system in a frequency band lower than 6 GHz and a frequency band higher than 6 GHz, respectively. For example, the NR system having a channel bandwidth of 100 MHz at an SCS of 30 kHz has a transmission bandwidth of 273 RBs. N/A may be a bandwidth-subcarrier combination that is not supported by the NR system. Table 4 below shows the configuration of frequency range 1 (FR1), and Table 5 below shows the configuration of frequency range 2 (FR2).

TABLE 4

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 5

| Subcarrier spacing | Channel bandwidth BWChannel [MHz] | | | |
|---|---|---|---|---|
| | 50 MHz | 100 MHz | 200 MHz | 400 MHz |
| Transmission bandwidth configuration NRB 60 kHz | 66 | 132 | 264 | N/A |
| 120 kHz | 32 | 66 | 132 | 264 |

In the NR system, the frequency range may be divided into FR1 and FR2 and defined as shown in Table 6 below.

TABLE 6

| Frequency range designation | Corresponding frequency range |
|---|---|
| FR1 | 450 MHz-7125 MHz |
| FR2 | 24250 MHz-52600 MHz |

$FR_1$ and FR2 may be differently changed and applied. For example, FR1 may be changed and applied from 450 MHz to 6000 MHz. Next, a synchronization signal (SS)/PBCH block in 5G will be described.

The SS/PBCH block may refer to a physical layer channel block including a primary SS (PSS), a secondary SS (SSS), and a PBCH. Details thereof are as follows.

PSS: serves as a reference for downlink time/frequency synchronization and provides information about a part of a cell ID.

SSS: serves as a reference for downlink time/frequency synchronization, and provides information about a remaining cell ID not provided by the PSS. Additionally, SSS may serve as a reference signal for demodulation of the PBCH.

PBCH which provides essential system information necessary for transmitting and receiving a data channel and a control channel of the UE. The essential system information may include search space-related control information indicating radio resource mapping information of the control channel, scheduling control information about a separate data channel for transmitting system information, and the like.

SS/PBCH block which includes a combination of the PSS, the SSS, and the PBCH. One or more SS/PBCH blocks may be transmitted within 5 ms, and each transmitted SS/PBCH block may be identified by an index.

The UE may detect the PSS and the SSS in the initial access stage and may decode the PBCH. The UE may obtain the MIB from the PBCH, and may be configured with control resource set #0 (which may correspond to a control resource set having a control resource set index of 0) therefrom. The UE may perform monitoring on control resource set #0 on the assumption that a selected SS/PBCH block and a demodulation reference signal (DMRS) transmitted in control resource set #0 are in quasi co-location (QCL) relationship. The UE may receive system information as downlink control information transmitted in control resource set #0. The UE may obtain, from the received system information, configuration information related to random access channel (RACH) necessary for initial access. The UE may transmit a physical RACH (PRACH) to the base station considering the selected SS/PBCH block index, and the base station receiving the PRACH may obtain information about the SS/PBCH block index selected by the UE. Through these processes, the base station may know that the UE selects a certain block from among the SS/PBCH blocks and monitors control resource set #0 related thereto.

Next, DCI in the 5G system will be described in detail.

In the 5G system, scheduling information for uplink data (or physical uplink shared channel (PUSCH)) or downlink data (or PDSCH) is transmitted from the base station to the UE through the DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field. In addition, there are various DCI formats. The DCI formats may indicate DCI for power control, DCI for notifying a slot format indicator (SFI), etc.

The DCI may be transmitted over a PDCCH through a channel coding and modulation process. A cyclic redundancy check (CRC) is attached to a DCI message payload. The CRC is scrambled by a radio network temporary identifier (RNTI) corresponding to the identity of the UE. Different RNTIs may be used according to the purpose of the DCI message, for example, UE-specific data transmission, a power control command, or a random access response (RAR). That is, the RNTI is not explicitly transmitted, but is transmitted by being included in a CRC calculation process. When the DCI message transmitted over the PDCCH is received, the UE checks the CRC by using the assigned RNTI. When a result of checking the CRC is correct, the UE may know that the DCI message has been transmitted to the UE. The PDCCH is transmitted by being mapped in a control resource set (CORESET) configured for the UE.

For example, DCI that schedules a PDSCH for system information (SI) may be scrambled by an SI-RNTI. DCI that schedules a PDSCH for a RAR message may be scrambled by an RA-RNTI. DCI that schedules a PDSCH for a paging message may be scrambled by a P-RNTI. DCI that notifies an SFI may be scrambled by an SFI-RNTI. DCI that notifies transmit power control (TPC) may be scrambled by a TPC-RNTI. DCI that schedules a UE-specific PDSCH or PUSCH may be scrambled by a cell RNTI (C-RNTI).

DCI format 0_0 may be used as fallback DCI that schedules a PUSCH. In this case, a CRC may be scrambled by a C-RNTI. DCI format 0_0 in which the CRC is scrambled by the C-RNTI may include, for example, pieces of the following information. However, the disclosure is not limited to the following examples.

TABLE 7

- Identifier for DCI formats - [1] bit
- Frequency domain resource assignment - $[\lceil \log_2(N_{RB}^{UL,BWP}(N_{RB}^{UL,BWP} + 1)/2) \rceil]$ bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- UL/supplementary UL (SUL) indicator - 0 or 1 bit DCI format 0_1 may be used as non-fallback DCI that schedules a PUSCH. In this case, a CRC may be scrambled by a C-RNTI. DCI format 0_1 in which the CRC is scrambled by the C-RNTI may include, for example, pieces of the following information. However, the disclosure is not limited to the following examples.

TABLE 8

- Carrier indicator - 0 or 3 bits
- UL/SUL indicator - 0 or 1 bit
- Identifier for DCI formats - [1] bit
- Bandwidth part indicator - 0, 1 or 2 bits
- Frequency domain resource assignment
  - For resource allocation type 0, $\lceil N_{RB}^{UL,BWP} / P \rceil$ bits
  - For resource allocation type 1, $\lceil \log_2(N_{RB}^{UL,BWP}(N_{RB}^{UL,BWP} + 1)/2) \rceil$ bits TABLE 8-continued

- Time domain resource assignment -1, 2, 3, or 4 bits
- Virtual resource block-to-Physical resource block (VRB-to-PRB) mapping - 0 or 1 bit, only for resource allocation type 1
    - 0 bit if only resource allocation type 0 is configured;
    - 1 bit otherwise.
- Frequency hopping flag - 0 or 1 bit, only for resource allocation type 1.
    - 0 bit if only resource allocation type 0 is configured;
    - 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
    - 1 bit for semi-static HARQ-ACK codebook;
    - 2 bits for dynamic HARQ-ACK codebook with single HARQ-ACK codebook.
- 2nd downlink assignment index - 0 or 2 bits
    - 2 bits for dynamic HARQ-ACK codebook with two HARQ-ACK sub-codebooks;
    - 0 bit otherwise.
- TPC command for scheduled PUSCH - 2 bits

- SRS resource indicator $-\left\lceil \log_2\left(\sum_{k=1}^{L_{max}} \binom{N_{SRS}}{k}\right)\right\rceil$ or $\lceil \log_2(N_{SRS})\rceil$ bits

- $\left\lceil \log_2\left(\sum_{k=1}^{L_{max}} \binom{N_{SRS}}{k}\right)\right\rceil$ bits for non-codebook based PUSCH transmission;

- $\lceil \log_2(N_{SRS})\rceil$ bits for codebook based PUSCH transmission.
- Precoding information and number of layers - up to 6 bits
- Antenna ports - up to 5 bits
- SRS request - 2 bits
- CSI request - 0, 1, 2, 3, 4, 5, or 6 bits
- Code block group (CBG) transmission information - 0, 2, 4, 6, or 8 bits
- Phase tracking reference signal (PTRS)-demodulation reference signal (DMRS) association - 0 or 2 bits
- beta_offset indicator - 0 or 2 bits
- DMRS sequence initialization - 0 or 1 bit DCI format 1_0 may be used as fallback DCI that schedules a PDSCH. In this case, a CRC may be scrambled by a C-RNTI. DCI format 1_0 in which the CRC is scrambled by the C-RNTI may include, for example, pieces of the following information. However, the disclosure is not limited to the following examples.

TABLE 9

- Identifier for DCI formats - [1] bit
- Frequency domain resource assignment -$\lceil \log_2(N_{RB}^{DL,BWP}(N_{RB}^{DL,BWP} + 1)/2)\rceil$ bits
- Time domain resource assignment - X bits
- VRB-to-PRB mapping - 1 bit.
- Modulation and coding scheme - 5 bits TABLE 9-continued

- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing indicator - [3] bits DCI format 1_1 may be used as non-fallback DCI that schedules a PDSCH. In this case, a CRC may be scrambled by a C-RNTI. DCI format 1_1 in which the CRC is scrambled by the C-RNTI may include, for example, pieces of the following information. However, the disclosure is not limited to the following examples.

TABLE 10

- Carrier indicator - 0 or 3 bits
- Identifier for DCI formats - [1] bits
- Bandwidth part indicator - 0, 1 or 2 bits
- Frequency domain resource assignment
    - For resource allocation type 0, $\lceil N_{RB}^{DL,BWP}/P\rceil$ bits
    - For resource allocation type 1, $\lceil \log_2(N_{RB}^{DL,BWP}(N_{RB}^{DL,BWP} + 1)/2)\rceil$ bits
- Time domain resource assignment -1, 2, 3, or 4 bits
- VRB-to-PRB mapping - 0 or 1 bit, only for resource allocation type 1.
    - 0 bit if only resource allocation type 0 is configured;
    - 1 bit otherwise.
- PRB bundling size indicator - 0 or 1 bit
- Rate matching indicator - 0, 1, or 2 bits
- Zero power (ZP) channel state information (CSI)-reference signal (RS) trigger - 0, 1, or 2 bits
For transport block 1:
- Modulation and coding scheme - 5 bits
- New data indicator - 1 bit
- Redundancy version - 2 bits TABLE 10-continued For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit Hereinafter, a method of allocating time domain resources for a data channel in a 5G communication system will be described.

The base station may set, in the UE, a table for time domain resource allocation information for a PDSCH and a PUSCH through higher layer signaling (e.g., RRC signaling). For example, the base station may set a table including a maximum of maxNrofDL-Allocations (=16) entries for the PDSCH, and may set a table including a maximum of maxNrofUL-Allocations (=16) entries for the PUSCH. The time domain resource allocation information may include, for example, a PDCCH-to-PDSCH slot timing (corresponds to a time interval in slot units between a time when the PDCCH is received and a time when the PDSCH scheduled by the received PDCCH is transmitted, denoted by K0) or a PDCCH-to-PUSCH slot timing (corresponds to a time interval in slot units between a time when the PDCCH is received and a time when the PUSCH scheduled by the received PDCCH is transmitted, denoted by K2), information about a position and a length of a start symbol on which the PDSCH or the PUSCH is scheduled in the slot, a PDSCH or PUSCH mapping type etc. For example, pieces of information as shown in Tables 11 and 12 below may be notified from the base station to the UE.

TABLE 11

PDSCH-TimeDomainResourceAllocationList information element
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::=   SEQUENCE {
   k0                         INTEGER(0..32)       OPTIONAL,  -- Need S
   (PDCCH-to-PDSCH timing, slot units)
   mappingType                ENUMERATED {typeA, typeB},
   (PDSCH mapping type)
   startSymbolAndLength       INTEGER (0..127)
   (Start symbol and length of PDSCH)
}

TABLE 12

PDSCH-TimeDomainResourceAllocationList information element
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::=   SEQUENCE {
   k0                         INTEGER(0..32)       OPTIONAL,  -- Need S
   (PDCCH-to-PDSCH timing, slot units)
   mappingType                ENUMERATED {typeA, typeB},
   (PDSCH mapping type)
   startSymbolAndLength       INTEGER (0..127)
   (Start symbol and length of PDSCH)
}

The base station may notify the UE of one of the entries in the table for time domain resource allocation information through L1 signaling (e.g., DCI) (for example, one of the entries may be indicated by a 'time domain resource allocation' field in DCI). The UE may obtain the time domain resource allocation information for the PDSCH or the PUSCH based on the DCI received from the base station. Hereinafter, a downlink control channel in a 5G communication system will be described in more detail with reference to the drawings.

FIG. 2 is a diagram illustrating an example of a control resource set in which a downlink control channel is transmitted in a 5G wireless communication system according to an embodiment of the disclosure.

FIG. 2 illustrates an example in which a UE BWP 210 is configured on a frequency domain, and two control resource sets (control resource set #1 201 and control resource set #2 202) are configured in one slot 220 on a time domain. The control resource sets 201 and 202 may be configured on a specific frequency resource 203 within the entire UE BWP 210 on the frequency domain. One or OFDM symbols may be configured on the time domain and may be defined as a control resource set duration 204. Referring to FIG. 2, the control resource set #1 201 is configured with a control resource set duration of two symbols, and the control resource set #2 202 is configured with a control resource set duration of one symbol.

The base station may configure the control resource set of the 5G for the UE through higher layer signaling (e.g., SI, MIB, or RRC signaling). Configuring the control resource set for the UE may mean providing information such as a control resource set identity, a frequency position of the control resource set, a symbol duration of the control resource set, and the like. For example, the higher layer signaling may include pieces of information shown in Table 13 below.

TABLE 13

```
ControlResourceSet ::=           SEQUENCE {
  -- Corresponds to L1 parameter 'CORESET-ID'
  controlResourceSetId           Control ResourceSetId,
(control resource set identity)
  frequencyDomainResources       BIT STRING (SIZE (45)),
(frequency domain resource assignment information)
  duration                       INTEGER
(1..maxCoReSetDuration),
(time domain resource assignment information)
  cce-REG-MappingType            CHOICE {
(CCE-to-REG mapping type)
    interleaved
    SEQUENCE {
      reg-BundleSize
      ENUMERATED {n2, n3, n6},
(REG bundle size)
      precoderGranularity
      ENUMERATED {sameAsREG-bundle, allContiguousRBs},
      interleaverSize
      ENUMERATED {n2, n3, n6}
      (REG bundle size)
      shiftIndex
      INTEGER(0..maxNrofPhysicalResourceBlocks-1)
        OPTIONAL
```

TABLE 13-continued

```
  (interleaver shift)
  },
  nonInterleaved                 NULL
  },
  tci-StatesPDCCH                SEQUENCE(SIZE (1..maxNrofTCI-
StatesPDCCH)) OF TCI-StateId    OPTIONAL,
(QCL configuration information)
  tci-PresentInDCI               ENUMERATED
{enabled}
        OPTIONAL, -- Need S
}
``` tci-StatesPDCCH (simply referred to as transmission configuration indication (TCI) state) configuration information in Table 13 may include information about one or more SS/PBCH block indexes or CSI-RS indexes in QCL relationship with DMRS transmitted in the corresponding control resource set.

For example, DCI format 1-1, which is scheduling control information (DL grant) for DL data, may include at least one piece of the following control information.

Carrier indicator: indicates on which carrier data scheduled by DCI is transmitted.—0 or 3 bits Identifier for DCI formats: indicates a DCI format, and specifically, is an indicator for identifying whether the corresponding DCI is for downlink or uplink.—[1] bits Bandwidth part indicator: indicate a change in the bandwidth part.—0, 1 or 2 bits Frequency domain resource assignment: is resource assignment information indicating frequency domain resource assignment. The expressed resource changes according to whether the resource allocation type is 0 or 1.

Time domain resource assignment: is resource assignment information indicating time domain resource assignment, and may indicate a configuration of higher layer signaling or a preset PDSCH time domain resource assignment list.—1, 2, 3, or 4 bits VRB-to-PRB mapping: indicates a mapping relationship between a VRB and a PRB.—0 or 1 bit PRB bundling size indicator: indicates the size of physical resource block bundling assumed to pass through the same precoding.—0 or 1 bit Rate matching indicator: indicates which rate match group is applied among the rate match groups that are configured through higher layer signaling and are applied to a PDSCH.—0, 1, or 2 bits ZP CSI-RS trigger: triggers a zero power channel state information reference signal.—0, 1, or 2 bits Transport block (TB) related configuration information: indicates a modulation and coding scheme (MCS), a new data indicator (NDI), and a redundancy version (RV) for one or two TBs.

MCS: indicates a modulation scheme and a coding rate used for data transmission. That is, the MCS may indicate a coding rate value capable of notifying of a transport block size (TBS) and channel coding information together with information relating to whether the modulation scheme is quadrature phase shift keying (QPSK), 16 quadrature amplitude modulation (16QAM), 64QAM, or 256QAM.

New data indicator: indicates whether transmission is HARQ initial transmission or retransmission.

Redundancy version: indicates a redundancy version of HARQ.

HARQ process number: indicates a process number of HARQ applied to a PDSCH.—4 bits Downlink assignment index: is an index for generating a dynamic HARQ-ACK codebook when reporting HARQ-ACK for a PDSCH.—0 or 2 or 4 bits TPC command for scheduled PUCCH: is power control information applied to a PUCCH for HARQ-ACK report for a PDSCH.—2 bits PUCCH resource indicator: is information indicating a resource of a PUCCH for HARQ-ACK report for a PDSCH.—3 bits PDSCH-to-HARQ_feedback timing indicator: is configuration information about which slot a PUCCH for HARQ-ACK report for a PDSCH is transmitted.—3 bits Antenna ports: are information indicating an antenna port of a PDSCH DMRS and a DMRS CDM group in which a PDSCH is not transmitted.—4, 5 or 6 bits Transmission configuration indication: is information indicating beam-related information of a PDSCH.—0 or 3 bits SRS request: is information requesting SRS transmission.—2 bits CBG transmission information: is information indicating to which CGB data corresponds is transmitted through a PDSCH when CBG-based retransmission is configured.—0, 2, 4, 6, or 8 bits CBG flushing out information: is information indicating whether the CBG previously received by the UE is usable for HARQ combining.—0 or 1 bit DMRS sequence initialization: indicates a DMRS sequence initialization parameter.—1 bit For data transmission over a PDSCH or a PUSCH, time domain resource assignment may be transmitted by information about the slot in which the PDSCH/PUSCH is transmitted, the start symbol position S in the corresponding slot, and the number L of symbols to which the PDSCH/PUSCH is mapped. S may be a relative position from the start of the slot, L may be the number of consecutive symbols, and S and L may be determined from a start and length indicator value (SLIV) defined as shown in Equation 1 below.

if $(L-1) \leq 7$ then $$SLIV = 14 \cdot (L-1) + S$$

else $$SLIV = 14 \cdot (14 - L + 1) + (14 - 1 - S)$$

where $0 < L \leq 14 - S$ \hfill Equation 1

The NR system may be configured with information about an SLIV value, a PDSCH/PUSCH mapping type, and a slot in which a PDSCH/PUSCH is transmitted in one row through RRC configuration (for example, the information may be configured in the form of a table). Thereafter, in the time domain resource assignment of the DCI, the base station may indicate an index value in the configured table to transmit, to the UE, the information about the SLIV value, the PDSCH/PUSCH mapping type, and the slot in which the PDSCH/PUSCH is transmitted.

In the NR system, the PDSCH mapping type is defined as type A and type B. In the PDSCH mapping type A, the first symbol among the DMRS symbols is located in the second or third OFDM symbol of the slot. In the PDSCH mapping type B, the first symbol among the DMRS symbols of the first OFDM symbol on the time domain resource allocated by PUSCH transmission is located.

Downlink data may be transmitted on the PDSCH, which is a physical channel for downlink data transmission. The PDSCH may be transmitted after a control channel transmission interval, and scheduling information such as a specific mapping position and a modulation scheme in the frequency domain is determined based on the DCI transmitted through the PDCCH.

The base station may notify the UE of the modulation scheme applied to the PDSCH to be transmitted and the size of data to be transmitted (hereinafter referred to as TBS) through the MCS among pieces of the control information constituting the DCI. In an embodiment of the disclosure, the MCS may include 5 bits, or more or fewer bits. The TBS corresponds to the size before the channel coding for error correction is applied to data (TB) to be transmitted by the base station.

In the disclosure, the TB may include a media access control (MAC) header, a MAC control element (CE), one or more MAC service data units (SDUs), and padding bits. Alternatively, the TB may indicate a data unit transmitted from a MAC layer to a physical layer or a MAC protocol data unit (PDU).

The modulation method supported by the NR system is QPSK, 16QAM, 64QAM, and 256QAM, and each modulation order (Qm) corresponds to 2, 4, 6, and 8. That is, 2 bits per symbol may be transmitted in QPSK modulation, 4 bits per OFDM symbol may be transmitted in 16QAM modulation, 6 bits per symbol may be transmitted in 64QAM modulation, and 8 bits per symbol may be transmitted in 256QAM modulation.

Figure 3:
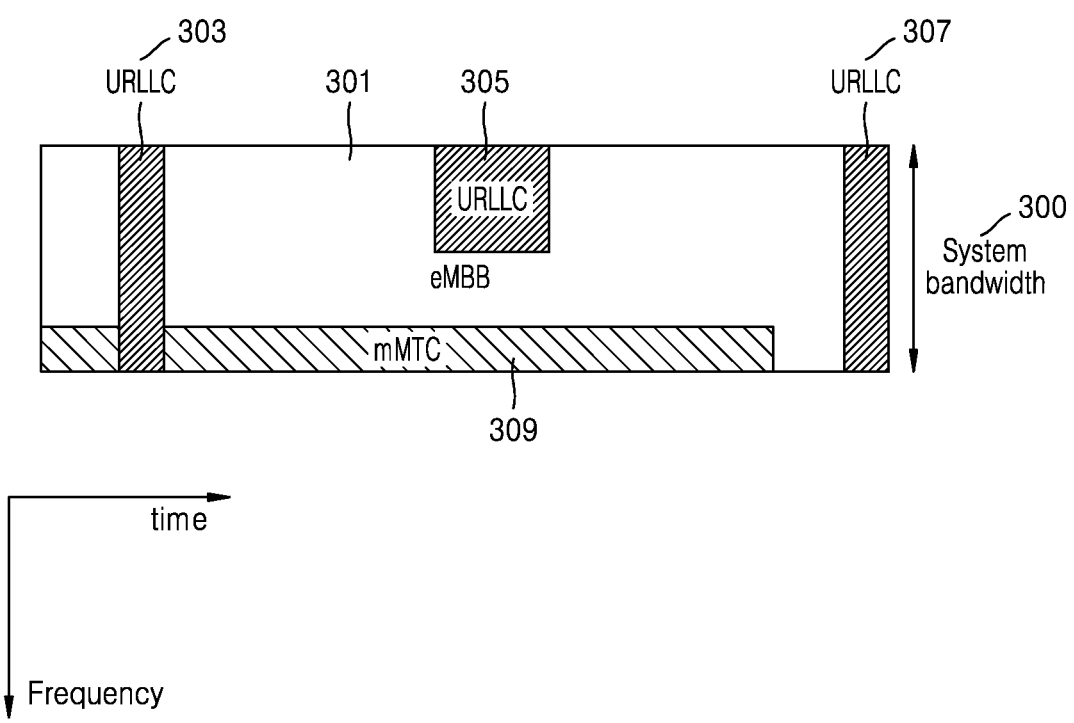
FIG. 3 is a diagram illustrating an example in which enhanced mobile broadband (eMBB), ultra-reliable and low-latency communications (URLLC), and massive machine type communications (mMTC) data are allocated to an entire system frequency band according to an embodiment of the disclosure.
Figure 4:
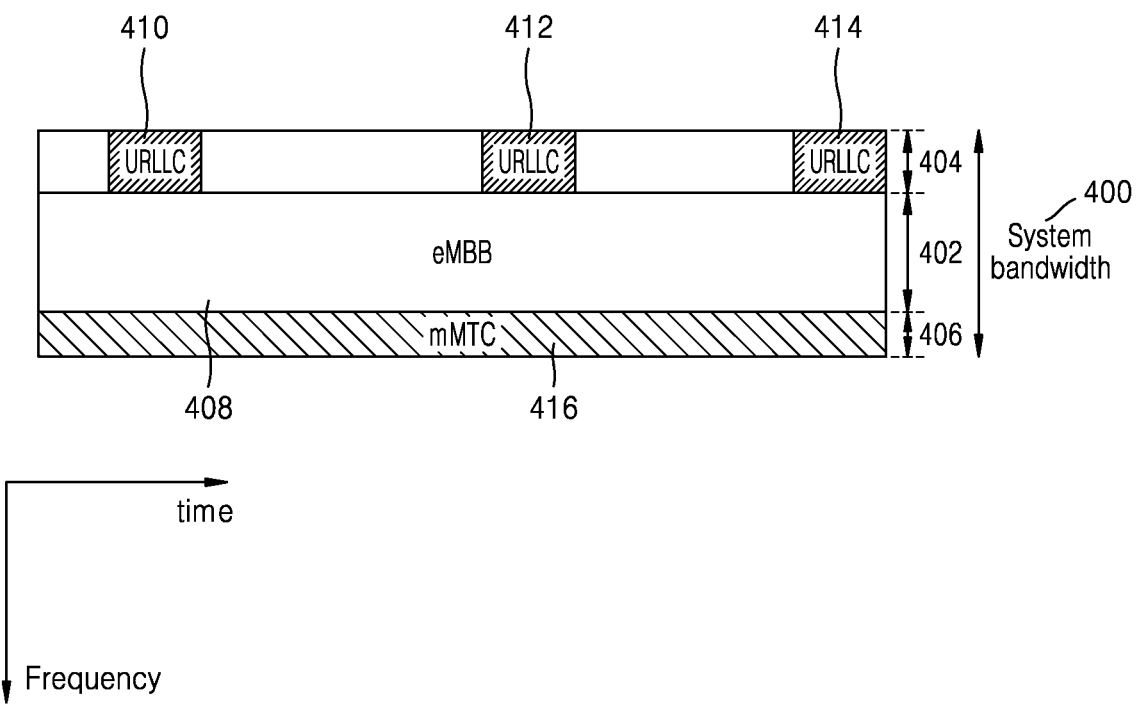
FIG. 4 is a diagram illustrating an example in which eMBB, URLLC, and mMTC data are allocated to divided system frequency bands according to an embodiment of the disclosure.

FIGS. 3 and 4 are diagrams illustrating an example in which data for eMBB, URLLC, and mMTC, which are services considered in a 5G or NR system, are allocated to frequency-time resources.

Referring to FIGS. 3 and 4, a method in which frequency and time resources are allocated for information transmission in each system may be confirmed.

FIG. 3 is a diagram illustrating an example in which eMBB, URLLC, and mMTC data are allocated to an entire system frequency band according to an embodiment of the disclosure.

Referring to FIG. 3, eMBB, URLLC, and mMTC data are allocated to an entire system frequency band 300. When URLLC data 303, 305, and 307 are generated and required to be transmitted while eMBB 301 and mMTC 309 are allocated to a specific frequency band and transmitted, the URLLC data 303, 305, and 307 may be transmitted without emptying or transmitting a portion in which the eMBB 301 and the mMTC 309 have already been allocated. Among the services described above, URLLC needs to reduce latency, the URLLC data 303, 305, and 307 may be allocated to a part of a resource to which the eMBB 301 is allocated and may be transmitted. Of course, when URLLC is additionally allocated and transmitted in the resource to which eMBB is allocated, eMBB data may not be transmitted in overlapping frequency-time resources. Accordingly, the transmission performance of eMBB data may be deteriorated. That is, in the above case, an eMBB data transmission failure may occur due to URLLC allocation.

FIG. 4 is a diagram illustrating an example in which eMBB, URLLC, and mMTC data are allocated to divided system frequency band according to an embodiment of the disclosure.

Referring to FIG. 4, the entire system frequency band 400 may be divided into sub-bands 402, 404, and 406, which are used for service and data transmission. Information relating to the sub-band configuration may be determined in advance, and the base station may transmit this information to the UE through higher layer signaling. Alternatively, the sub-band may be arbitrarily divided by the base station or the network node to provide services to the UE without transmission of separate sub-band configuration information. FIG. 4 illustrates that the sub-band 402 is used to transmit eMBB data 408, the sub-band 404 is used to transmit URLLC data 410, 412 and 414, and the sub-band 406 is used to transmit mMTC data 416.

The terms "physical channel" and "signal" in the NR system may be used to describe the method and apparatus proposed in various embodiments of the disclosure. However, the descriptions of the disclosure may be applied to a wireless communication system other than the NR system.

Hereinafter, various embodiments of the disclosure will be described in detail with reference to the accompanying drawings. In describing the disclosure, when the detailed description of the relevant known functions or configurations is determined to unnecessarily obscure the gist of the disclosure, the detailed description thereof may be omitted herein. The terms as used herein are those defined by taking into account functions in the disclosure, but the terms may vary depending on the intention of users or those of ordinary skill in the art, precedents, or the like. Therefore, the definitions should be made based on the contents throughout the specification.

In the disclosure, a downlink refers to a radio transmission path of a signal transmitted from a base station to a UE, and an uplink refers to a radio transmission path of a signal transmitted from a UE to a base station.

Although the embodiments of the disclosure will be described below with reference to an NR system as an example, the embodiments of the disclosure may also be applied to other communication systems having a similar technical background or channel types. Also, the embodiments of the disclosure may also be applied to other communication systems through some modifications without departing from the scope of the disclosure.

In the disclosure, the terms "physical channel" and "signal" may be used interchangeably with data or a control signal. For example, the PDSCH is a physical channel on which data is transmitted, but the PDSCH may also be referred to as data.

Hereinafter, in the disclosure, higher layer signaling is a signal transmission method by which a base station transmits a signal to a UE by using a downlink data channel of a physical layer, or a UE transmits a signal to a base station by using an uplink data channel of a physical layer. The higher layer signaling may also be referred to as RRC signaling or MAC CE.

Figure 5:
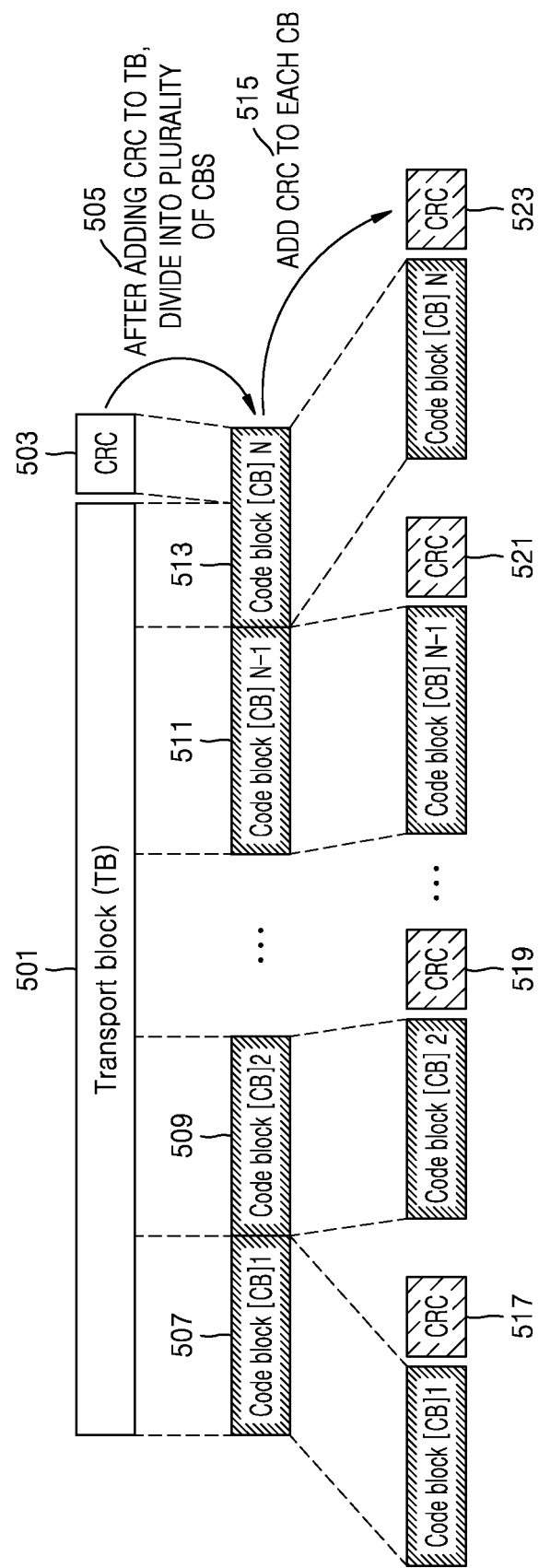
FIG. 5 is a diagram illustrating an example of a process of dividing one transport block into a plurality of code blocks and adding a cyclic redundancy check (CRC) according to an embodiment of the disclosure.

FIG. 5 is a diagram illustrating an example of a process of dividing one TB into a plurality of code blocks and adding a CRC according to an embodiment of the disclosure.

Referring to FIG. 5, a CRC 503 may be added to the last or front portion of one TB 501 to be transmitted in an uplink or a downlink. The CRC 503 may have 16 bits, 25 bits, a pre-fixed number of bits, or may have a variable number of bits according to channel conditions, and may be used to determine whether channel coding is successful. A block in which the CRC 503 is added to the TB 501 may be divided into a plurality of code blocks (CBs) 507, 509, 511, and 513 in operation 505. The code block may be divided with a preset maximum size. In this case, the size of the last code block 513 may be less than the sizes of the other code blocks 507, 509, and 511. However, this is only an example.

According to another example, 0, a random value, or 1 may be inserted into the last code block 513, so that the length of the last code block 513 may become equal to the lengths of the other code blocks 507, 509, and 511.

Also, CRCs 517, 519, 521, and 523 may be respectively added to the code blocks 507, 509, 511, and 513 in operation 515. The CRC may have 16 bits, 24 bits, or a pre-fixed number of bits, and may be used to determine whether channel coding is successful.

The TB 501 and a cyclic generator polynomial may be used to generate the CRC 503, and the cyclic generator polynomial may be defined in various ways. For example, assuming that cyclic generator polynomial $g_{CRC24A}(D)=D^{24}+D^{23}+D^{18}+D^{17}+D^{14}+D^{11}+D^{10}+D^7+D^6+D^5+D^4+D^3+D+1$ for 24-bit CRC, when L=24, CRC $p_0, p_1, p_2, p_3, \ldots, p_{L-1}$ for TB data $a_0, a_1, a_2, a_3, \ldots, a_{A-1}$ is a value of which the remainder becomes 0 when $a_0 D^{A+L-1}+a_1 D^{A+L-2}+\ldots+a_{A-1}D^L+p_0 D^{L-1}+p_1 D^{L-2}+\ldots+p_{L-2}D^1+p_{L-1}$ is divided by $g_{CRC24A}(D)$, and may determine $p_0, p_1, p_2, p_3, \ldots, p_{L-1}$. The above example has been described on the assumption that the CRC length L is 24, but the CRC length L may be variously determined to be, for example, 12, 16, 24, 32, 40, 48, 64, etc.

After the CRC is added to the TB through this process, the TB+CRC may be divided into N CBs 507, 509, 511, and 513. The CRCs 517, 519, 521, and 523 may be respectively added to the divided CBs 507, 509, 511, and 513 in operation 515. The CRC added to the CB may have a different length than when generating the CRC added to the TB, or a different cyclic generator polynomial may be used to generate the CRC. Also, the CRC 503 added to the TB and the CRCs 517, 519, 521, and 523 added to the code block may be omitted according to the type of channel code to be applied to the code block. For example, when a low density parity check (LDPC) code, not a turbo code, is applied to the code block, the CRCs 517, 519, 521, and 523 to be inserted for each code block may be omitted.

As another example, even when the low-density parity-check (LDPC) is applied, the CRCs 517, 519, 521, and 523 may be added to the code block as they are. Also, even when a polar code is used, a CRC may be added or omitted.

As described above with reference to FIG. 5, the maximum length of one code block may be determined according to the type of channel coding applied, and the TB to be transmitted and the CRC added to the TB may be divided into code blocks according to the maximum length of the code block.

In a conventional LTE system, a CRC for a CB is added to a divided CB, the CRC and data bits of the CB are encoded with a channel code, and coded bits are determined. For each coded bit, the number of rate-matched bits is determined as prearranged.

The size of TB (TBS) in the NR system may be calculated through the following operations.

Operation 1: $N'_{RE}$, which is the number of REs allocated to PDSCH mapping in one PRB within the allocated resource, is calculated.

$N'_{RE}$ may be calculated as $N'_{RE}=N_{SC}^{RB} \cdot N_{symb}^{sh} - N_{DMRS}^{PRB} - N_{oh}^{PRB}$. $N_{sc}^{RB}$ is 12, and $N_{symb}^{sh}$ may indicate the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by overhead in one PRB configured by higher layer signaling, and may be set to one of 0, 6, 12, or 18. Thereafter, the total number $N_{RE}$ of REs allocated to the PDSCH may be calculated. $N_{RE}$ is calculated as $N_{RE}$=min(156, $N'_{RE}$)·$n_{PRB}$, and $n_{PRB}$ indicates the number of PRBs allocated to the UE.

Operation 2: The number $N_{info}$ of temporary information bits may be calculated as $N_{RE}$·R·$Q_m$·v. R is a code rate, $Q_m$ is a modulation order, and information about this value may be transmitted by using an MCS bit field of DCI and a prearranged table. Also, v is the number of allocated layers. When $N_{info}$≤3824, TBS may be calculated through operation 3 below. Otherwise, TBS may be calculated through operation 4.

Operation 3: $N'_{info}$ may be calculated through the equation of $$N'_{info} = \max\left(24, 2^n \cdot \left\lfloor \frac{N_{info}}{2^n} \right\rfloor\right)$$

and n=max(3, $\lfloor \log_2 N_{info} \rfloor$−6). TBS may be determined as a value closest to $N'_{info}$ among values not less than $N'_{info}$ in Table 14 below.

TABLE 14

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N'_{info}$ a may be calculated through the equation of $$N'_{info} = \max\left(3840, 2^n \times \text{round}\left(\frac{N_{info} - 24}{2^n}\right)\right)$$

and n=$\lfloor \log_2(N_{info}-24) \rfloor$−5. TBS may be determined through $N'_{info}$ and Equation 2 below. In the following, C corresponds to the number of code blocks included in one TB.

if R ≤ 1/4    Equation 2

$$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
    if $N'_{info}$ > 8424

$$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if

In the NR system, when one CB is input to an LDPC encoder, parity bits may be added and output. In this case, the amount of parity bits may change according to an LDPC base graph. A method of transmitting all parity bits generated by LDPC coding with respect to a specific input may be referred to as full buffer rate matching (FBRM), and a method of limiting the number of transmittable parity bits may be referred to as limited buffer rate matching (LBRM). When resources are allocated for data transmission, an LDPC encoder output is generated into a circular buffer, and the bits of the generated buffer are repeatedly transmitted as many as the allocated resources. In this case, the length of the circular buffer may be $N_{cb}$.

When the number of all parity bits generated by LDPC coding is N, $N_{cb}$=N in the FBRM. In the LBRM, $N_{cb}$=min(N,$N_{ref}$), $N_{ref}$ is given by $$N_{ref} = \left\lfloor \frac{TBS_{LBRM}}{C \cdot R_{LBRM}} \right\rfloor,$$

and $R_{LBRM}$ may be determined to be 2/3. In order to obtain $TBS_{LBRM}$, the method of obtaining the TBS is used. The maximum number of layers and the maximum modulation order supported by the UE in the cell are assumed. It is assumed that the maximum modulation order $Q_m$ is 8 when the cell is set to use an MCS table that supports 256QAM for at least one BWP, and is 8 (64QAM) when not set. The code rate is assumed to be 948/1024 that is the maximum code rate. $N_{RE}$ is assumed to be 156·$n_{PRB}$. $n_{PRB}$ is assumed to be $n_{PRB,LBRM}$. $n_{PRB,LBRM}$ may be given as shown in Table 15 below.

TABLE 15

| Maximum number of PRBs across all configured DL BWPs and UL BWPs of a carrier for DL-SCH and UL-SCH, respectively | $n_{PRB, LBRM}$ |
|---|---|
| Less than 33 | 32 |
| 33 to 66 | 66 |

TABLE 15-continued

| Maximum number of PRBs across all configured DL BWPs and UL BWPs of a carrier for DL-SCH and UL-SCH, respectively | $n_{PRB, LBRM}$ |
|---|---|
| 67 to 107 | 107 |
| 108 to 135 | 135 |
| 136 to 162 | 162 |
| 163 to 217 | 217 |
| Larger than 217 | 273 |

In the NR system, the maximum data rate supported by the UE may be determined through Equation 3 below.

Equation 3 data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right)$$

In Equation 3, J may be the number of carriers aggregated by frequency aggregation, $R_{max}$=948/1024, $v_{Layers}^{(j)}$ may be the maximum number of layers, $Q_m^{(j)}$ may be the maximum modulation order, $f^{(j)}$ may be the scaling factor, and μ may be SCS. $f^{(j)}$ may allow the UE to report one of 1, 0.8, 0.75, and 0.4, and μ may be given as shown in Table 16 below.

TABLE 16

| μ | Δf = $2^{\mu}$ · 15[kHz] | Cyclic prefix |
|---|---|---|
| 0 | 15 | Normal |
| 1 | 30 | Normal |
| 2 | 60 | Normal |
| 3 | 120 | Normal, Extended |
| 4 | 240 | Normal |

Also, $T_s^{\mu}$ is the average OFDM symbol duration, $T_s^{\mu}$ may be calculated as $$\frac{10^{-3}}{14 \cdot 2^{\mu}}, \text{ and } N_{PRB}^{BW(j),\mu}$$

is the maximum number of RBs in BW(j). $OH^{(j)}$ is an overhead value, and may be given as 0.14 in the downlink of FR1 (band below 6 GHz) and 0.18 in the uplink of FR1, and may be given as 0.08 in the downlink of FR2 (band over 6 GHz) and 0.10 in the uplink of FR2. A maximum data rate in a downlink in a cell having a frequency bandwidth of 100 MHz at an SCS of 30 kHz may be calculated through Equation 3 as shown in Table 17 below.

TABLE 17

| $f^{(j)}$ | $v_{Layers}^{(j)}$ | $Q_m^{(j)}$ | Rmax | $N_{PRB}^{BW(j), \mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that may be measured in actual data transmission by the UE may be a value obtained by dividing an amount of data by a data transmission time. This may be a value obtained by dividing TBS in 1 TB transmission or the sum of TBS in 2 TB transmission by a transmission time interval (TTI). For example, as in the assumption of obtaining Table 17, a maximum actual data rate in a downlink in a cell having a frequency bandwidth of 100 MHz at an SCS of 30 kHz may be determined as shown in Table 18 below according to the number of allocated PDSCH symbols.

TABLE 18

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE may be confirmed through Table 17, and the actual data rate according to the allocated TBS may be confirmed through Table 18. In this case, there may be a case in which the actual data rate is greater than the maximum data rate according to scheduling information.

In the wireless communication system, particularly, in the NR system, the data rate that may be supported by the UE may be mutually agreed upon between the base station and the UE. This may be calculated by using the maximum frequency band supported by the UE, the maximum modulation order, the maximum number of layers, etc. However, the calculated data rate may be different from a value calculated from the TBS and the TTI duration used for actual data transmission.

Accordingly, the UE may be allocated a TBS greater than a value corresponding to the data rate supported by the UE. To prevent this, there may be a limitation on the TBS that may be scheduled according to the data rate supported by the UE.

Figure 6:
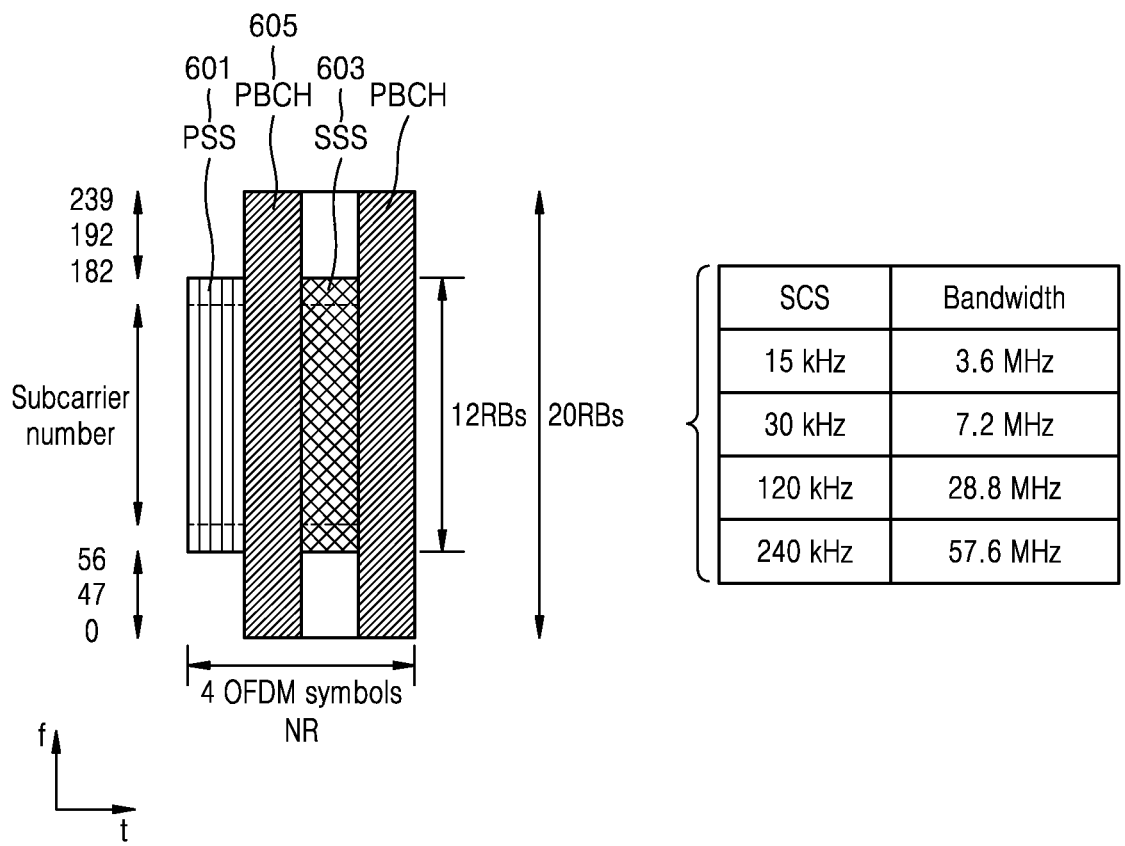
FIG. 6 is a diagram illustrating a state in which a synchronization signal (SS) and a physical broadcast channel (PBCH) of an NR system are mapped in frequency and time domains according to an embodiment of the disclosure.

FIG. 6 is a diagram illustrating a state in which the SS and the PBCH of the NR system are mapped in the frequency and time domains according to an embodiment of the disclosure.

Referring to FIG. 6, a primary synchronization signal (PSS) 601, a secondary synchronization signal (SSS) 603, and a PBCH 605 are mapped over four OFDM symbols, the PSS 601 and the SSS 603 are mapped to 12 RBs, and the PBCH 605 is mapped to 20 RBs. How the frequency band of 20 RBs changes according to SCS is shown in a table of FIG. 6. A resource region in which the PSS 601, the SSS 603, and the PBCH 605 are transmitted may be referred to as an SS/PBCH block. Also, the SS/PBCH block may be referred to as an SSB block.

Figure 7:
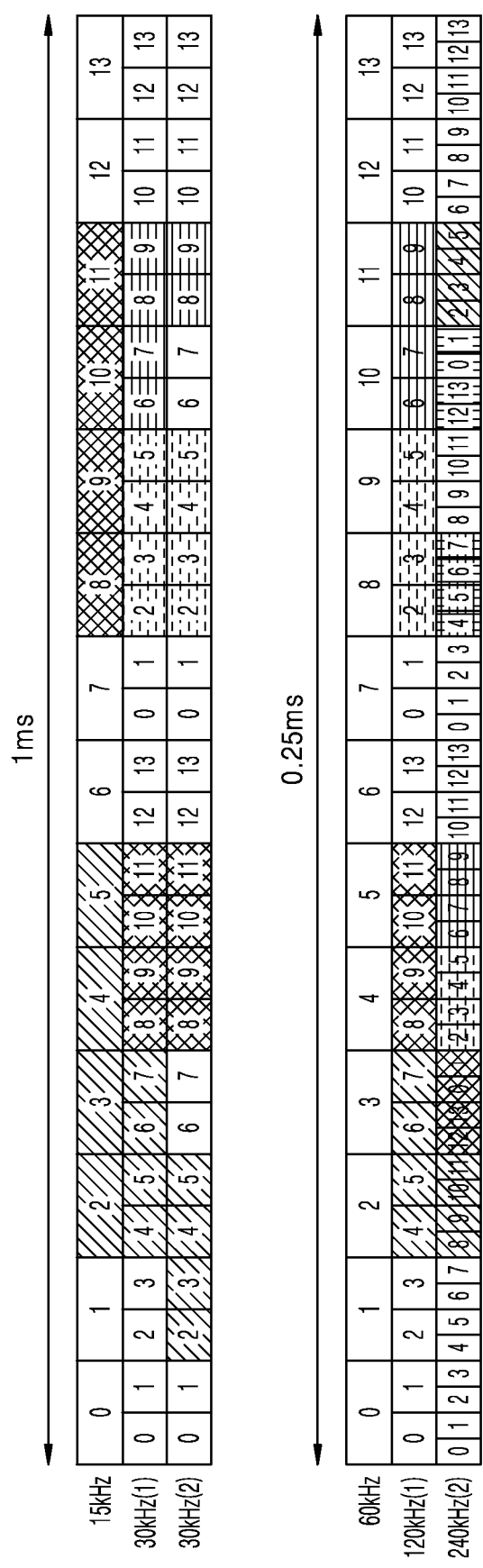
FIG. 7 is a diagram illustrating symbols on which SS/PBCH blocks may be transmitted according to subcarrier spacing according to an embodiment of the disclosure.

FIG. 7 is a diagram illustrating symbols on which SS/PBCH blocks may be transmitted according to SCS according to an embodiment of the disclosure.

Referring to FIG. 7, the SCS may be set to 15 kHz, 30 kHz, 120 kHz, 240 kHz, etc., and the positions of the symbols on which the SS/PBCH block (or the SSB block) may be located may be determined according to each SCS. FIG. 7 illustrates the positions of symbols on which the SSB may be transmitted according to SCS in symbols within 1 ms. It is not always necessary to transmit the SSB in the area illustrated in FIG. 7. The position at which the SSB block is transmitted may be configured for the UE through system information or dedicated signaling.

Because the UE is generally far from the base station, the signal transmitted from the UE is received by the base station after a propagation delay time. The propagation delay time is a value obtained by dividing a path through which radio waves are transmitted from the UE to the base station by the speed of light, and may generally be a value obtained by dividing the distance between the UE and the base station by the speed of light. In an embodiment of the disclosure, when the UE is located 100 km away from the base station, the signal transmitted by the UE is received by the base station after about 0.34 msec. In contrast, the signal transmitted by the base station is also received by the UE after about 0.34 msec. As described above, the arrival time of the signal that the base station transmits to the base station may change according to the distance between the UE and the base station. Therefore, when a plurality of UEs located in different positions simultaneously transmit signals, the arrival times of the signals that the UEs transmit to the base station may be different from each other. To solve this problem so that the signals transmitted by the UEs simultaneously arrive at the base station, the UEs may transmit the uplink signal at different times according to the positions thereof. In the 5G, NR, and LTE systems, this is referred to as timing advance.

Figure 8:
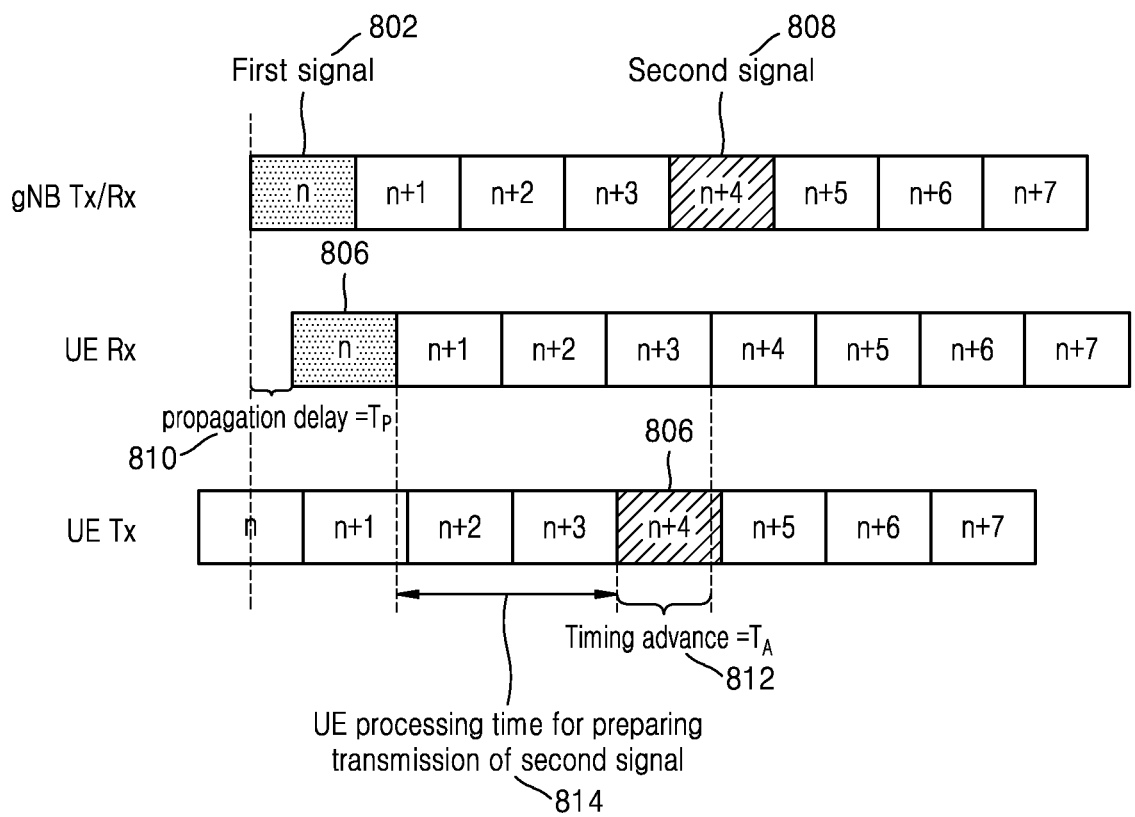
FIG. 8 is a diagram illustrating a processing time of a terminal according to timing advance when the terminal receives a first signal and transmits a second signal corresponding thereto in a 5G or NR system according to an embodiment of the disclosure.

FIG. 8 is a diagram illustrating a processing time of a terminal according to timing advance when the terminal receives a first signal and transmits a second signal corresponding thereto in a 5G or NR system according to an embodiment of the disclosure.

Referring to FIG. 8, the processing time of the UE according to the timing advance will be described in detail. When the base station transmits an uplink scheduling grant (UL grant) or a downlink control signal and data (DL grant and DL data) to the UE in slot n 802, the UE may receive the uplink scheduling grant or the downlink control signal and the data in slot n 804. In this case, the UE may receive the signal later by a propagation delay time (Tp) 810 than the time at which the base station transmits the signal. In the present embodiment of the disclosure, when the UE receives the first signal in slot n 804, the UE transmits the corresponding second signal in slot n+4 806. Even when the UE transmits the signal to the base station, in order for the signal to arrive at the base station at a specific time, the UE may transmit HARQ ACK/NACK for uplink data or downlink data at a timing 806 that is advanced by timing advance TA 812 from the slot n+4 of the signal received by the UE. Therefore, in the present embodiment of the disclosure, the time at which the UE is allowed to prepare to receive uplink scheduling grant, transmit uplink data or receive downlink data, and transmit HARQ ACK or NACK may be a time corresponding to three slots excluding TA (814).

In order to determine the timing described above, the base station may calculate the absolute value of the TA of the UE. The base station may calculate the absolute value of the TA by adding the TA value, which is first transmitted to the UE in the random access operation when the UE initially accesses the base station, to the amount of change in the TA value, which is transmitted thereafter through higher layer signaling, or by subtracting the amount of change in the TA value from the TA value. In the disclosure, the absolute value of the TA may be a value obtained by subtracting a start time of an n-th TTI received by the UE from a start time of an n-th TTI transmitted by the UE.

On the other hand, one of the important criteria for performance of a cellular wireless communication system is packet data latency. To this end, the LTE system transmits and receives signals in units of subframes having a TTI of 1 ms. The LTE system operating as described above may support a short-TTI UE having a TTI shorter than 1 ms. On the other hand, the TTI in the 5G or NR system may be shorter than 1 ms. The short-TTI UE is suitable for services where latency is important, such as a Voice over LTE (VoLTE) service and a remote control. Also, the short-TTI UE may realize a mission-critical Internet of things (IoT) on a cellular basis.

In the 5G or NR system, when the base station transmits a PDSCH including downlink data, DCI that schedules the PDSCH may indicate a K1 value corresponding to information about a timing at which the UE transmits HARQ-ACK information of the PDSCH. When HARQ-ACK information is not indicated to be transmitted before symbol L1 including timing advance, HARQ-ACK information may be transmitted from the UE to the base station at the same time point as symbol L1 including timing advance or after symbol L1 including timing advance. When HARQ-ACK information is indicated to be transmitted before symbol L1 including timing advance, HARQ-ACK information may not be valid HARQ-ACK information in HARQ-ACK transmission from the UE to the base station.

Symbol L1 may be the first symbol on which a cyclic prefix (CP) starts after $T_{proc,1}$ from the last time point of the PDSCH. $T_{proc,1}$ may be calculated as shown in Equation 4 below.

$$T_{proc,1}=((N_1+d_{1,1}+d_{1,2})(2048+144)\cdot \kappa 2^{-\mu})\cdot T_C|  \quad \text{Equation 4}$$

In Equation 4 above, $N_1$, $d_{1,1}$, $d_{1,2}$, $\kappa$, $\mu$, and $T_C$ may be defined as follows.

When HARQ-ACK information is transmitted over a PUCCH, $d_{1,1}=0$, and when HARQ-ACK information is transmitted over a PUSCH (data channel), $d_{1,1}=1$.

When the UE is configured with a plurality of carriers or activated configuration carriers, the maximum timing difference between the carriers may be reflected in the transmission of the second signal.

In the case of PDSCH mapping type A, that is, in a case where the position of the first DMRS symbol is the third or fourth symbol of the slot, $d_{1,2}=7-i$ is defined when the position index i of the last symbol of the PDSCH is less than 7.

In the case of PDSCH mapping type B, that is, in a case where the position of the first DMRS symbol is the first symbol of the PDSCH, $d_{1,2}=3$ when the length of the PDSCH is 4 symbols, $d_{1,2}=3+d$ when the length of the PDSCH is 2 symbols, and d is the number of symbols overlapping the PDSCH and the PDCCH including the control signal for scheduling the PDSCH.

$N_1$ is defined according to $\mu$ as shown in Table 19 below. $\mu=0$, 1, 2, and 3 refers to an SCS of 15 kHz, 30 kHz, 60 kHz, and 120 kHz, respectively.

TABLE 19

| | PDSCH decoding time $N_1$ [symbols] | |
| --- | --- | --- |
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

For $N_1$ provided in Table 19 above, different values may be used according to UE capability.

$T_c=1/(\Delta f_{max}\cdot N_f)$, $\Delta f_{max}=480\cdot 10^3$ Hz, $N_f=4096$, $\kappa=T_s/T_c=64$, $T_s=1/(\Delta f_{ref}\cdot N_{f,ref})$, $\Delta f_{ref}=15\cdot 10^3$ Hz, $N_{f,ref}=2048$ are defined.

Also, in the 5G or NR system, when the base station transmits the control information including the uplink scheduling grant, the UE may indicate a K2 value corresponding to information about a timing at which the UE transmits uplink data or a PUSCH.

When the PUSCH is not indicated to be transmitted before symbol L2 including timing advance, the PUSCH may be transmitted from the UE to the base station at the same time point as symbol L2 including timing advance or after symbol L2 including timing advance. When the PUSCH is indicated to be transmitted before symbol L2 including timing advance, the UE may ignore uplink scheduling grant control information received from the base station.

Symbol L2 may be the first symbol from which the CP of the PUSCH symbol to be transmitted after $T_{proc,2}$ from the last time point of the PDCCH including the scheduling grant starts. $T_{proc,2}$ may be calculated as shown in Equation 5 below.

$$T_{proc,2}=((N_2+d_{2,1})(2048+144)\cdot \kappa 2^{-\mu})\cdot T_C \quad \text{Equation 5}$$

In Equation 5 above, $N_2$, $d_{2,1}$, $\kappa$, $\mu$, and $T_C$ may be defined as follows.

When the first symbol among PUSCH-allocated symbols includes only DMRS, $d_{2,1}=0$; otherwise, $d_{2,1}=1$.

When the UE is configured with a plurality of carriers or activated configuration carriers, the maximum timing difference between the carriers may be reflected in the transmission of the second signal.

$N_2$ is defined according to $\mu$ as shown in Table 20 below. $\mu=0$, 1, 2, and 3 refers to an SCS of 15 kHz, 30 kHz, 60 kHz, and 120 kHz, respectively.

TABLE 20

| μ | PUSCH preparation time N$_2$ [symbols] |
|---|---|
| 0 | 10 |
| 1 | 12 |
| 2 | 23 |
| 3 | 36 |

For N$_2$ provided in Table 20 above, different values may be used according to UE capability.

$T_c=1/(\Delta f_{max} \cdot N_f)$, $\Delta f_{max}=480 \cdot 10^3$ Hz, $N_f=4096$, $\kappa=T_s/T_c=64$, $T_s=1/(\Delta f_{ref} \cdot N_{f,ref})$, $\Delta f_{ref}=15 \cdot 10^3$ Hz, $N_{f,ref}=2048$ are be defined.

On the other hand, the 5G or NR system may configure a frequency BWP in one carrier so that a specific UE is designated to perform transmission and reception within the configured BWP. This may be aimed at reducing power consumption of the UE. The base station may configure a plurality of BWPs, and may change the activated BWP in control information. The time that the UE is able to use to change the BWP may be defined as shown in Table 21 below.

TABLE 21

| Frequency range | Scenario | Type 1 Delay (us) | Type 2 Delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 21, frequency range 1 refers to a frequency band of 6 GHz or less, and frequency range 2 refers to a frequency band of 6 GHz or more. In the above-described embodiment of the disclosure, type 1 and type 2 may be determined according to UE capability. Scenarios 1, 2, 3, and 4 in the above-described embodiment of the disclosure are given as shown in Table 22 below.

TABLE 22

|   | Center frequency is changeable. | Center frequency is unchangeable. |
|---|---|---|
| Frequency bandwidth is changeable. | Scenario 3 | Scenario 2 |
| Frequency bandwidth is unchangeable. | Scenario 1 | Scenario 4 when SCS is changed. |

Figure 9:
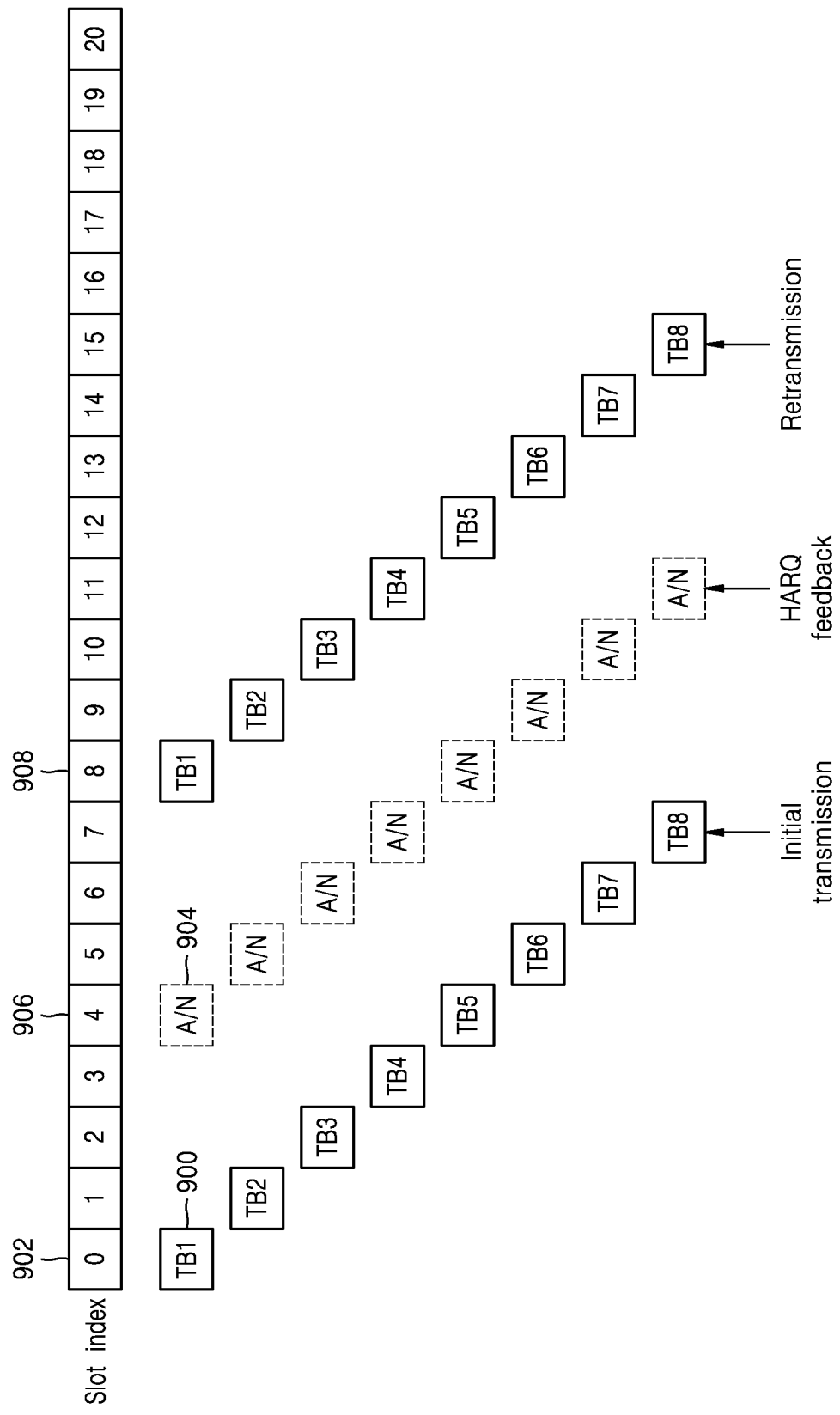
FIG. 9 is a diagram illustrating an example of scheduling and transmitting data in slots, receiving hybrid automatic repeat request-acknowledgment (HARQ-ACK) feedback for the corresponding data, and performing retransmission according to the HARQ-ACK feedback according to an embodiment of the disclosure.

FIG. 9 is a diagram illustrating an example of scheduling and transmitting data (e.g., TBs) in slots, receiving HARQ-ACK feedback for the corresponding data, and performing retransmission according to the HARQ-ACK feedback according to an embodiment of the disclosure.

Referring to FIG. 9, TB1 900 is initially transmitted in slot 0 902, and ACK/NACK feedback 904 in response thereto is transmitted in slot 4 906. When the initial transmission of TB1 900 fails and NACK is received, retransmission for TB1 900 may be performed in slot 8 908. A time point at which the ACK/NACK feedback 904 is transmitted and a time point at which the retransmission is performed may be determined in advance, or may be determined according to control information and/or a value indicated through higher layer signaling. FIG. 9 illustrates an example of sequentially scheduling and transmitting TB1 to TB8 in slots starting from slot 0. For example, after HARQ process IDs 0 to 7 are respectively assigned to TB1 to TB8, TB1 to TB8 are transmitted. When the number of HARQ process IDs usable by the base station and the UE is only four, eight different TBs may not be continuously transmitted.

Figure 10:
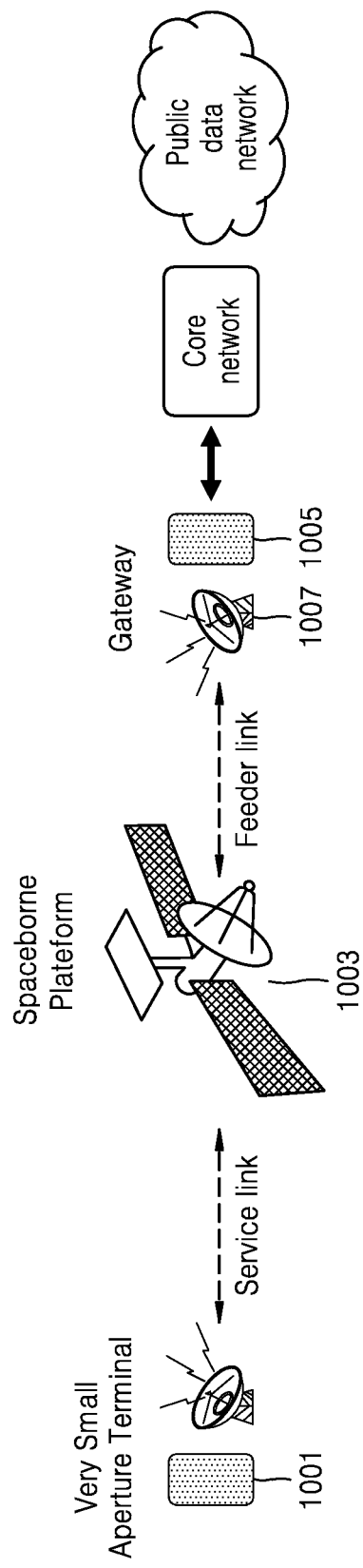
FIG. 10 is a diagram illustrating an example of a communication system using a satellite according to an embodiment of the disclosure.

FIG. 10 is a diagram illustrating an example of a communication system using a satellite according to an embodiment of the disclosure.

Referring to FIG. 10, when a terminal 1001 transmits a signal to a satellite 1003, the satellite 1003 transmits the signal to a base station 1007, and the base station 1007 processes the received signal and transmits, to the terminal 1005, a signal including a request for a subsequent operation thereon through the satellite 1003. At this time, because the distance between the terminal 1001 and the satellite 1003 is long and the distance between the satellite 1003 and the base station 1007 is long, the time required for data transmission and reception from the terminal 1001 to the base station 1007 increases.

Figure 11:
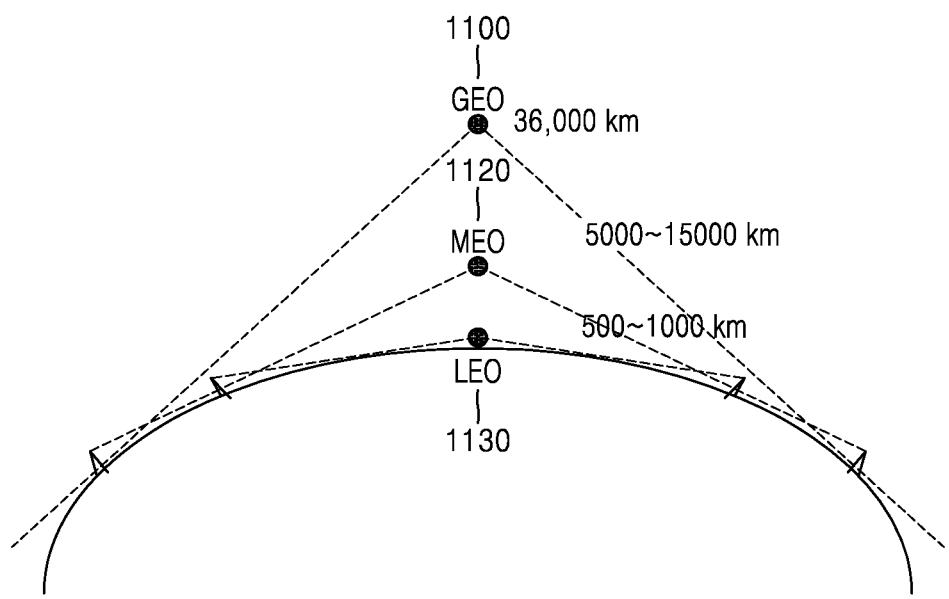
FIG. 11 is a diagram illustrating an Earth's orbital period of a communication satellite according to an altitude or height of a satellite according to an embodiment of the disclosure.

FIG. 11 is a diagram illustrating an Earth's orbital period of a communication satellite according to an altitude or height of a satellite according to an embodiment of the disclosure.

Referring to FIG. 11, communication satellites may be classified into low Earth orbit (LEO) satellites, middle Earth orbit (MEO) satellites, geostationary Earth orbit (GEO) satellites, and the like according to the orbit of the satellite. In general, a GEO satellite 1100 refers to a satellite with an altitude of approximately 36,000 km, a MEO satellite 1120 refers to a satellite with an altitude of 5,000 km to 15,000 km, and a LEO satellite 1130 refers to a satellite with an altitude of 500 km to 1,000 km. Earth's orbital period changes according to each altitude. The GEO satellite 1100 has an Earth's orbital period of approximately 24 hours, the MEO satellite 1120 has an Earth's orbital period of approximately 6 hours, and the LEO satellite 1130 has an Earth's orbital period of approximately 90 minutes to 120 minutes. The LEO satellite 1130 (2,000 km or less) is advantageous in terms of propagation delay time (which may be understood as the time that takes for a signal transmitted from a transmitter to reach a receiver) and loss due to a relatively low altitude thereof, compared with the GEO satellite 1100 (36,000 km). A non-GEO may be referred to as a non-geostationary orbit (NGSO).

Figure 12:
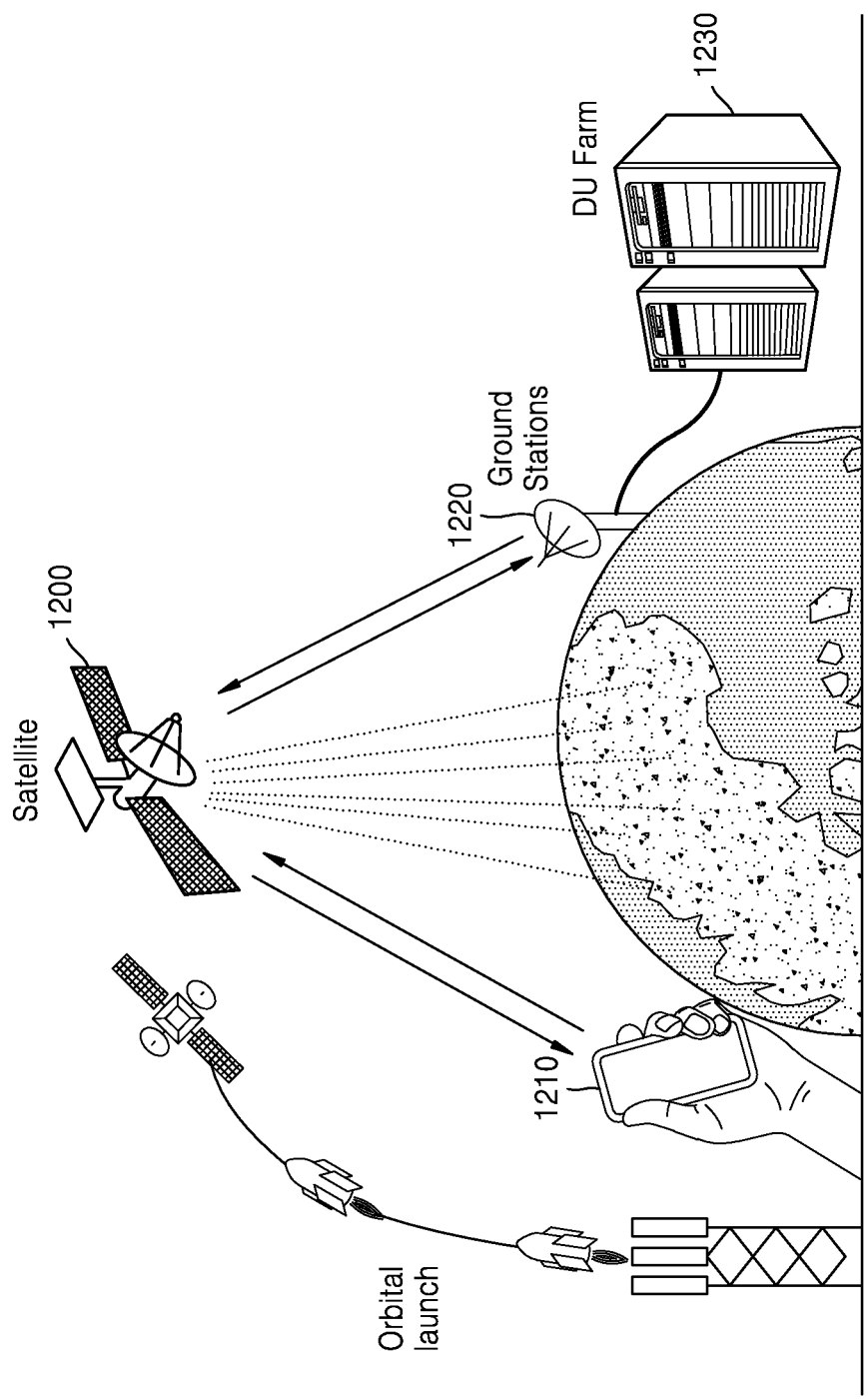
FIG. 12 is a conceptual diagram of direct satellite-terminal communication according to an embodiment of the disclosure.

FIG. 12 is a conceptual diagram of direct satellite-terminal communication according to an embodiment of the disclosure.

Referring to FIG. 12, a satellite 1200, which is located at an altitude of 100 km or more by a rocket, transmits and receives a signal to and from a terrestrial terminal 1210, and also transmits and receives a signal to and from a ground station 1220 connected to a terrestrial base station (DU farms) 1230.

Figure 13:
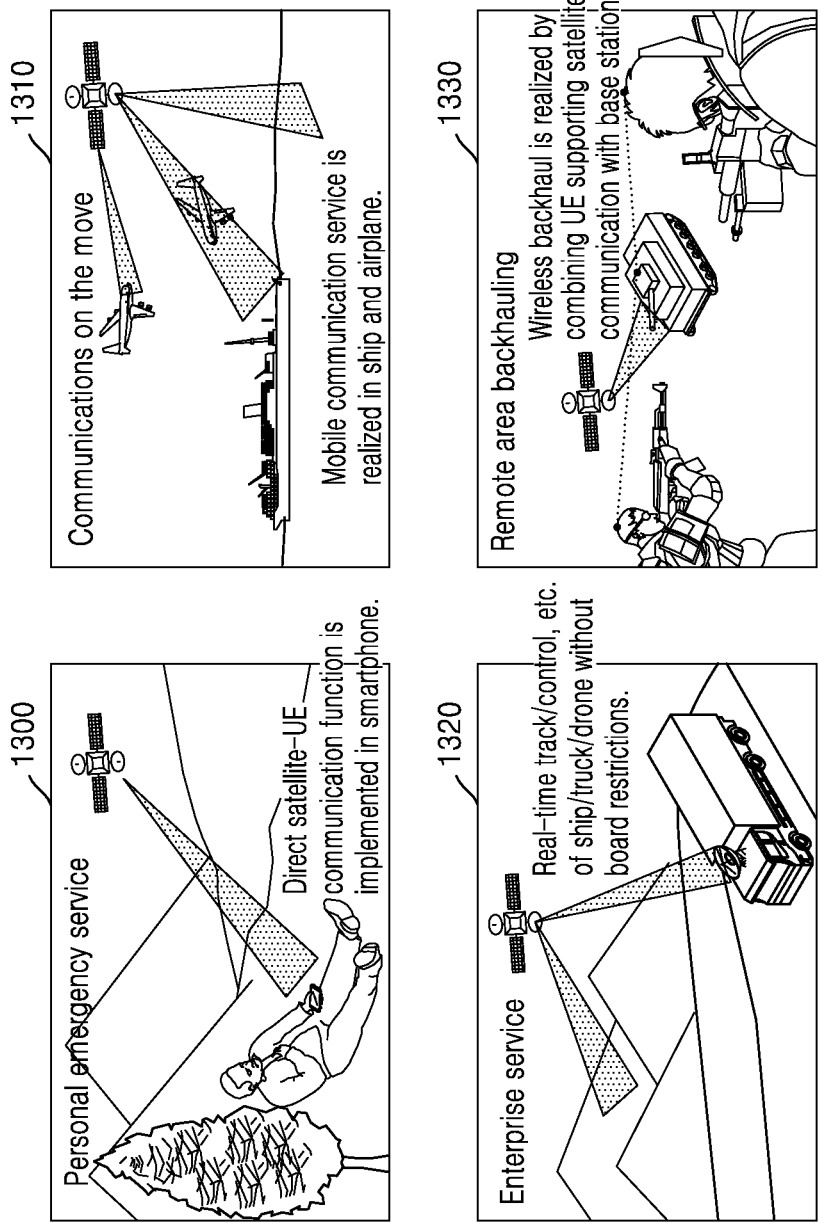
FIG. 13 is a diagram illustrating utilization scenarios of direct satellite-terminal communication according to an embodiment of the disclosure.

FIG. 13 is a diagram illustrating utilization scenarios of direct satellite-terminal communication according to an embodiment of the disclosure.

Direct satellite-terminal communication supplements the coverage limitation of terrestrial networks, and may support communication services for specialized purposes. As an example, by implementing a direct satellite-terminal communication function in a user terminal, a user's emergency rescue and/or disaster signal may be transmitted and received in a place out of a terrestrial network communication coverage (1300), a mobile communication service may be provided to a user in an area where terrestrial communication is impossible, such as a ship and/or an airplane (1310), and positions of ships, trucks, and/or drones may be tracked and controlled in real time without border restrictions (1320). Also, by supporting a satellite communication function to a base station, satellite communication may be used to function as a backhaul of the base station and perform a backhaul function (1330) when physically far away.

Figure 14:
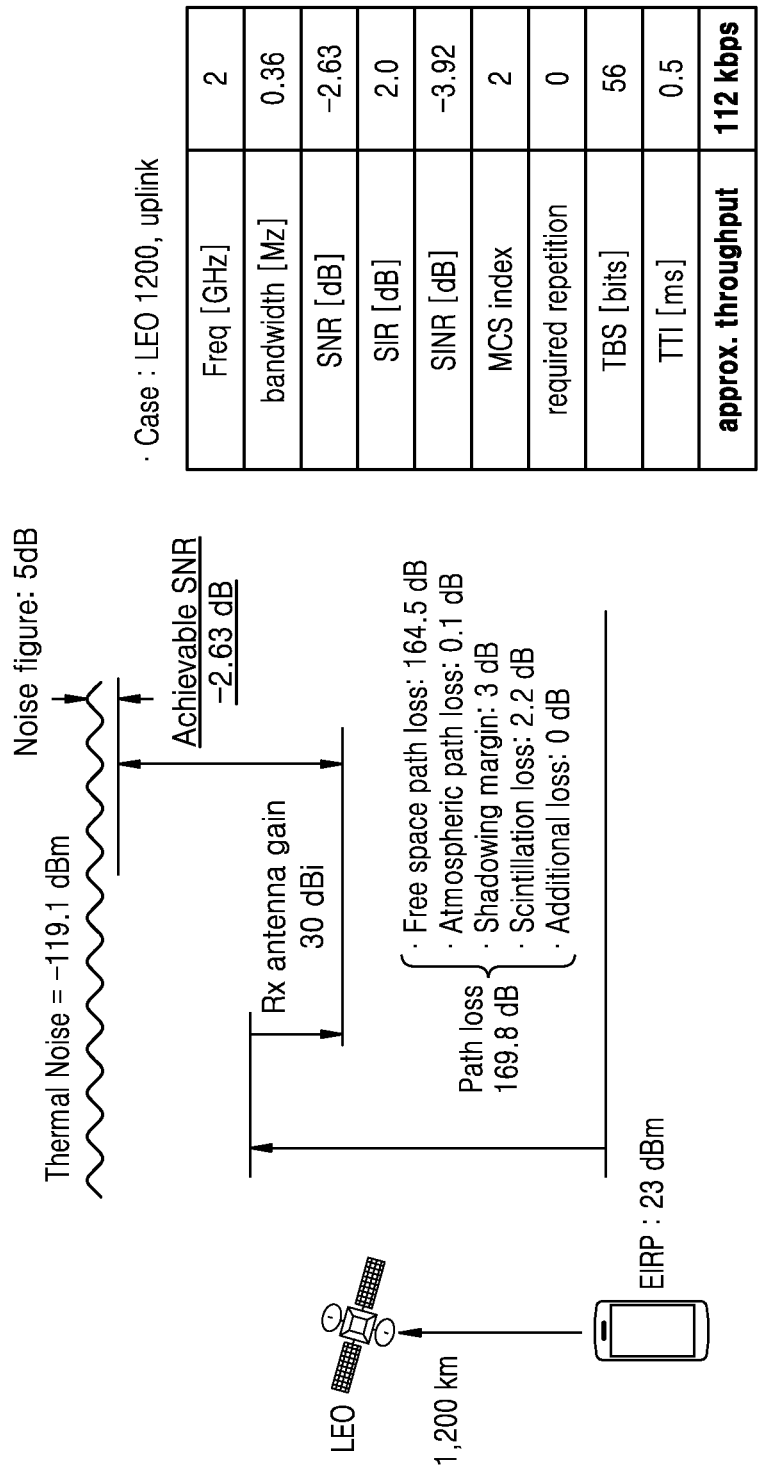
FIG. 14 is a diagram illustrating an example of calculating an expected data rate (throughput) in an uplink when a low Earth orbit (LEO) satellite at an altitude of 1,200 km and a terrestrial terminal perform direct communication according to an embodiment of the disclosure.

FIG. 14 is a diagram illustrating an example of calculating an expected data rate (throughput) in an uplink when a geostationary Earth orbit (LEO) satellite at an altitude of 1200 km and a terrestrial terminal perform direct communication according to an embodiment of the disclosure.

Referring to FIG. 14, in the uplink, when a transmit power effective isotropic radiated power (EIRP) of the terrestrial terminal is 23 dBm, a path loss of a radio channel to the satellite is 169.8 dB, and a satellite receive antenna gain is 30 dBi, an achievable signal-to-noise ratio (SNR) is estimated to be −2.63 dB. In this case, the path loss may include a path loss in free space, a loss in the atmosphere, and the like. Assuming that a signal-to-interference ratio (SIR) is 2 dB, a signal-to-interference and noise ratio (SINR) is calculated to be −3.92 dB. In this case, when an SCS of 30 kHz and a frequency resource of one PRB are used, a transmission rate of 112 kbps may be achieved.

Figure 15:
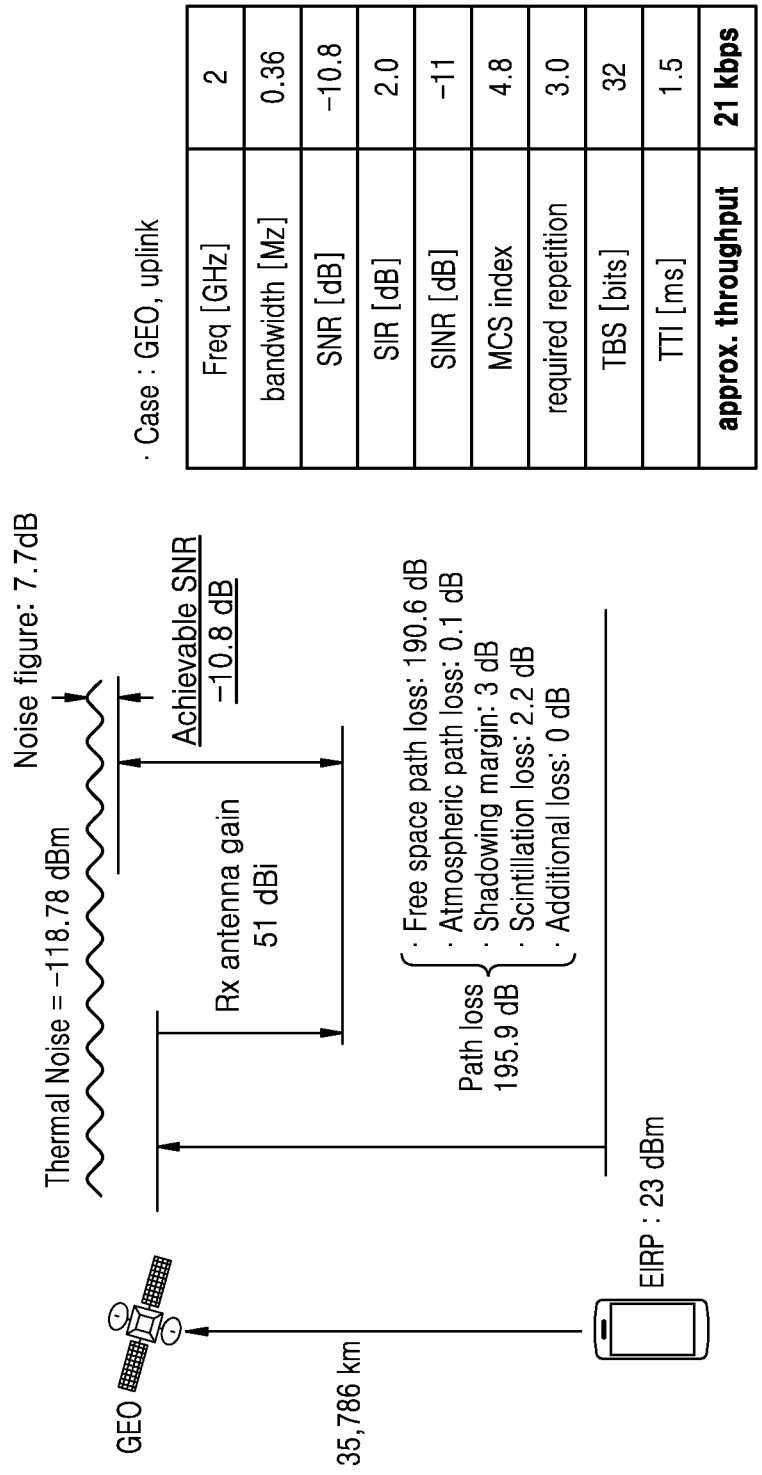
FIG. 15 is a diagram illustrating an example of calculating an expected data rate (throughput) in an uplink when a geostationary Earth orbit (GEO) satellite at an altitude of 35,786 km and a terrestrial terminal perform direct communication according to an embodiment of the disclosure.

FIG. 15 is a diagram illustrating an example of calculating an expected data rate (throughput) in an uplink when a GEO satellite at an altitude of 35,786 km and a terrestrial terminal perform direct communication according to an embodiment of the disclosure.

Referring to FIG. 15, in the uplink, when a transmit power EIRP of the terrestrial terminal is 23 dBm, a path loss of a radio channel to the satellite is 195.9 dB, and a satellite receive antenna gain is 51 dBi, an achievable SNR is estimated to be −10.8 dB. In this case, the path loss may include a path loss in outer space, a loss in the atmosphere, and the like. Assuming that a SIR is 2 dB, a SINR is calculated to be −11 dB. In this case, when an SCS of 30 kHz and a frequency resource of one PRB are used, a transmission rate of 21 kbps may be achieved. This may be a result of performing repeated transmissions three times.

Figure 16:
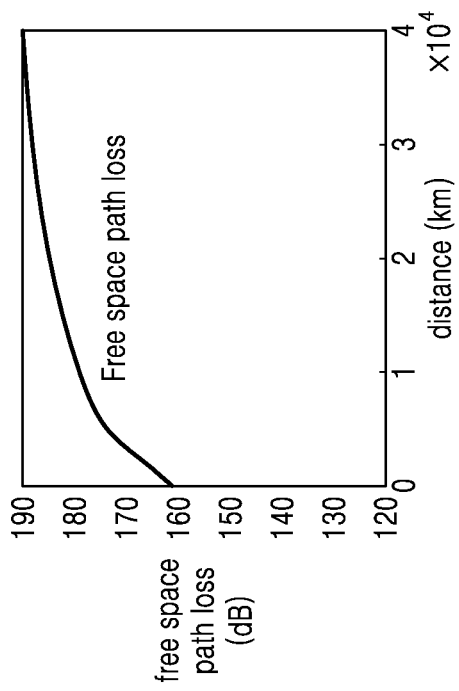
FIG. 16 is a diagram illustrating a path loss value according to a path loss model between a terminal and a satellite, and a path loss according to a path loss model between a terminal and a terrestrial communication base station according to an embodiment of the disclosure.
Figure 16:
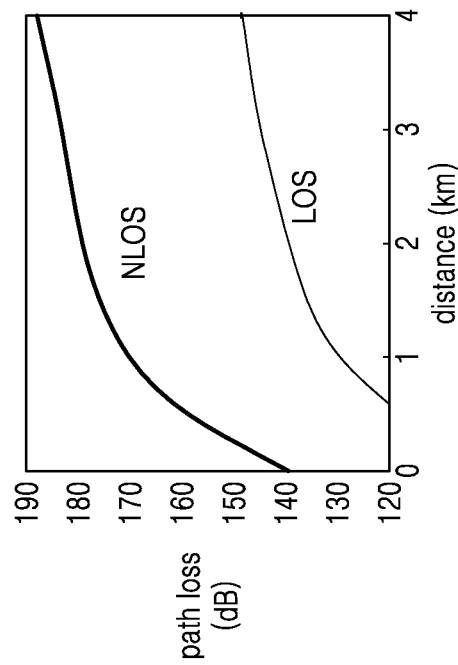

FIG. 16 is a diagram illustrating a path loss value according to a path loss model between a UE and a satellite, and a path loss according to a path loss model between a UE and a terrestrial communication base station according to an embodiment of the disclosure.

Referring to FIG. 16, d denotes a distance and $f_c$ denotes a frequency of a signal. A path loss (FSPL) 1600 in free space where communication between the terminal and the satellite is performed is inversely proportional to the square of the distance, but path losses ($PL_2$, $PL'_{Uma-NLOS}$) 1610 and 1620 on the ground where communication between the terminal and the terrestrial communication base station (terrestrial gNB) is performed are inversely proportional to the fourth power of the distance. $d_{3D}$ is the straight line distance between the UE and the base station, $h_{BS}$ is the height of the base station, and $h_{UT}$ is the height of the UE. $d'_{BP}$ is calculated as $4 \times h_{BS} \times h_{UT} \times f_c / c$. $f_c$ is the center frequency in Hz, and c is the speed of light in m/s.

In satellite communications (or non-terrestrial network), Doppler shift, i.e., frequency offset of a transmission signal, occurs as the satellite continuously moves rapidly.

Figure 17:
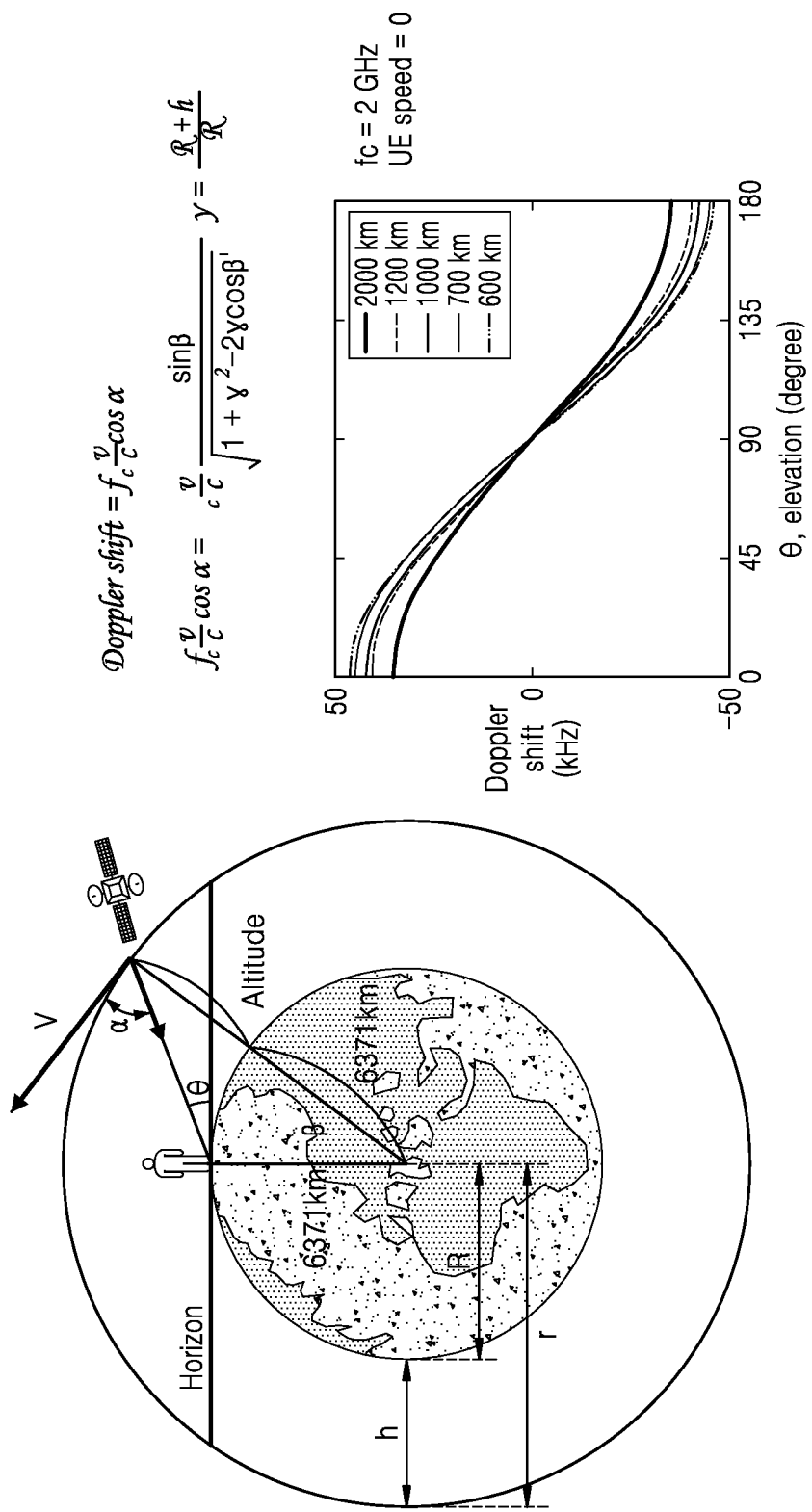
FIG. 17 is a diagram illustrating an equation and a result of, when a signal transmitted from a satellite is received by a user on the ground, calculating an amount of Doppler shift experienced by the signal according to an altitude and position of the satellite and a position of a terminal user on the ground according to an embodiment of the disclosure.

FIG. 17 is a diagram illustrating an equation and a result of, when a signal transmitted from a satellite is received by a user on the ground, calculating an amount of Doppler shift experienced by the signal according to an altitude and position of the satellite and a position of a terminal user on the ground according to an embodiment of the disclosure.

Referring to FIG. 17, R denotes the radius of the Earth, h denotes the altitude of the satellite, v denotes the velocity at which the satellite orbits the Earth, and $f_c$ denotes the frequency of the signal. The velocity of the satellite may be calculated from the altitude of the satellite. This is the velocity at which the gravitational force that pulls the Earth toward the satellite is equal to the centripetal force generated as the satellite orbits, and may be calculated as shown in FIG. 18.

Figure 18:
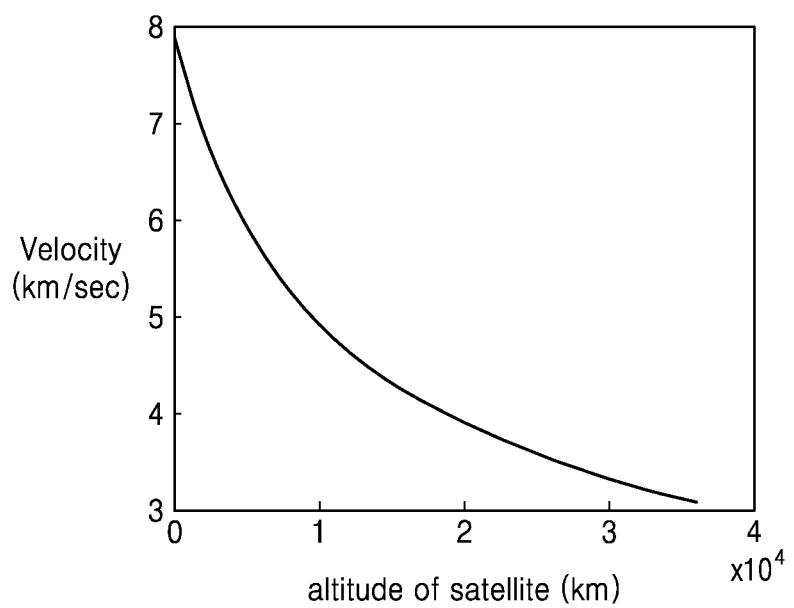
FIG. 18 is a diagram illustrating a velocity of a satellite, which is calculated from an altitude of the satellite according to an embodiment of the disclosure.

FIG. 18 is a diagram illustrating the velocity of the satellite, which is calculated from the altitude of the satellite according to an embodiment of the disclosure.

Referring to FIG. 18, as may be seen from FIG. 17, because a is determined by an elevation angle θ, the value of the Doppler shift is determined according to the elevation angle θ.

Figure 19:
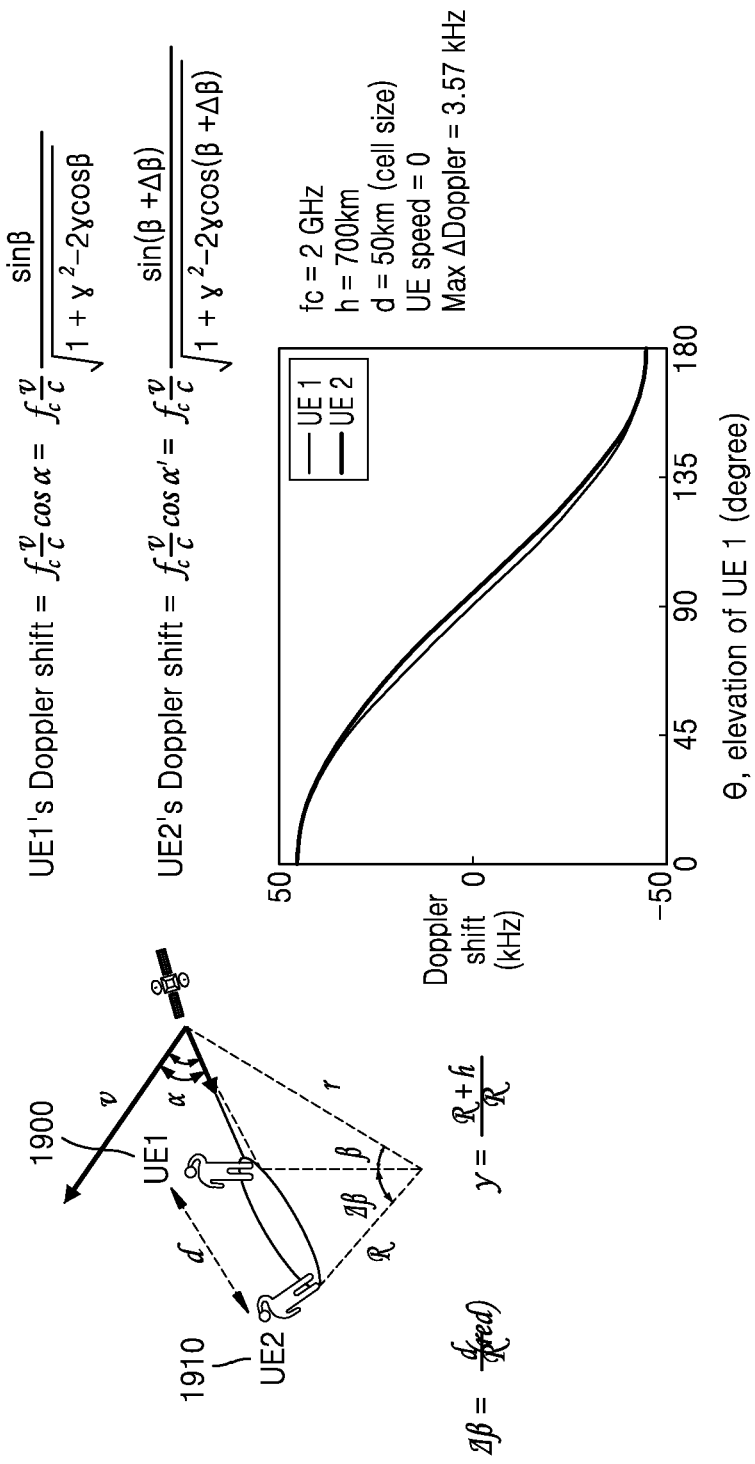
FIG. 19 is a diagram illustrating Doppler shifts experienced by different terminals within one beam that a satellite transmits to the ground according to an embodiment of the disclosure.

FIG. 19 is a diagram illustrating Doppler shifts experienced by different UEs within one beam that a satellite transmits to the ground according to an embodiment of the disclosure.

Referring to FIG. 19, Doppler shifts experienced by UE1 1900 and UE2 1910 according to the elevation angle θ are calculated, respectively. The result is obtained on the assumption that the center frequency is 2 GHz, the altitude of the satellite is 700 km, the diameter of one beam is 50 km on the ground, and the speed of the UE is 0. Also, the Doppler shift calculated in the disclosure ignores the effect of the Earth's rotation velocity. This may be regarded as having a small effect because the Earth's rotation velocity is slower than the velocity of the satellite.

Figure 20:
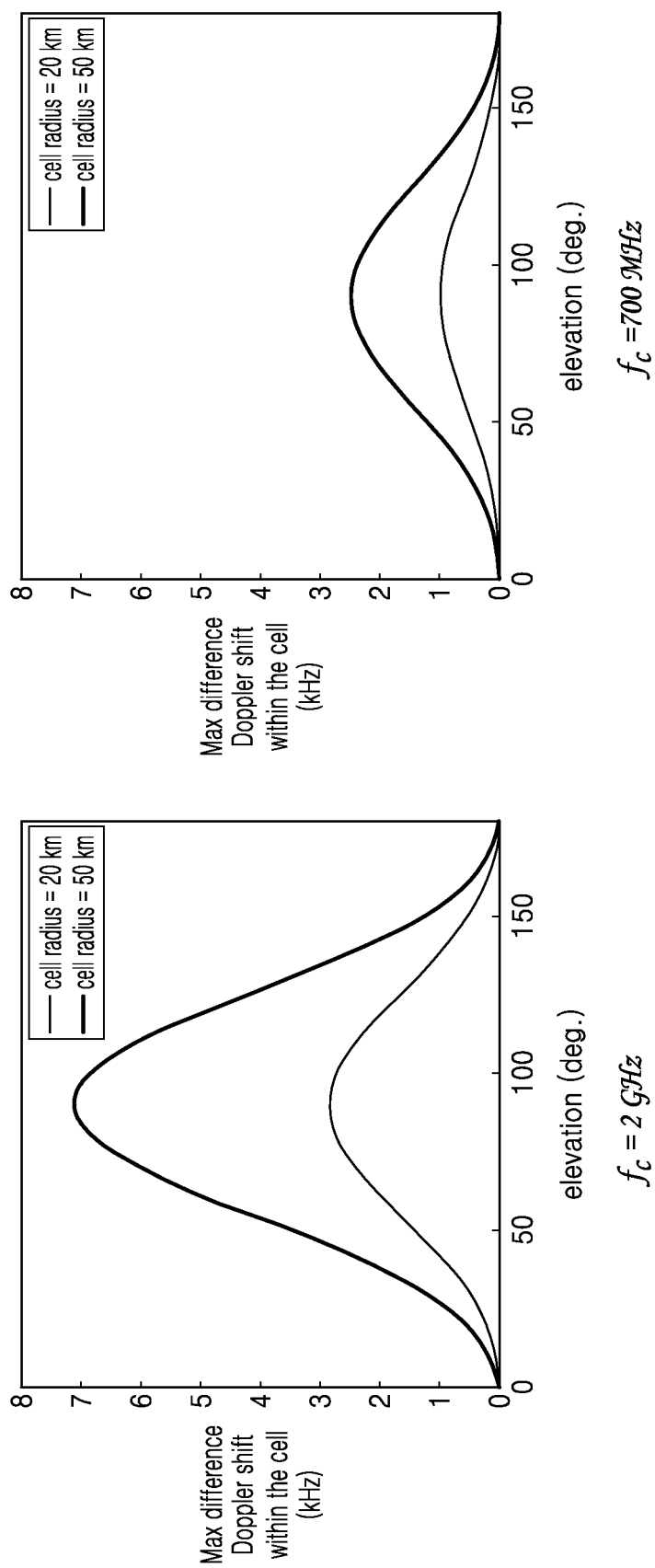
FIG. 20 is a diagram illustrating a difference in Doppler shifts occurring within one beam according to positions of a satellite determined from elevation angles according to an embodiment of the disclosure.

FIG. 20 is a diagram illustrating a difference in Doppler shift occurring within one beam according to positions of a satellite determined from elevation angles according to an embodiment of the disclosure.

Referring to FIG. 20, when the satellite is located directly above the beam, that is, when the elevation angle is 90 degrees, it may be confirmed that the difference in Doppler shift within the beam (or cell) is greatest. This may be because, when the satellite is above the center, the Doppler shift values at one end and the other end of the beam have a positive value and a negative value, respectively.

On the other hand, in satellite communication, because the satellite is far from the user on the ground, a great latency occurs, compared with the terrestrial network communication.

Figure 21:
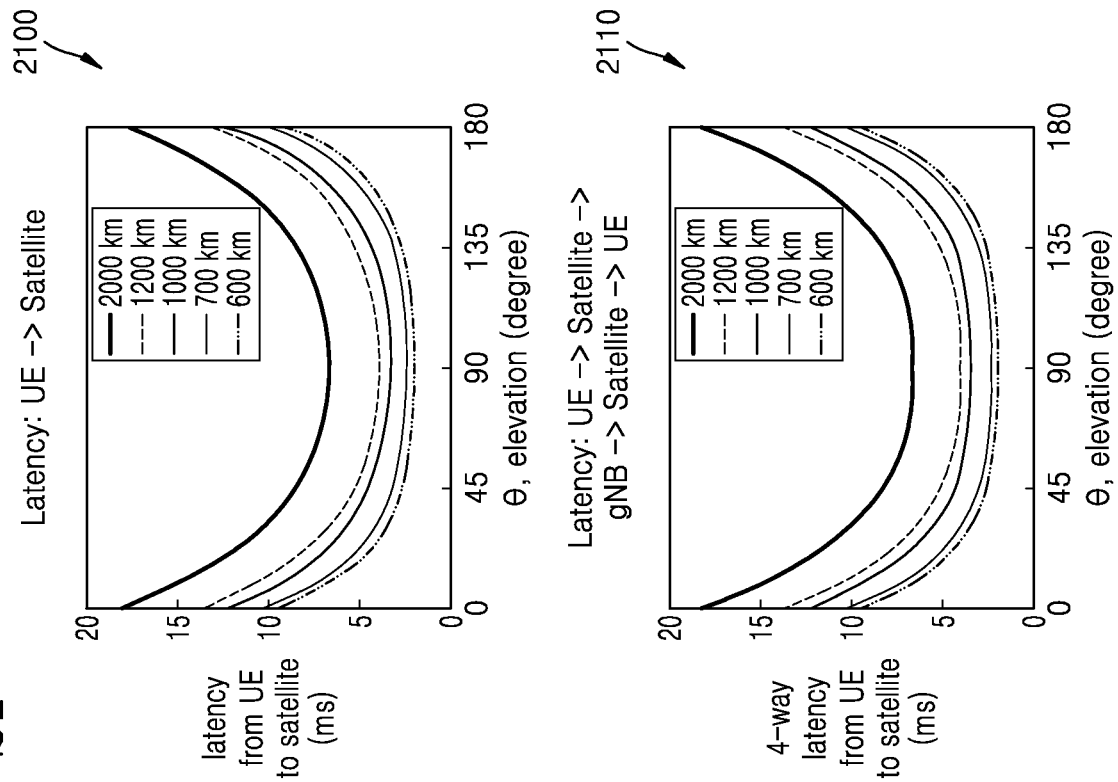
FIG. 21 is a diagram illustrating a latency from a terminal to a satellite and a round trip time between a terminal, a satellite, and a base station, according to positions of the satellite determined according to elevation angles according to an embodiment of the disclosure.
Figure 21:
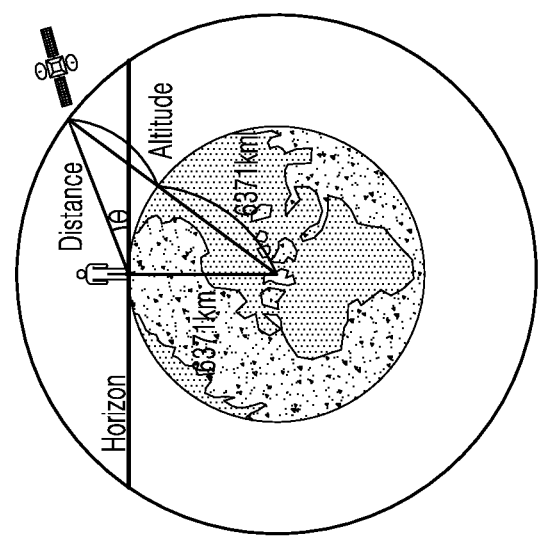

FIG. 21 is a diagram illustrating a latency from the UE to the satellite and a round trip time between the UE, the satellite, and the base station, according to positions of the satellite determined according to elevation angles according to an embodiment of the disclosure.

Referring to FIG. 21, a graph 2100 denotes the latency from the UE to the satellite, and a graph 2110 denotes the round trip time between the UE, the satellite, and the base station. At this time, it was assumed that the latency between the satellite and the base station is equal to the latency between the UE and the satellite.

Figure 22:
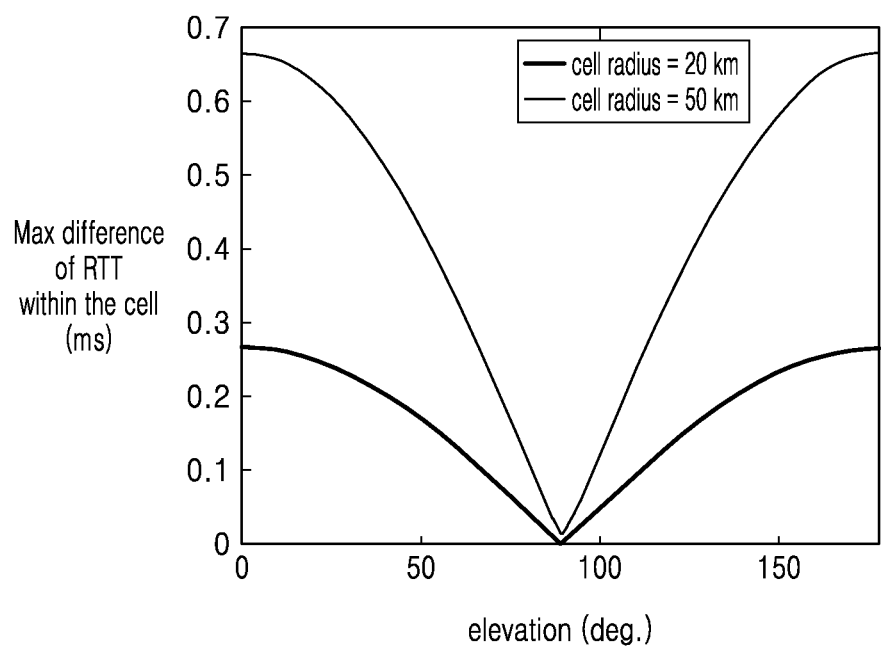
FIG. 22 is a diagram illustrating a maximum difference in variations of a round trip time according to positions of a user within one beam according to an embodiment of the disclosure.

FIG. 22 is a diagram illustrating a maximum difference in variations of a round trip time according to positions of a user within one beam according to an embodiment of the disclosure.

Referring to FIG. 22, when the beam radius (or cell radius) is 20 km, the difference in the round trip time to the satellite experienced differently by UEs at different positions within the beam according to the position of the satellite is about 0.28 ms or less.

In satellite communication, the phrase "the UE transmits and receives a signal to and from the base station" may mean that the signal is transmitted through the satellite. That is, in the downlink, the satellite receives the signal transmitted to the satellite by the base station and then transmits the signal to the UE. In the uplink, the satellite receives the signal transmitted by the UE and then transmits the signal to the base station. After the satellite receives the signal, the satellite may transmit the received signal after only performing frequency shift thereon, or may transmit the received signal after performing signal processing such as decoding and re-encoding based on the received signal.

In the case of the LTE or NR, the UE may access the base station through the following procedure.

Operation 1: The UE receives an SS (or an SSB), which may include a broadcast signal) from the base station. The SS may include a PSS, an SSS, and a PBCH. The SS may include information such as slot boundaries, frame numbers, downlink and uplink configurations of signals transmitted by the base station. Also, the UE may obtain a subcarrier offset, scheduling information for transmission of system information, etc. through the SS.

Operation 2: The UE receives system information (SIB) from the base station. The SIB may include information for performing initial access and random access. The information for performing the random access may include resource information for transmitting a random access preamble.

Operation 3: The random access preamble (or message 1 (msg 1)) is transmitted to a random access resource set in operation 2. The preamble may be a signal determined based on the information set in operation 2 by using a preset sequence. The base station receives a preamble transmitted by the UE. The base station attempts to receive the preamble configured in the resource set by the base station itself without knowing which UE has transmitted the preamble. When the reception is successful, the base station may know that at least one UE has transmitted the preamble.

Operation 4: When the preamble is received in operation 3, the base station transmits a RAR (or message 2 (msg2)) in response thereto. The UE, which has transmitted the random access preamble in operation 3, may attempt to receive the RAR transmitted by the base station in operation 4. The RAR is transmitted on a PDSCH, and a PDCCH that schedules the PDSCH is transmitted together or in advance. A CRC scrambled by an RA-RNTI is added to DCI that schedules the RAR, and the DCI (and the CRC) is channel-coded, is mapped to the PDCCH, and is then transmitted. The RA-RNTI may be determined based on time and frequency resources in which the preamble is transmitted in operation 3.

The maximum time limit until the UE having transmitted the random access preamble in operation 3 receives the RAR in operation 4 may be set in the SIB transmitted in operation 2. This may be set limitedly, for example, up to 10 ms or 40 ms. That is, when the UE having transmitted the preamble in operation 3 does not receive the RAR within a time determined based on, for example, the set maximum time limit of 10 ms, the UE may transmit the preamble again. The RAR may include scheduling information for allocating a resource of a signal to be transmitted by the UE in subsequent operation 5.

Figure 23:
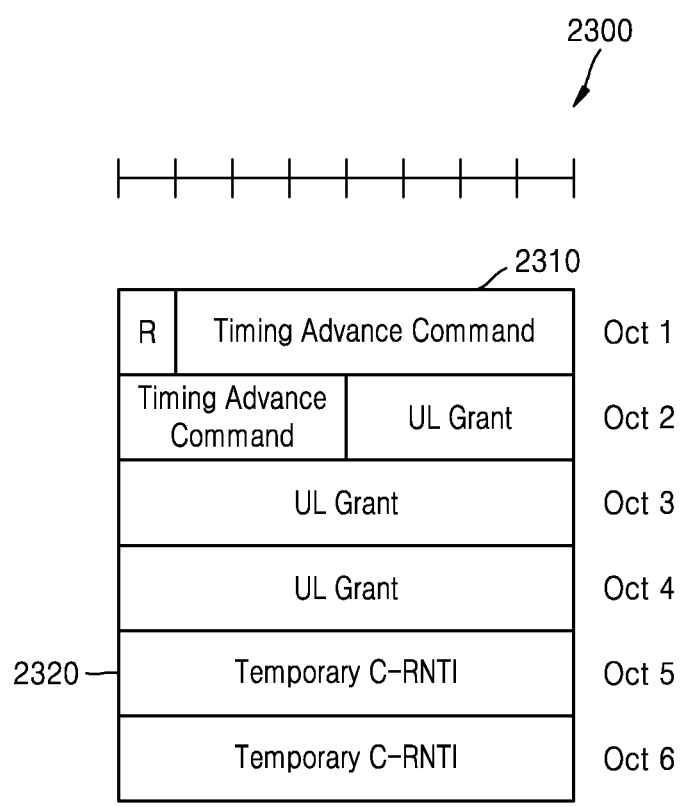
FIG. 23 is a diagram illustrating an example of an information structure of a random access response (RAR) according to an embodiment of the disclosure.

FIG. 23 is a diagram illustrating an example of an information structure of a RAR according to an embodiment of the disclosure.

Referring to FIG. 23, a RAR 2300 may be, for example, a MAC PDU. The RAR 2300 may include information 2310 about timing advance (TA) to be applied by the UE and a temporary C-RNTI 2320 to be used from the next operation.

Operation 5: The UE having received the RAR in operation 4 transmits message 3 (msg3) to the base station according to the scheduling information included in the RAR. The UE may transmit msg3 by including a unique ID value of the UE therein. The base station may attempt to receive msg3 according to the scheduling information transmitted by the base station in operation 4.

Operation 6: The base station receives msg3, confirms ID information of the UE, generates message 4 (msg4) including the ID information of the UE, and transmits msg4 to the UE. After the UE has transmitted msg3 in operation 5, the UE may attempt to receive msg4 to be transmitted in operation 6. The UE having received msg4 may compare an ID value included in msg4 after decoding with an ID value transmitted by the UE in operation 5 to confirm whether the base station has received msg3 transmitted by the UE. There may be a time limit until the UE receives msg4 in operation 6 after the UE transmits msg3 in operation 5. This maximum time may also be set from the SIB in operation 2.

When the initial access procedure using the above operations is applied to satellite communication, a propagation delay time required for satellite communication may become an issue. For example, the UE may transmit the random access preamble (or PRACH preamble) in operation 3, and the period (random access window) for which the RAR may be received in operation 4, that is, the maximum time required to receive the RAR may be set through ra-ResponseWindow. However, in the conventional LTE or 5G NR system, the maximum time may be set up to about 10 ms.

Figure 24:
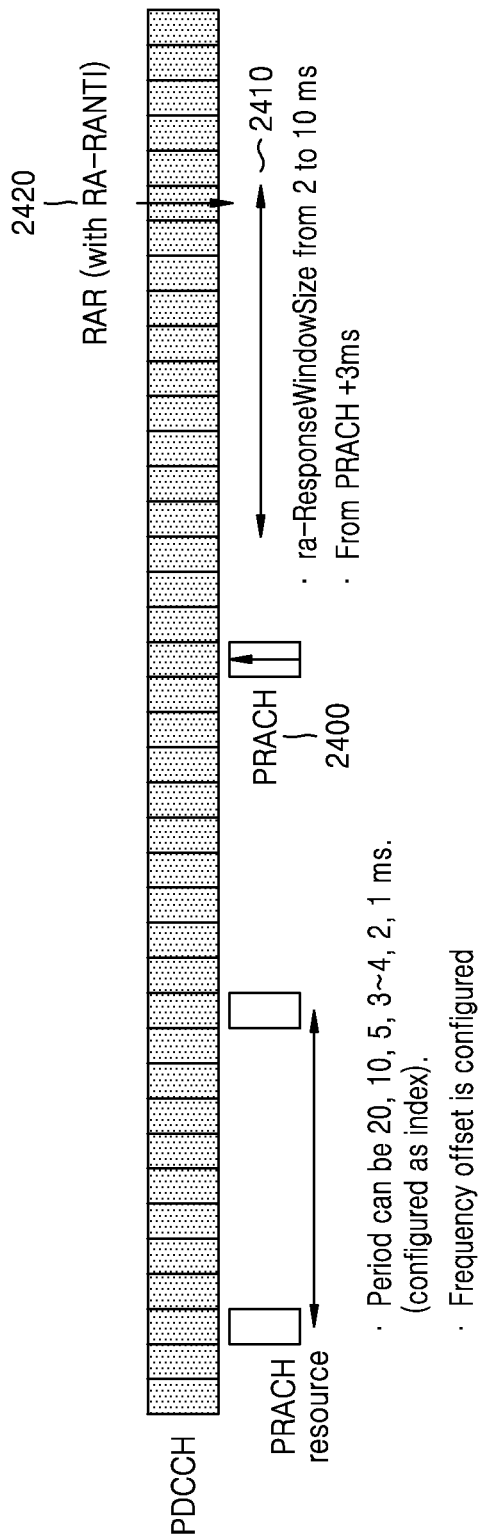
FIG. 24 is a diagram illustrating an example of a relationship between a physical random access channel (PRACH) preamble configuration resource and a RAR reception time in a long term evolution (LTE) system according to an embodiment of the disclosure.

FIG. 24 is a diagram illustrating an example of a relationship between a PRACH preamble configuration resource and a RAR reception time in an LTE system according to an embodiment of the disclosure.

Figure 25:
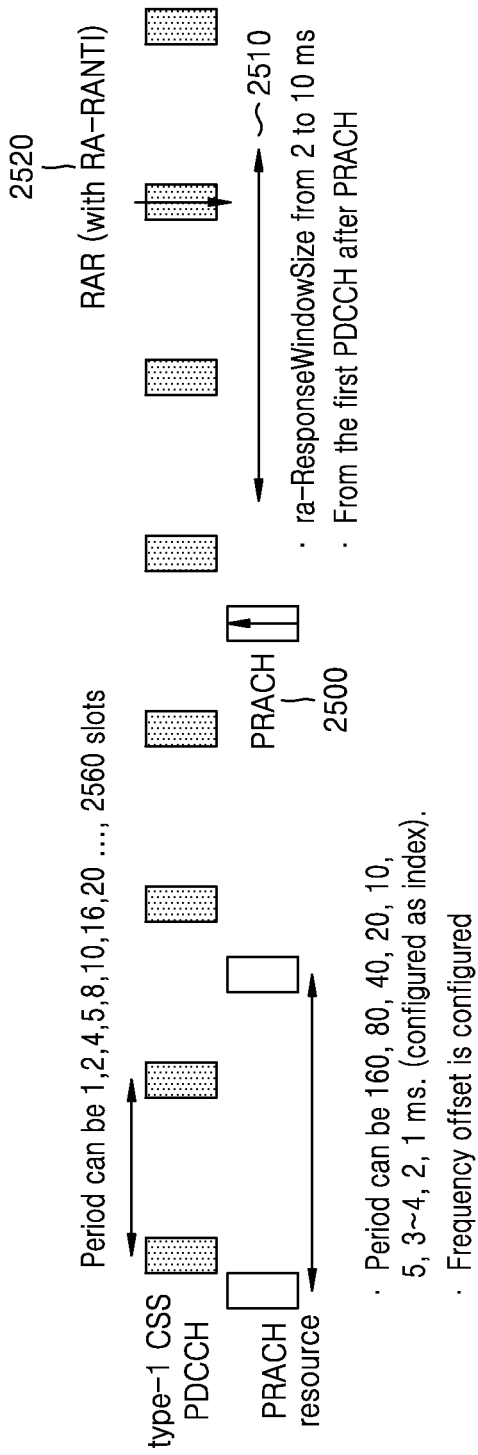
FIG. 25 is a diagram illustrating an example of a relationship between a PRACH preamble configuration resource and a RAR reception time in a 5G NR system according to an embodiment of the disclosure.

FIG. 25 is a diagram illustrating an example of a relationship between a PRACH preamble configuration resource and a RAR reception time in a 5G NR system according to an embodiment of the disclosure.

Referring to FIG. 24, in the case of LTE, a random access window 2410 starts 3 ms after the PRACH (random access preamble) is transmitted 2400. When a UE receives a RAR within the random access window 2420, it may be determined that transmission of a PRACH preamble is successful.

Referring to FIG. 25, in the case of NR, a random access window 2510 starts from a control information area for RAR scheduling that appears first after a PRACH (random access preamble) is transmitted 2500. When the UE receives the RAR within the random access window 2520, it may be determined that transmission of a PRACH preamble is successful.

As an example, a TA for an uplink transmission timing in the 5G NR system may be determined as follows. First, $T_c=1/(\Delta f_{max} \cdot N_f)$, where $\Delta f_{max}=480 \cdot 10^3$ Hz and $N_f=4096$. Also, $\kappa=T_s/T_c=64$, $T_s=1/(\Delta f_{ref} \cdot N_{f,ref})$, $\Delta f_{ref}=15 \cdot 10^3$ Hz, and $N_{f,ref}=2048$.

Figure 26:
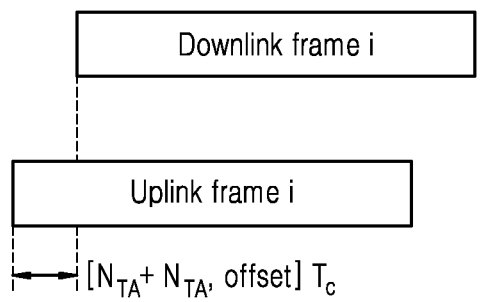
FIG. 26 is a diagram illustrating an example of a downlink frame timing and an uplink frame timing in a terminal according to an embodiment of the disclosure.

FIG. 26 is a diagram illustrating an example of a downlink frame timing and an uplink frame timing in a UE according to an embodiment of the disclosure.

Referring to FIG. 26, the UE may advance an uplink frame by $T_{TA}$ ($=(N_{TA}+N_{TA,offset})T_C$) based on a downlink frame timing, and may perform uplink transmission. The value of $N_{TA}$ may be transmitted through RAR or may be determined based on MAC CE, and $N_{TA,offset}$ may be set in the UE or may be determined based on a preset value.

The RAR of the 5G NR system may indicate $T_A$. In this case, $T_A$ may indicate one value from among 0, 1, 2, . . . , 3846. In this case, when the SCS of the RAR is $2^\mu \cdot 15$ kHz, $N_{TA}$ is determined as $T_A \cdot 16 \cdot 64/2^\mu$. After the UE completes the random access process, the UE may receive an indication of a change value of $T_A$ from the base station. The change value of $T_A$ may be indicated through MAC CE. $T_A$ information indicated through MAC CE may indicate one value from among 0, 1, 2, . . . , 63. This is added to or subtracted from the existing TA value and used to calculate a new TA value. As a result, the TA value may be newly calculated as $N_{TA\_NEW}=N_{TA\_old}+(T_A-31)16 \cdot 64/2^\mu$. The UE may apply the indicated TA value to uplink transmission after a certain time.

Figure 27A:
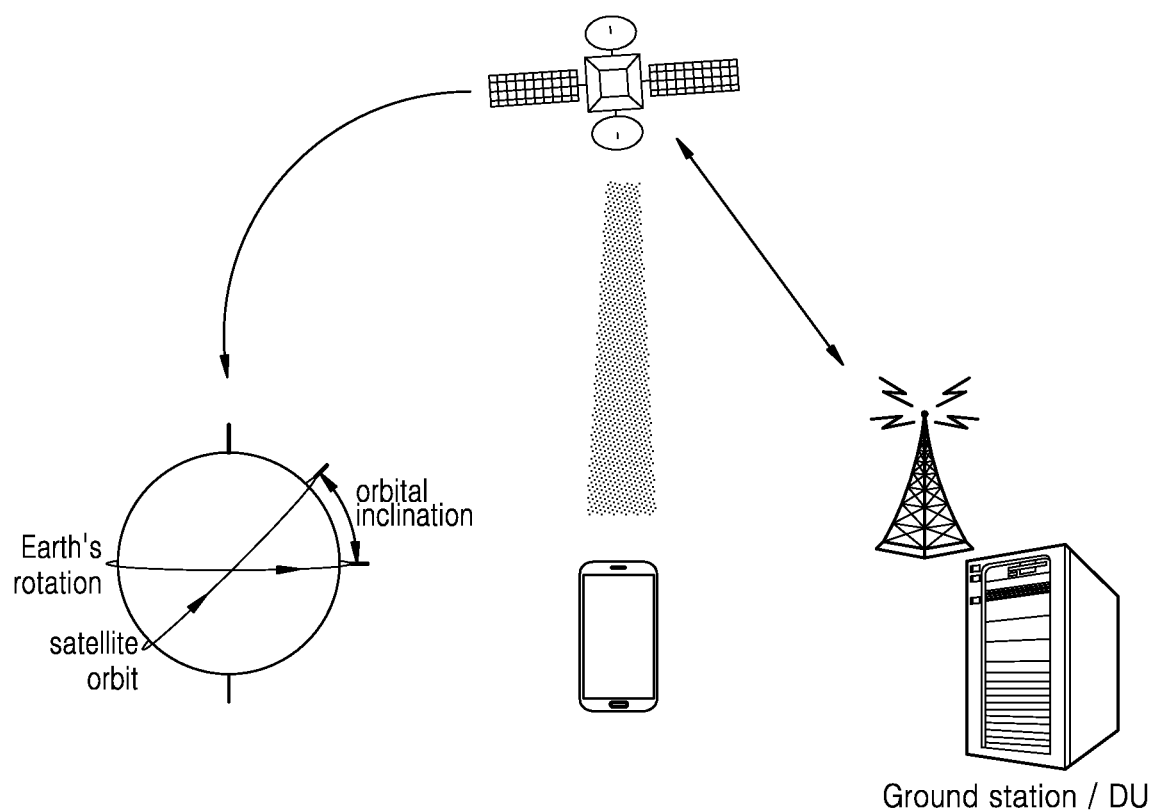
FIG. 27A is a diagram illustrating an example of a continuous movement of a satellite with a terrestrial terminal or a terminal located on Earth as the satellite revolves around the Earth along a satellite orbit according to an embodiment of the disclosure.

FIG. 27A is a diagram illustrating an example of the continuous movement of a satellite on the ground or in a UE located on the Earth as the satellite revolves around the Earth along a satellite orbit according to an embodiment of the disclosure.

Referring to FIG. 27A, because the distance between the UE and the satellite changes according to the elevation angle at which the UE looks at the satellite, the propagation delay time between the UE, the satellite, and the base station changes.

Figure 27B:
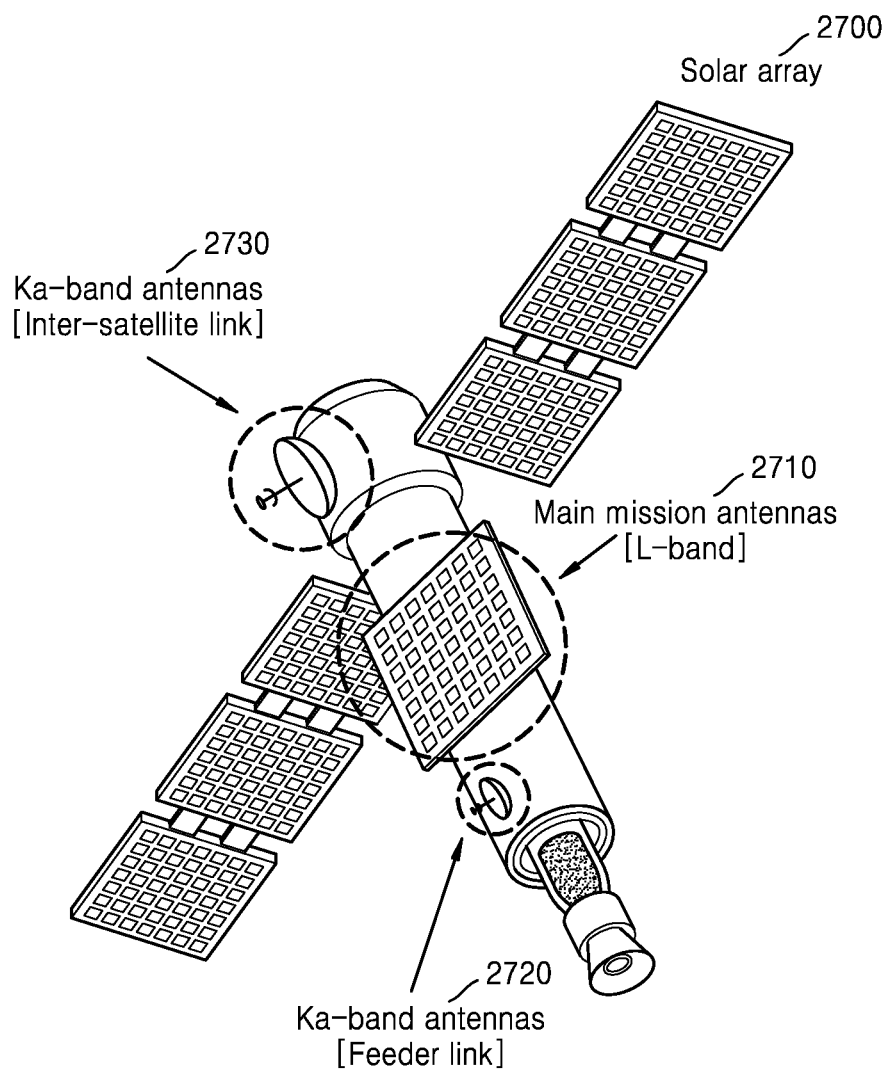
FIG. 27B is a diagram illustrating an example of a structure of an artificial satellite according to an embodiment of the disclosure.

FIG. 27B is a diagram illustrating an example of a structure of an artificial satellite according to an embodiment of the disclosure.

Referring to FIG. 27B, the satellite may include a solar panel or a solar array 2700 for photovoltaic or solar power generation, a main mission antenna 2710 for communication with a UE, a feeder link antenna 2720 for communication with a ground station, an inter-satellite link antenna 2730 for communication for inter-satellite communication, and a processor that controls transmission and reception and performs signal processing. When inter-satellite communication is not supported according to the satellite, an antenna for inter-satellite signal transmission and reception may not be disposed. Although FIG. 27B illustrates that an L-band of 1 GHz to 2 GHz is used for communication with the UE, high-frequency bands such as a K-band (18 GHz to 26.5 GHz), a Ka-band (26.5 GHz to 40 GHz), and a Ku-band (12 GHz to 18 GHz) may also be used.

In a satellite system, in order for uplink signals transmitted from different UEs to simultaneously arrive at the base station for time synchronization, time points for transmitting an uplink signal may be set differently according to a position of each UE. TA is used for this purpose. For example, the TA is used to control an uplink timing, for example, an uplink frame timing with respect to a downlink timing, for example, a downlink frame timing.

Also, in various embodiments of the disclosure, the TA may be transmitted through MAC CE, for example, timing advance command MAC CE or absolute timing advance command MAC CE.

On the other hand, a message from a MAC layer transmitted to a physical layer, for example, a MAC PDU, may include one or more MAC subPDUs. The MAC sub-PDUs may each include one piece of the following information.

MAC subheader only (including padding)
MAC subheader and MAC SDU
MAC subheader and MAC CE
MAC subheader and padding MAC SDUs have a variable size, and each MAC subheader may correspond to MAC SDU, MAC CE, or padding.

Figure 28:
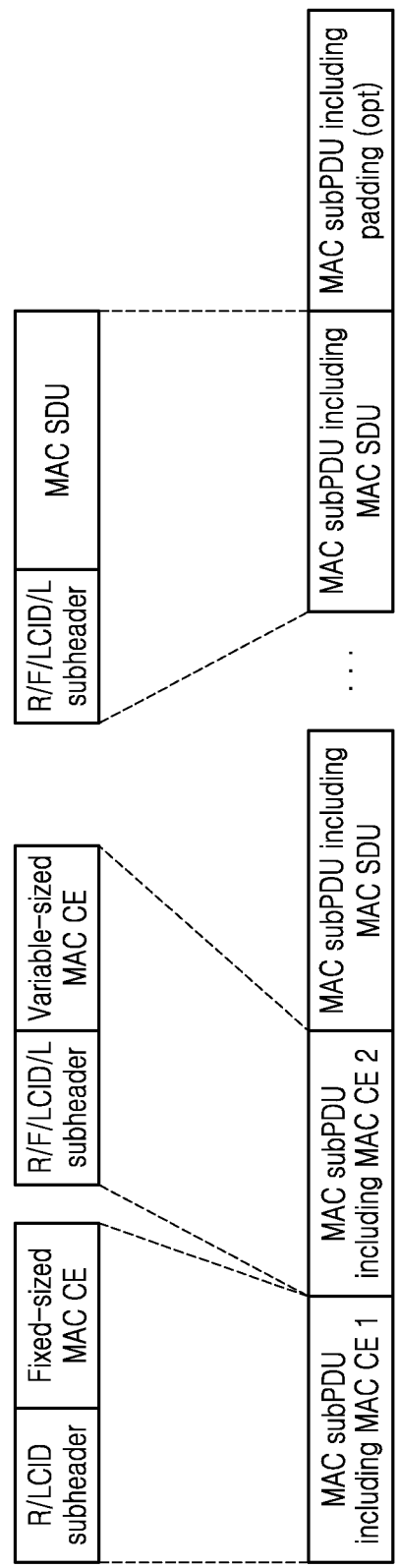
FIG. 28 is a diagram schematically illustrating an example of a message transmitted from a media access control (MAC) layer to a physical layer in a downlink in a communication system, according to an embodiment of the disclosure.
Figure 29:
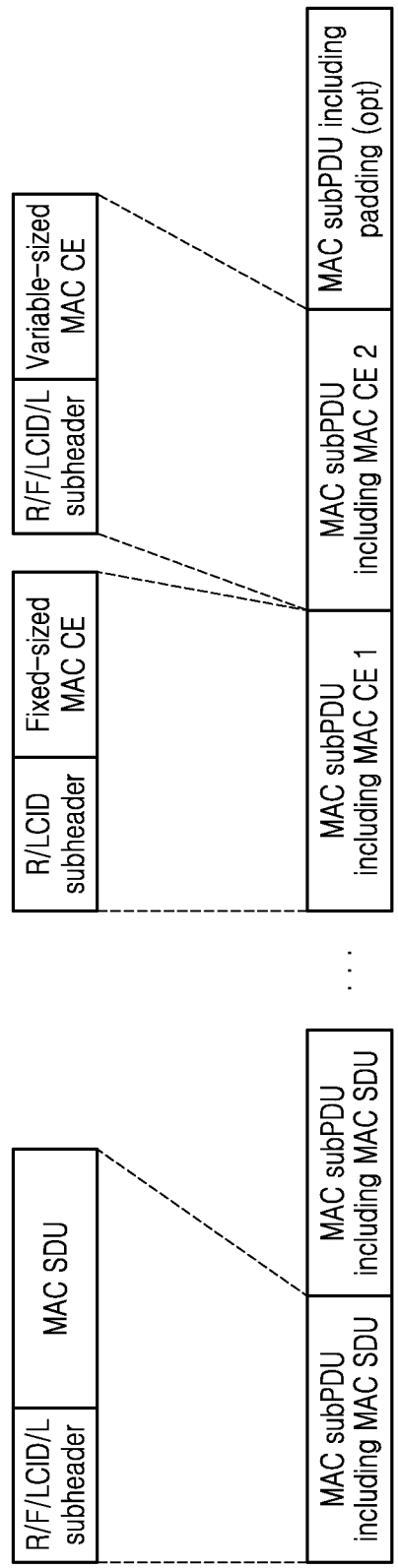
FIG. 29 is a diagram schematically illustrating an example of a message transmitted from a MAC layer to a physical layer in an uplink in a communication system, according to an embodiment of the disclosure.

On the other hand, a message from a MAC layer transmitted to a physical layer, for example, a MAC PDU, may be configured as illustrated in FIGS. 28 and 29 in the case of downlink and uplink, respectively.

An example of a message transmitted from a MAC layer to a physical layer in a downlink in a communication system, according to various embodiments of the disclosure, will be described with reference to FIG. 28.

FIG. 28 is a diagram schematically illustrating an example of a message transmitted from a MAC layer to a physical layer in a downlink in a communication system, according to an embodiment of the disclosure.

Referring to FIG. 28, the example of the message transmitted from the MAC layer to the physical layer in the downlink may be a downlink MAC PDU (DL MAC PDU). In FIG. 28, a MAC subPDU including MAC CE 1 includes an R/LCID subheader and a fixed-sized MAC CE, and a MAC subPDU including MAC CE 2 includes an R/F/LCID/L subheader and a variable-sized MAC CE. Also, a MAC subPDU including a MAC SDU includes an R/F/LCID/L subheader and a MAC SUD.

In FIG. 28, LCID represents a logical channel ID field. The LCID field indicates an instance of the corresponding MAC SDU, a type of the corresponding MAC CE, or padding. This will be described in detail in Tables 23 and 24 below. Table 23 below shows LCID values for DL-SCH, and Table 24 shows LCID values for UL-SCH. One LCID field is present for each MAC subheader, and the size of the LCID field is 6 bits. When the LCID field is set to, for example, "34," one additional octet is present in a MAC subheader including an eLCID field and follows the octet including the LCID field. When the LCID field is set to, for example, "33," two additional octets are present in a MAC subheader including an eLCID field and follow the octet including the LCID field.

Also, the eLCID represents an extended logical channel ID field and indicates the logical channel instance of the corresponding MAC SDU or the type of the corresponding MAC CE. The size of the eLCID field is 8 bits or 16 bits.

Also, L represents a length field, and the length field indicates the length of the corresponding MAC SDU or the variable-sized MAC CE. One length field is present for each MAC subheader except for subheaders corresponding to MAC SDUs including the fixed-sized MAC CEs, padding, or UL common control channel (CCCH). The size of the length field is indicated by an F field.

Also, F represents a format field and indicates the size of the length field. One F field is present for each MAC subheader except for MAC SDUs including the fixed-sized MAC CEs, padding, and UL CCCH. The size of the F field is 1 bit. For example, a value of 0 indicates 8 bits of the length field. As another example, a value of 1 indicates 16 bits of the length field.

Also, R is a reserved bit and is set to, for example, "0."

As illustrated in FIG. 28, MAC CEs, for example, MAC CE 1 and MAC CE 2 are disposed together, and MAC subPDU(s) including MAC CE(s) are disposed before MAC subPDU including MAC SDU and MAC subPDU including padding. The size of the padding may be zero.

Next, an example of a message transmitted from a MAC layer to a physical layer in an uplink in a communication system, according to various embodiments of the disclosure, will be described with reference to FIG. 29.

FIG. 29 is a diagram schematically illustrating an example of a message transmitted from a MAC layer to a physical layer in an uplink in a communication system, according to an embodiment of the disclosure.

Referring to FIG. 29, the example of the message transmitted from the MAC layer to the physical layer in the uplink may be an uplink MAC PDU (UL MAC PDU). In FIG. 29, a MAC subPDU including MAC CE 1 includes an R/LCID subheader and a fixed-sized MAC CE, and a MAC subPDU including MAC CE 2 includes an R/F/LCID/L subheader and a variable-sized MAC CE. Also, a MAC subPDU including a MAC SDU includes an R/F/LCID/L subheader and a MAC SUD.

As illustrated in FIG. 29, MAC CEs, for example, MAC CE 1 and MAC CE 2 are disposed together, and MAC subPDU(s) including MAC CE(s) are disposed after MAC subPDU including MAC SDU and are disposed before MAC subPDU including padding. The size of the padding may be zero.

In FIGS. 28 and 29, the LCID or eLCID included in the subheader of the MAC layer may indicate the type of the MAC SDU or MAC CE to be transmitted. The mapping between the index of the LCID and the type of the MAC SDU or MAC CE may be shown in Table 23 below, and the mapping between the index of the eLCID and the type of the MAC SDU or MAC CE may be shown in Table 24 below. In various embodiments of the disclosure, the LCID may indicate an instance of a logical channel of MAC SDU, a type of MAC CE, or padding information of a downlink shared channel (DL-SCH) and an uplink shared channel (UL-SCH). One LCID may be mapped to each MAC subheader, and the LCID may be implemented with, for example, 6 bits.

TABLE 23

| Codepoint/Index | LCID values |
| --- | --- |
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

TABLE 24

| Codepoint | Index | LCID values |
| --- | --- | --- |
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

Next, an example of a format of a MAC payload of a RAR or a MAC payload of MsgB (fallback RAR) in a communication system, according to various embodiments of the disclosure, will be described with reference to FIG. 30.

Figure 30:
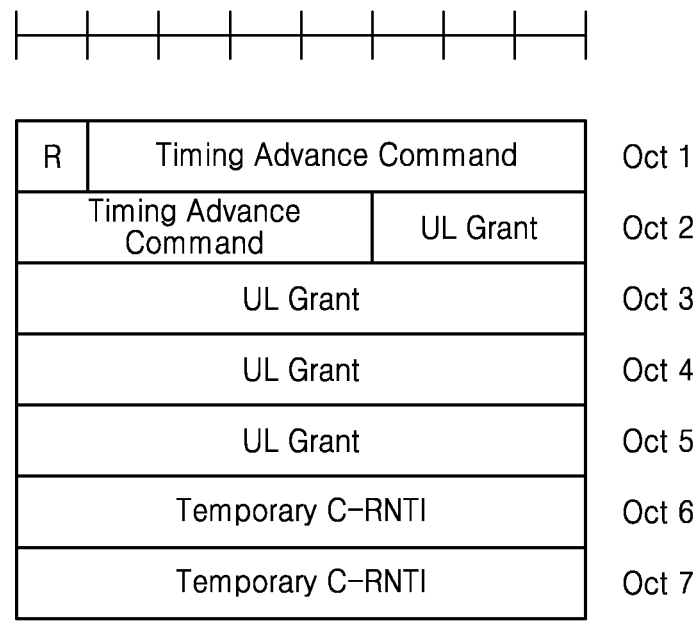
FIG. 30 is a diagram schematically illustrating an example of a format of a MAC payload of a RAR or a MAC payload of MsgB in a communication system, according to an embodiment of the disclosure.

FIG. 30 is a diagram schematically illustrating an example of a format of a MAC payload of a RAR or a MAC payload of MsgB in a communication system, according to an embodiment of the disclosure.

Referring to FIG. 30, as an example, the MAC payload of the RAR may be referred to as a MAC RAR, and the MAC RAR may include the following fields.

R field: The R field is a reserved bit and may be set to, for example, "0."

Timing advance command field: The timing advance command field indicates an index value TA used to control the amount of timing adjustment to be applied by a MAC entity. The size of the timing advance command field is, for example, 12 bits.

UL grant field: The UL grant field indicates resources to be used in the uplink, and the size of the UL grant field is, for example, 27 bits.

Temporary C-RNTI field: The temporary C-RNTI field indicates a temporary identifier used by a MAC entity during random access, and the size of the temporary C-RNTI field is, for example, 16 bits.

Various embodiments of the disclosure propose a method and apparatus, performed by a UE, for transmitting and receiving a signal based on a position, signal strength, or TA in a satellite communication system.

Also, various embodiments of the disclosure propose a method and apparatus for transmitting and receiving a signal based on TA when a non-terrestrial network (NTN) is considered in a communication system.

In addition, various embodiments of the disclosure propose a method and apparatus, performed by a UE, for performing an uplink transmission operation based on TA in a communication system. Therefore, the base station may be required to transmit information for assisting the UE in applying the TA in advance, or to receive the uplink signal transmitted by the UE after the UE applies the TA.

In addition, various embodiments of the disclosure consider a case where a UE transmits and receives a signal to and from a base station through a satellite, and accordingly, propose a method and apparatus, performed by a UE, for transmitting and receiving a signal by applying TA based on information provided from a base station and a satellite or global navigation satellite system (GNSS) information in order to perform initial access, data transmission, etc.

Also, in various embodiments of the disclosure, the term "base station (BS)" may refer to, based on a type of wireless communication system, a transmit point (TP), a transmit-receive point (TRP), enhanced node B (eNodeB or eNB), a 5G base station (gNB), macrocell, femtocell, a wireless fidelity (Wi-Fi) access point (AP), or any component (or collection of components) configured to provide radio access, such as wireless-enabled devices. Base stations may provide radio access based on one or more radio protocols, for example, 5G 3GPP new radio interface/access (NR), LTE, LTE-A, HSPA, Wi-Fi 802.11a/b/g/n/ac, etc.

Also, in various embodiments of the disclosure, the term "terminal" may refer to "user equipment (UE)," "mobile station," "subscriber station," "remote terminal," "wireless terminal," "receive point," or any component such as a "user device." For convenience, the term "UE" may be used to represent a device accessing a base station in various embodiments of the disclosure, regardless of whether the UE is to be considered as a mobile device (such as a mobile phone or a smart phone) or a fixed device (such as a desktop computer or vending machine, for example).

Also, in various embodiments of the disclosure, the term "TA" may be used interchangeably with "TA information," "TA value," or "TA index."

In various embodiments of the disclosure, data or control information that the base station transmits to the UE may be referred to as a first signal, and the uplink signal associated with the first signal may be referred to as a second signal. For example, the first signal may include DCI, UL grant, a PDCCH, a PDSCH, a RAR, and the like, and the second signal associated with the first signal may include a PUCCH, a PUSCH, msg3, and the like.

Also, there may be an association between the first signal and the second signal. For example, when the first signal is a PDCCH including UL grant for uplink data scheduling, the second signal corresponding to the first signal may be a PUSCH including uplink data. In an embodiment of the disclosure, a gap between timings at which the first signal and the second signal are transmitted and received may be predefined between the UE and the base station. In another embodiment of the disclosure, a gap between timings at which the first signal and the second signal are transmitted and received may be indicated and determined by the base station, or may be determined by a value transmitted through higher layer signaling.

A satellite navigation system may also be referred to as a GNSS. The GNSS may include, for example, global positioning system (GPS) of the United States, GLONASS of Russia, Galileo of the European Union (EU), Beidou of China, and the like. The GNSS may include a regional navigation satellite system (RNSS). The RNSS may include, for example, IRNSS of India, QZSS of Japan, KPS of Korea, and the like. A signal transmitted from the GNSS may include at least one of auxiliary navigation information, information about a normal operation state of a satellite, information about a satellite timing, information about a satellite orbit, information about an altitude of a satellite, information about a reference time, or information about a variety of correction data.

In direct UE-satellite communication, the distance between the UE and the satellite and the distance between the satellite and the base station are long and the satellite continuously moves. Therefore, when a signal transmitted by the base station or the UE is received by the UE or the base station, a time offset is generated due to a propagation delay time or the like.

Therefore, various embodiments of the disclosure propose a method and apparatus by which the base station indicates time offset information so as to correct the time offset and the UE corrects the time offset. In various embodiments of the disclosure, communication between the UE, the satellite, and the base station existing on the ground is assumed, but it should be noted that a case where the satellite base station and the UE communicate with each other is not excluded.

Also, in various embodiments of the disclosure, it should be noted that the time offset may be used interchangeably with TA. In various embodiments of the disclosure, the satellite may be an object located high away from the ground, and may be a concept including an airplane, an airship, and the like.

First Embodiment

A first embodiment of the disclosure provides a method and apparatus, performed by a UE, for selecting a satellite to be connected to the UE itself or performing handover, in order for connection to a base station.

First, an operation, performed by a UE, of connecting to a terrestrial base station through a satellite in a satellite communication system according to various embodiments of the disclosure will be described with reference to FIG. 31.

Figure 31:
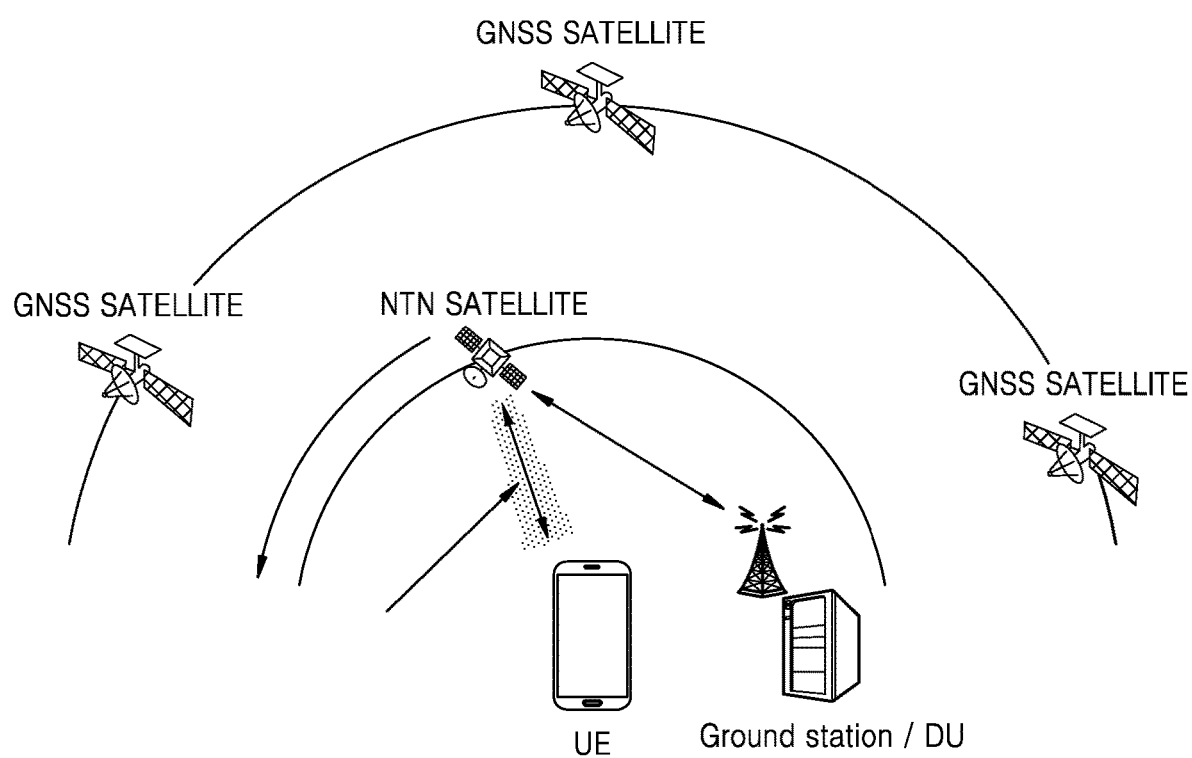
FIG. 31 is a diagram schematically illustrating that a terminal accesses a base station through one satellite in a communication system, according to an embodiment of the disclosure.

FIG. 31 is a diagram schematically illustrating an example in which a UE located on the ground connects to a ground station and a base station (gNB, eNB, or digital unit (DU)) located on the ground through a satellite according to an embodiment of the disclosure.

Referring to FIG. 31, the UE may estimate a propagation delay time and a frequency offset between the satellite and the UE based on the position of the UE and the position of the satellite, and the UE may correct the estimated propagation delay time and frequency offset and then perform an uplink transmission operation. For example, the satellite may transmit information about the position of the satellite through broadcast information, and the UE may receive the information about the position of the satellite transmitted by the satellite and compare the position of the satellite with the position of the UE itself. The UE may identify the position of the UE itself by using a GPS or the like. The method of identifying the position of the UE may be implemented in various forms, and a detailed description thereof is omitted.

The UE may estimate a propagation delay time required to transmit a radio wave from the UE to the satellite based on a result of comparing the position of the satellite with the position of the UE itself, and may calculate an uplink transmission time based on the estimated propagation delay time. For example, assuming that the UE needs to receive a downlink signal in slot n through a downlink at a specific time and transmit an uplink signal corresponding to the received downlink signal in slot n+k, the UE may transmit the uplink signal earlier than the slot n+k by a set time, for example, 2*Td. Td may correspond to the propagation delay time from the UE to the satellite, which is calculated based on the position of the satellite and the position of the UE. The propagation delay time Td may be, for example, a value obtained by dividing the distance between the UE and the satellite by the speed of light. Also, the position of the satellite may be a value calculated based on the slot n+k in which the UE transmits the uplink signal. This is because the position of the satellite in the slot n and the position of the satellite in the slot n+k may be different from each other according to the movement of the satellite.

On the other hand, in various embodiments of the disclosure, a satellite navigation system, such as a GPS, includes one or more satellites, each of which transmits a signal including information about a time, a position, etc. The UE may receive a signal from each of the one or more satellites of the satellite navigation system, and may identify the position of the UE itself based on the signal received from each of the one or more satellites.

In various embodiments of the disclosure, the NTN satellite may be a communication satellite that transmits a signal so that the UE connects to the base station. In addition, in various embodiments of the disclosure, the GNSS satellite may be a satellite that transmits a signal of a satellite navigation system. It should be noted that, in FIG. 31, the terminal is expressed as a UE, and the base station is expressed as a ground station/DU.

Figure 32:
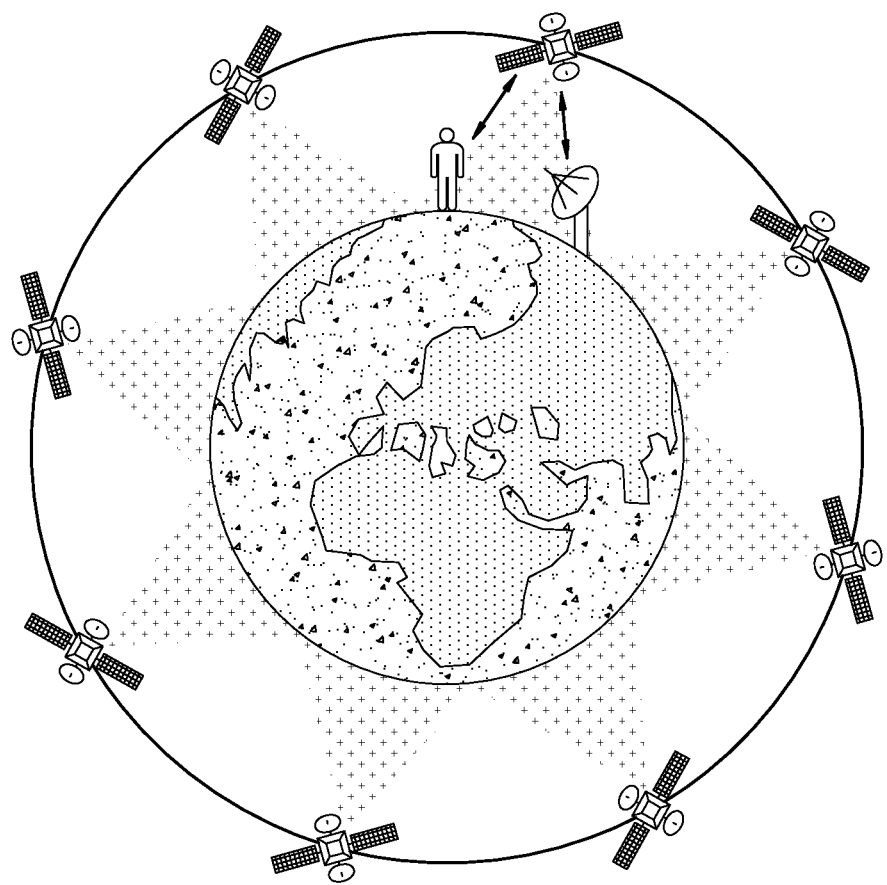
FIG. 32 is a diagram schematically illustrating that a terminal is connected to a terrestrial base station through a satellite in a communication system, according to an embodiment of the disclosure.

FIG. 32 is a diagram schematically illustrating that a UE is connected to a terrestrial base station through a satellite, like in FIG. 31, according to an embodiment of the disclosure.

Although the disclosure is described on the assumption that the UE and the base station are on the ground, the UE and the base station may be located in places other than the ground. For example, the UE may be a case where a user boards an airplane, and the base station may also be a case where all or part of the functions of the base station are mounted on an airship or the like.

Referring to FIG. 32, a plurality of satellites may transmit and receive signals to and from UEs and a base station within a coverage of each satellite while the satellites revolve around the Earth or are located around the Earth.

Figure 33:
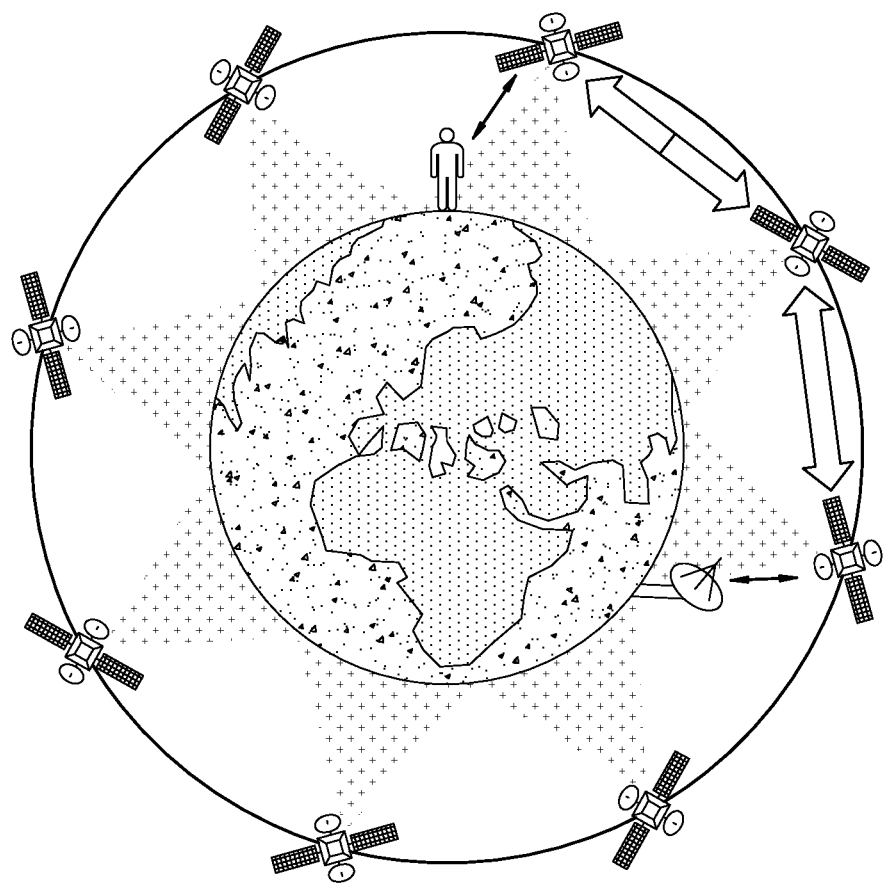
FIG. 33 is a diagram schematically illustrating an operation in which satellites transmit and receive signals with each other through an inter-satellite link (ISL) in a communication system, according to an embodiment of the disclosure.

FIG. 33 is a diagram illustrating an operation in which satellites transmit and receive signals with each other through an inter-satellite link (ISL) in a communication system, according to an embodiment of the disclosure. The ISL may be a method using radio access technologies, such as 4G or 5G, or separate technologies. Also, the ISL may use laser communication technologies by securing a straight line distance between satellites.

Referring to FIG. 33, the UE is located within the coverage of one satellite. However, when it is impossible to support the UE because the base station does not exist within the coverage of the satellite, the base station may be connected to the satellite located within the coverage through ISL, so that the UE and the base station may be connected to each other. By utilizing this, it is possible to support the UE to enable communication even in an environment where the UE and the base station are very far away from each other or the base station is not located within a certain distance from the UE. For example, when the user holding the UE is located on the sea, the base station may not be present within the coverage of the satellite connected to the UE. Therefore, in this case, the satellite connected to the UE may be connected to the satellite connected to the base station through ISL, so that the UE and the base station are connected to each other. In the disclosure, the term "connected" may mean transmitting and receiving a signal, and may mean transmitting and receiving a signal through several relays even though not directly connected.

Figure 34:
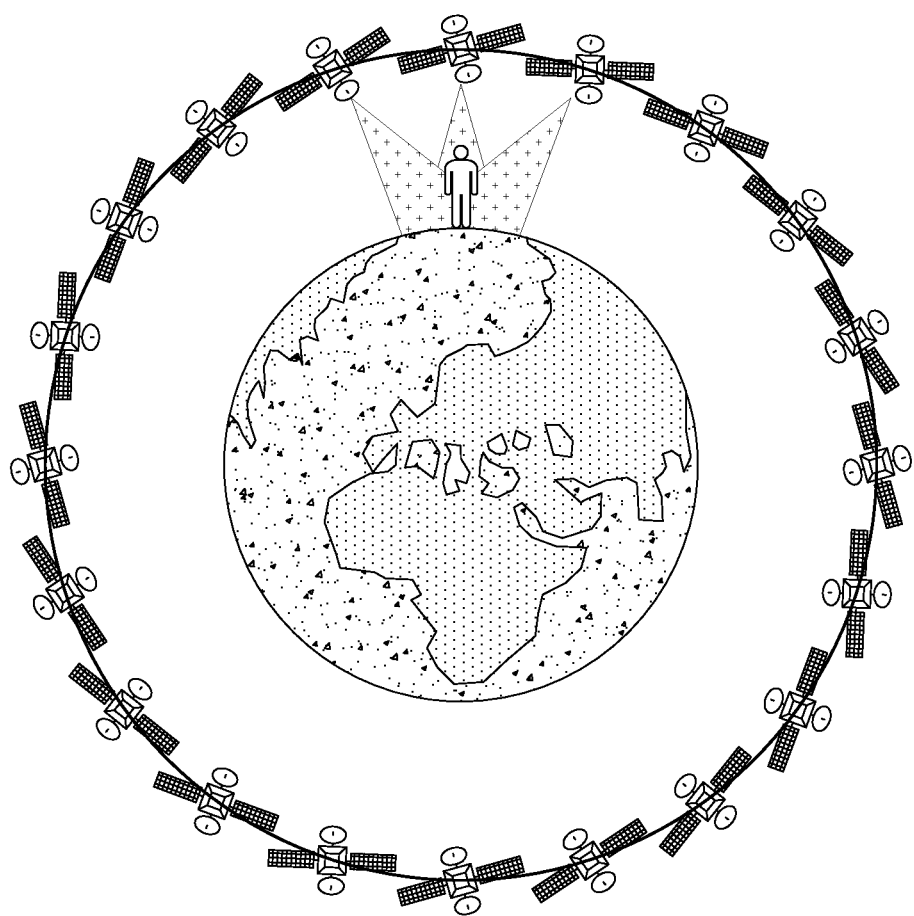
FIG. 34 is a diagram schematically illustrating that a large number of satellites are positioned around Earth to constitute a satellite communication system according to an embodiment of the disclosure.

FIG. 34 is a diagram schematically illustrating that a large number (hundreds to tens of thousands) of satellites are positioned around the Earth to constitute a satellite communication system according to an embodiment of the disclosure.

Referring to FIG. 34, this may be a possible system as the launch price of satellites per weight has recently been lowered, and may be referred to as a mega-constellation structure. Such a system has an advantage of improving the performance of the system because, as the coverage area to be managed by each satellite becomes smaller, data may be transmitted and received with higher power in a certain area. On the other hand, when one user is continuously provided with a service, there may be a disadvantage in that a lot of handover has to be performed because a satellite in charge frequently changes.

Figure 35:
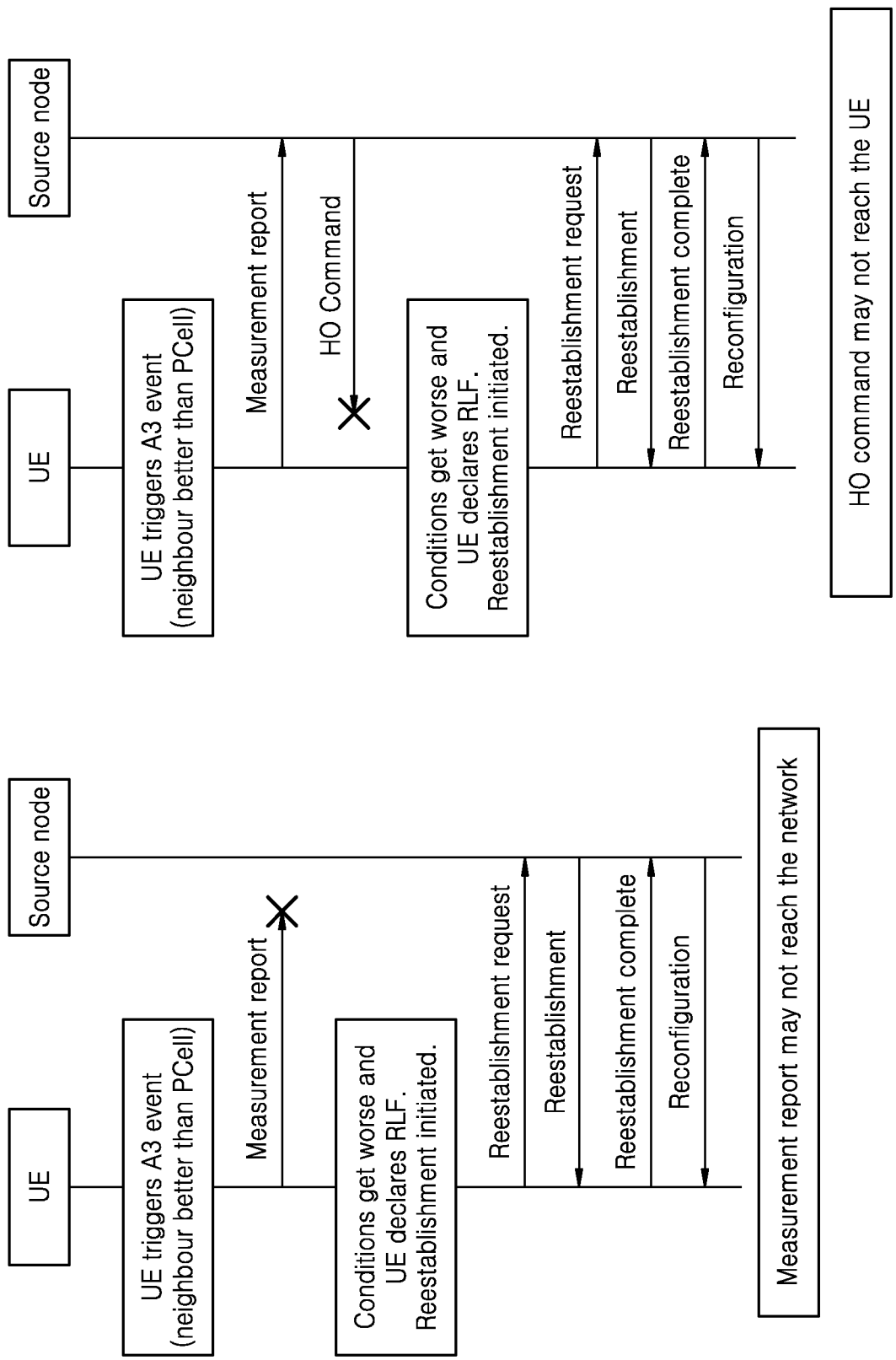
FIG. 35 is a diagram illustrating an example in which a handover failure occurs in a communication system, according to an embodiment of the disclosure.

FIG. 35 is a diagram illustrating an example in which a handover failure occurs in a communication system, according to an embodiment of the disclosure.

Referring to FIG. 35, first, there may be a situation where a UE is unable to transmit a measurement report for triggering a handover to the base station because a channel state between the UE and the base station deteriorates. In this case, because the base station does not receive a report of channel information from the UE, the handover is not performed any more. Consequently, a handover failure occurs. Second, there may a situation where, although a report of channel information is received from the UE and control information is transmitted to the UE in order to start handover, the control information for starting the handover is not transmitted to the UE because the channel state from the base station to the UE rapidly deteriorates. In this case, because the UE has not successfully received a handover command from the base station, the UE does not perform a handover procedure any more. Consequently, a handover failure occurs.

In the process of performing handover or an initial access procedure, the UE may apply at least one of the following methods or a combination thereof in order to select a satellite to be accessed. According to an embodiment of the disclosure, when the UE selects a satellite, the UE may perform an initial access procedure or handover to access the base station through the selected satellite. The phrase "the UE selects a satellite" may mean using a value provided by the satellite as a cell ID, selecting a base station connected to the satellite, accessing a frequency band used by the satellite, or selecting frequency and time resources or handover resources for initial access, which are provided by the satellite. In the disclosure, the method, performed by the UE, of identifying the position of the satellite may be to transmit, by the base station, the position of the satellite to the UE through the SIB or the like. In the SIB or the like, the path or position information (ephemeris) of the satellite may be transmitted in the format of an absolute position, a velocity vector, etc. The position information may include a time so as to indicate position information at a specific time.

Method A1: The UE may select a satellite located at a minimum distance from the UE itself based on the distance to the satellite. The UE may receive a signal from the GNSS to calculate the position of the UE itself, and may identify the positions of the satellites from the satellites. Therefore, the positions of the satellites may be calculated according to from which satellite the received signal is transmitted. Using this, the distance between the UE and each satellite may be calculated or estimated.

Method A2: The UE may select one of the satellites, the distance of which is closer to the UE. The UE may receive the transmission time and position of the satellite and calculate how quickly the satellite is approaching the UE itself. Therefore, the UE may select a satellite to be accessed, considering the position, traveling direction, velocity, and acceleration of the satellite. For example, the UE may select a satellite that approaches the UE itself the fastest from among satellites located within a certain distance.

As another example, the UE may predict and precalculate the distance between the satellite and the UE after a certain time, and may select a satellite to be accessed based on the calculated distance after the certain time. For example, the UE may select a satellite predicted to be closest to the UE after a specific time point.

Method A3: The UE may select a satellite with the smallest latency to the base station. The UE may calculate the latency from the distance to the satellite, or may calculate the latency based on a scheduling delay time (Koffset) value that the base station provides through the satellite. The Koffset value may be a value that the base station transmits through SIB. The Koffset value may be a value additionally applied in addition to timing information included in DCI when the UE determines a timing at which the UE transmits HARQ-ACK for a PDSCH or transmits a PUSCH for uplink scheduling. That is, the UE may select and access the base station (or carrier) having the smallest Koffset value that the base station provides through SIB. Alternatively, the UE may compare common TA offset values that the base station provides through SIB, and may select a carrier (or a base station, a satellite, or a beam) having the smallest value.

Method A4: The UE may receiving, from a currently connected base station, information about a base station and a satellite to be selected during handover, and may select a satellite to be accessed next.

The methods described above may be optionally applied according to the configuration of the base station. For example, the base station may set one of methods A1 to A4 through SIB or RRC, and the UE may use the method set by the base station.

Second Embodiment

A second embodiment of the disclosure provides a method and apparatus for efficiently performing conditional handover (CHO) in a satellite communication system.

Figure 36:
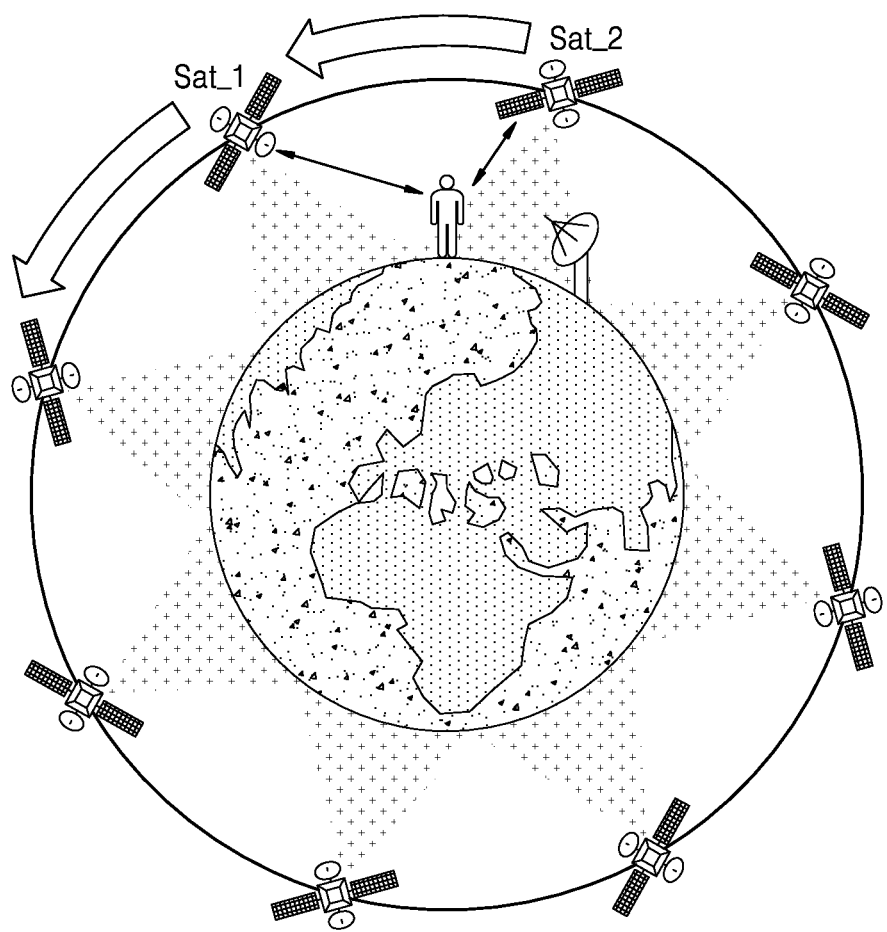
FIG. 36 is a diagram schematically illustrating that a user equipment (UE) selects a satellite to be accessed in a communication system, according to an embodiment of the disclosure.

FIG. 36 is a diagram schematically illustrating that a UE selects a satellite to be accessed in a communication system, according to an embodiment of the disclosure.

Referring to FIG. 36, the UE selects a satellite from a plurality of satellites.

Figure 37:
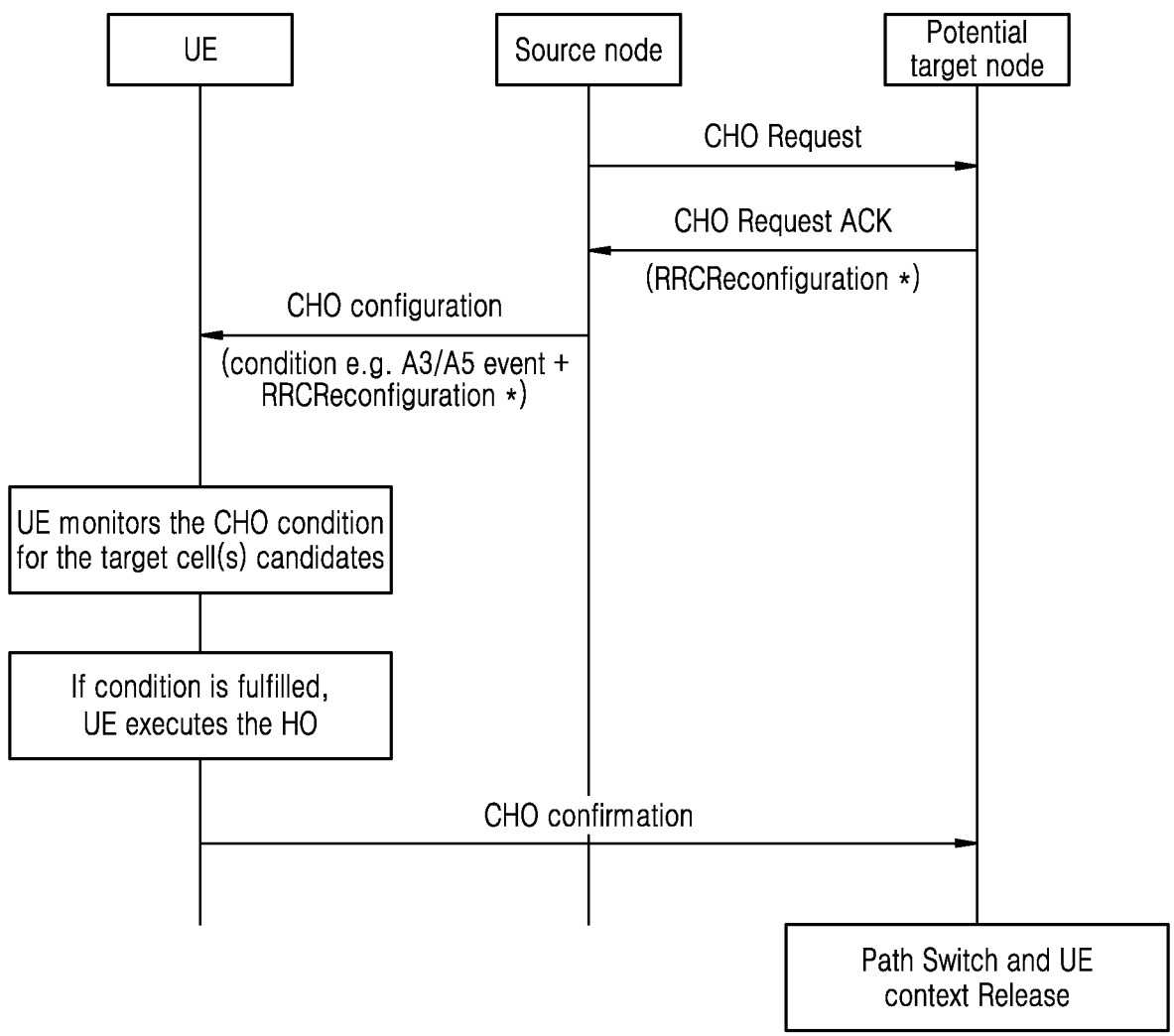
FIG. 37 is a diagram illustrating an example of a conditional handover (CHO) procedure in a communication system, according to an embodiment of the disclosure.

FIG. 37 is a diagram illustrating an example of a CHO procedure as one method of overcoming a handover failure according to an embodiment of the disclosure.

Referring to FIG. 37, the base station may perform a CHO configuration for the UE, before handover occurs, with respect to conditions in which handover may be started and the state of the base station to be handover. After the configuration, the UE may observe whether the configured CHO condition is satisfied, and may perform handover when the configured CHO condition is satisfied. The CHO may maximally prevent a handover failure case occurring in FIG. 35. Higher layer signaling configuration parameters related thereto may be the same as shown in Table 25.

TABLE 25

```
RRCReconfiguration-v1610-IEs ::=          SEQUENCE {
    otherConfig-v1610                        OtherConfig-v1610
    OPTIONAL, -- Need M
    bap-Config-r16                           SetupRelease { BAP-Config-r16 }
    OPTIONAL, -- Need M
    iab-IP-AddressConfigurationList-r16      IAB-IP-AddressConfigurationList-r16
    OPTIONAL, -- Need M
    conditionalReconfiguration-r16           ConditionalReconfiguration-r16
    OPTIONAL, -- Need M
    daps-SourceRelease-r16                   ENUMERATED {true}
    OPTIONAL, -- Need N
    t316-r16                                 SetupRelease {T316-r16}
    OPTIONAL, -- Need M
    needForGapsConfigNR-r16                  SetupRelease {NeedForGapsConfigNR-r16}
    OPTIONAL, -- Need M
    onDemandSIB-Request-r16                  SetupRelease { OnDemandSIB-Request-r16 }
    OPTIONAL, -- Need M
    dedicatedPosSysInfoDelivery-r16          OCTET STRING (CONTAINING
PosSystemInformation-r16-IEs)                   OPTIONAL, -- Need N
    sl-ConfigDedicatedNR-r16                 SetupRelease {SL-ConfigDedicatedNR-r16}
    OPTIONAL, -- Need M
    sl-ConfigDedicatedEUTRA-Info-r16            SetupRelease {SL-
ConfigDedicatedEUTRA-Info-r16}                     OPTIONAL, -- Need M
    targetCellSMTC-SCG-r16                   SSB-MTC
    OPTIONAL, -- Need S
    nonCriticalExtension                     SEQUENCE { }
    OPTIONAL
}
ReportConfigNR ::=                        SEQUENCE {
    reportType                               CHOICE {
        periodical                              PeriodicalReportConfig,
        eventTriggered                          EventTriggerConfig,
        ...,
        reportCGI                               ReportCGI,
        reportSFTD                              ReportSFTD-NR,
        condTriggerConfig-r16                   CondTriggerConfig-r16,
        cli-Periodical-r16                      CLI-PeriodicalReportConfig-r16,
        cli-EventTriggered-r16                  CLI-EventTriggerConfig-r16
```

TABLE 25-continued

```
  }
}
CondTriggerConfig-r16 ::=        SEQUENCE {
    condEventId                      CHOICE {
      condEventA3                      SEQUENCE {
        a3-Offset                        MeasTriggerQuantityOffset,
        hysteresis                       Hysteresis,
        timeToTrigger                    TimeToTrigger
      },
      condEventA5                      SEQUENCE {
        a5-Threshold1                    MeasTriggerQuantity,
        a5-Threshold2                    MeasTriggerQuantity,
        hysteresis                       Hysteresis,
        timeToTrigger                    TimeToTrigger
      },
      ...
    },
    rsType-r16                       NR-RS-Type,
    ...
}
```

The following conditions may be introduced in order to perform CHO in a satellite communication system. One of the following methods or a combination thereof may be applied.

Method B1: In a case where the distance to the satellite used for current access is greater than or equal to a certain value. The certain value (threshold) for comparison may be set through SIB or RRC signaling by the base station.

Method B2: In a case where the distance to the satellite used for current access increases by a certain rate or more. That is, in a case where the distance between the satellite and the UE is greater than or equal to a certain velocity.

The methods described above may be optionally applied according to the configuration of the base station. For example, the base station may set one of methods B1 and B2 through SIB or RRC, and the UE may use the method set by the base station.

Each of the base station, the satellite, and the UE for performing the embodiments of the disclosure may be a transmitting end or a receiving end. Each of the base station, the satellite, and the UE may include a receiver, a processor, and a transmitter. Each of the base station, the satellite, and the UE operates according to the embodiments of the disclosure.

Hereinafter, an internal structure of a UE, according to various embodiments of the disclosure, will be described with reference to FIG. 38.

Figure 38:
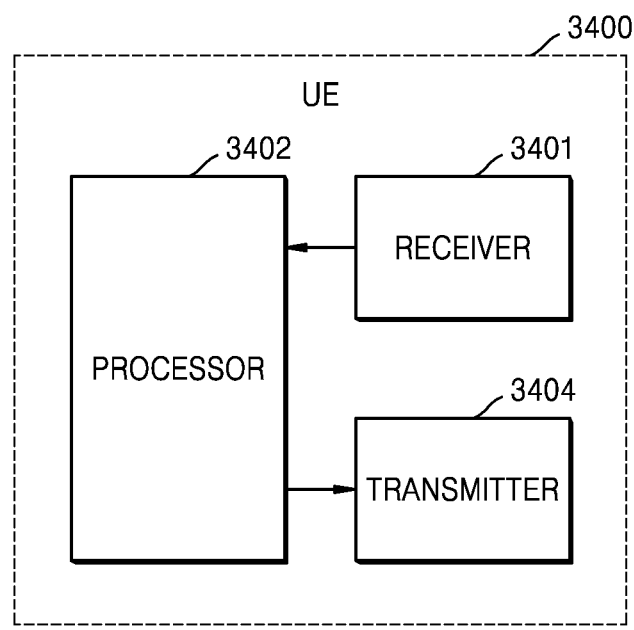
FIG. 38 is a block diagram schematically illustrating an internal structure of a terminal, according to an embodiment of the disclosure.

FIG. 38 is a block diagram schematically illustrating an internal structure of a UE 3400, according to an embodiment of the disclosure.

Referring to FIG. 38, the UE 3400 may include a receiver 3401, a transmitter 3404, and a processor 3402. The receiver 3401 and the transmitter 3404 may be collectively referred to as a transceiver in embodiments of the disclosure. The transceiver 1020 may transmit and receive signals to and from a base station. The signals may include control information and data. To this end, the transceiver may include an RF transmitter that performs up-conversion and amplification on a frequency of a signal to be transmitted, and an RF receiver that performs low-noise amplification on a received signal and performs down-conversion on a frequency of the received signal. Also, the transceiver may receive a signal through a radio channel, output the received signal to the processor 3402, and transmit an output signal of the processor 3402 through the radio channel.

The processor 3402 may control a series of processes to enable the UE to operate according to the above-described embodiments of the disclosure. As an example, the processor 3402 may control overall operations associated with the operation, performed by the UE, of selecting the satellite to be used for access, as described above in the first and second embodiments of the disclosure. For example, the receiver 3401 may receive a signal from a satellite or a terrestrial base station, and the processor 3402 may perform control to transmit a signal to the base station and receive a signal from the base station according to various embodiments of the disclosure. Also, the transmitter 3404 may transmit a determined signal at a determined timing.

Next, an internal structure of a satellite, according to various embodiments of the disclosure, will be described with reference to FIG. 39.

Figure 39:
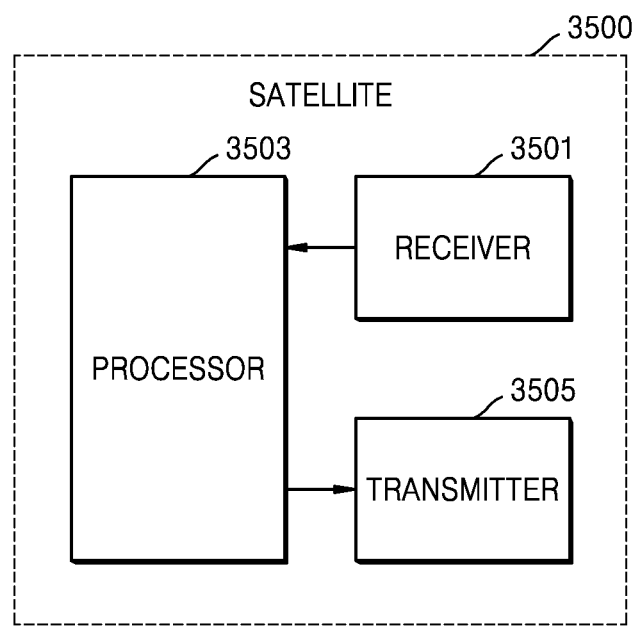
FIG. 39 is a block diagram schematically illustrating an internal structure of a satellite, according to an embodiment of the disclosure.

FIG. 39 is a block diagram schematically illustrating an internal structure of a satellite 3500, according to an embodiment of the disclosure.

Referring to FIG. 39, the satellite 3500 may include a receiver 3501, a transmitter 3505, and a processor 3503. For convenience of explanation, FIG. 39 illustrates a case where the receiver, the transmitter, and the processor are implemented in the singular form, such as the receiver 3501, the transmitter 3505, and the processor 3503, but the receiver, the transmitter, and the processor may be implemented in plurality. For example, a receiver and a transmitter configured to transmit and receive signals to and from the UE and a receiver and a transmitter configured to transmit and receive signals to and from the base station (and a receiver and a transmitter configured to transmit and receive signals with other satellites) may be provided.

The receiver 3501 and the transmitter 3505 may be collectively referred to as a transceiver in embodiments of the disclosure. The transceiver may transmit and receive signals to and from the UE and the base station. The signals may include control information and data. To this end, the transceiver may include an RF transmitter that performs up-conversion and amplification on a frequency of a signal to be transmitted, and an RF receiver that performs low-noise amplification on a received signal and performs down-conversion on a frequency of the received signal. Also, the transceiver may receive a signal through a radio channel, output the received signal to the processor 3503, and transmit an output signal of the processor 3503 through the radio channel.

The processor 3503 may include a compensator (pre-compensator) configured to compensate for a frequency offset or Doppler shift, and a tracker configured to track a location from a GPS. Also, the processor 3503 may include a frequency shift function of shifting the center frequency of the received signal. The processor 3503 may control a series of processes to enable the satellite, the base station, and the UE to operate according to various embodiments of the disclosure. As an example, the processor 3503 may control overall operations associated with the operation, performed by the UE, of selecting the satellite to be used for access, as described above in the first and second embodiments of the disclosure. For example, the receiver 3501 may determine a timing to receive a PRACH preamble from the UE and transmit TA information to the base station while transmitting an RAR to the UE again in response thereto. The transmitter 3505 may transmit the corresponding signals at the determined timing.

Next, an internal structure of a base station, according to various embodiments of the disclosure, will be described with reference to the FIG. 40.

Figure 40:
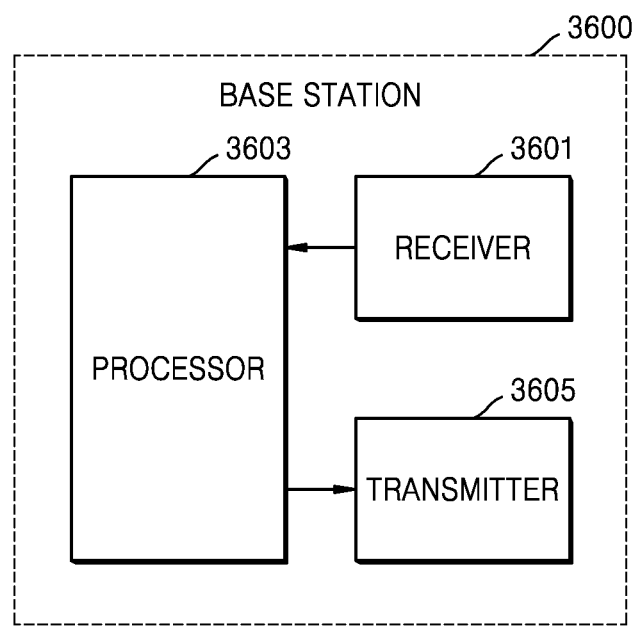
FIG. 40 is a block diagram schematically illustrating an internal structure of a base station, according to an embodiment of the disclosure.

FIG. 40 is a block diagram schematically illustrating an internal structure of a base station 3600, according to an embodiment of the disclosure.

Referring to FIG. 40, the base station 3600 may include a receiver 3601, a transmitter 3605, and a processor 3603. The base station 3600 may be a terrestrial base station or a portion of a satellite. The receiver 3601 and the transmitter 3605 may be collectively referred to as a transceiver in embodiments of the disclosure. The transceiver may transmit and receive signals to and from a UE. The signals may include control information and data. To this end, the transceiver may include an RF transmitter that performs up-conversion and amplification on a frequency of a signal to be transmitted, and an RF receiver that performs low-noise amplification on a received signal and performs down-conversion on a frequency of the received signal. Also, the transceiver may receive a signal through a radio channel, output the received signal to the processor 3603, and transmit an output signal of the processor 3603 through the radio channel.

The processor 3603 may control a series of processes to enable the base station 3600 to operate according to the-described embodiments of the disclosure. As an example, the processor 3603 may control overall operations associated with the operation, performed by the UE, of selecting the satellite to be used for access, as described above in the first and second embodiments of the disclosure. For example, the processor 3603 may transmit an RAR including TA information.

Next, a structure of a base station, according to embodiments of the disclosure, will be described with reference to the FIG. 41.

Figure 41:
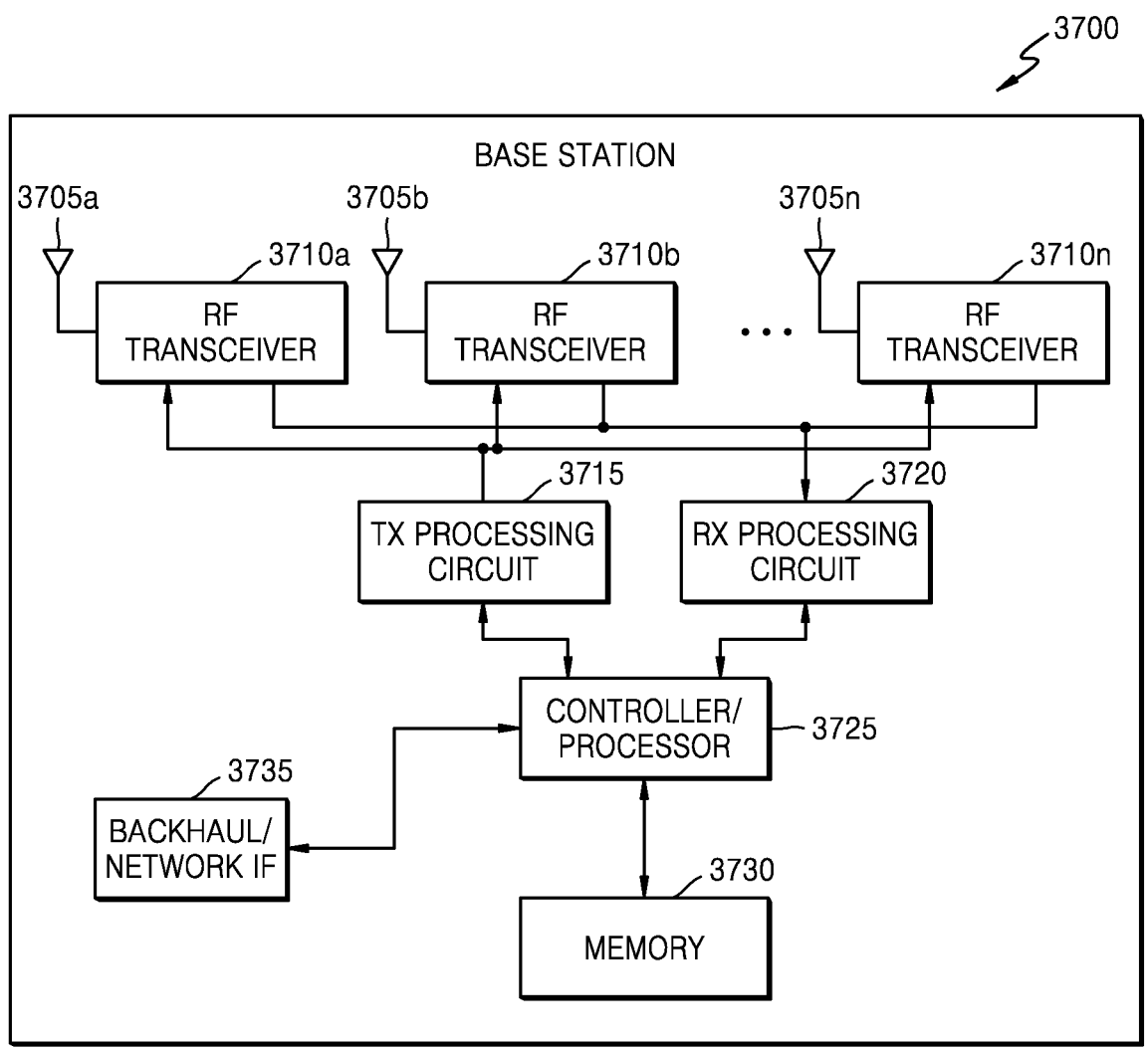
FIG. 41 is a block diagram schematically illustrating a structure of an example base station, according to an embodiment of the disclosure.

FIG. 41 is a block diagram schematically illustrating a structure of an example base station, according to an embodiment of the disclosure. An embodiment of a base station 3700 illustrated in FIG. 41 is for illustration only, and accordingly, FIG. 41 does not limit the scope of the disclosure to any particular implementation of the base station.

Referring to FIG. 41, the base station 3700 includes a plurality of antennas 3705*a* to 3705*n*, a plurality of RF transceivers 3710*a* to 3710*n*, a transmit (TX) processing circuit 3715, and a receive (RX) processing circuit 3720. The base station 3700 also includes a controller/processor 3725, a memory 3730, and a backhaul or network interface (IF) 3735.

The RF transceivers 3710*a* to 3710*n* receive, from the antennas 3705*a* to 3705*n*, input RF signals such as signals transmitted by UEs in a network. The RF transceivers 3710*a* to 3710*n* down-convert the input RF signals to generate intermediate frequency (IF) or baseband signals. The IF or baseband signals are transmitted to the RX processing circuit 3720, and the RX processing circuit 3720 filters, decodes, and/or digitizes the IF or baseband signals to generate processed baseband signals. The RX processing circuit 3720 transmit the processed baseband signals to the controller/processor 3725 for further processing.

The TX processing circuit 3715 receives analog or digital data (e.g., voice data, web data, email, or interactive video game data) from the controller/processor 3725. The TX processing circuit 3715 encodes, multiplexes, and/or digitizes the output baseband data to generate processed IF or baseband signals. The RF transceivers 3710*a* to 3710*n* receive the processed IF or baseband signals output from the TX processing circuit 3715, and up-convert the IF or baseband signals into RF signals to be transmitted through the antennas 3705*a* to 3705*n*.

The controller/processor 3725 may include one or more processors or other processing devices configured to control overall operations of the base station. As an example, the controller/processor 3725 may control the RF transceivers 3710*a* to 3710*n*, the RX processing circuit 3720, and the TX processing circuit 3715 to receive forward channel signals and transmit reverse channel signals according to well-known principles. The controller/processor 3725 may support additional functions, such as more advanced wireless communication functions.

In various embodiments of the disclosure, as an example, the controller/processor 3725 may control overall operations associated with the operation, performed by the UE, of selecting the satellite to be used for access, as described above in the first and second embodiments of the disclosure.

Also, the controller/processor 3725 may support beamforming or directional routing operations in which the signals output from the antennas 3705*a* to 3705*n* are weighted differently so as to efficiently steer the output signals in a desired direction. One of various other functions may be supported by the controller/processor 3725 of the base station 3700.

The controller/processor 3725 may also execute programs and other processes resident in the memory 3730, such as an operating system (OS). The controller/processor 3725 may move data into or out of the memory 3730 as required by a running process.

The controller/processor 3725 is also connected to the backhaul or network IF 3735. The backhaul or network IF 3735 allows the base station to communicate with other devices or systems through a backhaul connection or via a network. The backhaul or network IF 3735 may support communications through any suitable wired or wireless connection(s). As an example, when the base station is implemented as a portion of a cellular communication system (e.g., a cellular communication system supporting 5G, LTE, or LTE-A), the backhaul or network IF 3735 may allow the base station to communicate with other base stations through a wired or wireless backhaul connection. When the base station is implemented as an access point, the backhaul or network IF 3735 may allow the base station to communicate with a larger network (e.g., the Internet) through a wired or wireless local area network or a wired or wireless connection. The backhaul or network IF 3735 includes a suitable structure to support communications through a wired or wireless connection such as Ethernet or an RF transceiver.

The memory 3730 is connected to the controller/processor 3725. A portion of the memory 3730 may include random access memory (RAM), and another portion of the memory 3730 may include flash memory or read-only memory (ROM).

Although FIG. 41 illustrates an example of the base station, various modifications may be made to FIG. 41. As an example, the base station may include any number of components illustrated in FIG. 41. As a specific example, an access point may include a plurality of backhaul or network IFs 3735, and the controller/processor 3725 may support routing function of routing data between different network addresses. As another specific example, although FIG. 41 illustrates that the base station 3700 includes a single instance of the TX processing circuit 3715 and a single instance of the RX processing circuit 3720, the base station 3700 may include a plurality of instances (for example, one instance per RF transceiver). Also, in FIG. 41, various components may be combined, may be further divided, or may be omitted. Additional components may be added according to special needs.

Next, a structure of a UE, according to embodiments of the disclosure, will be described with reference to the FIG. 42.

Figure 42:
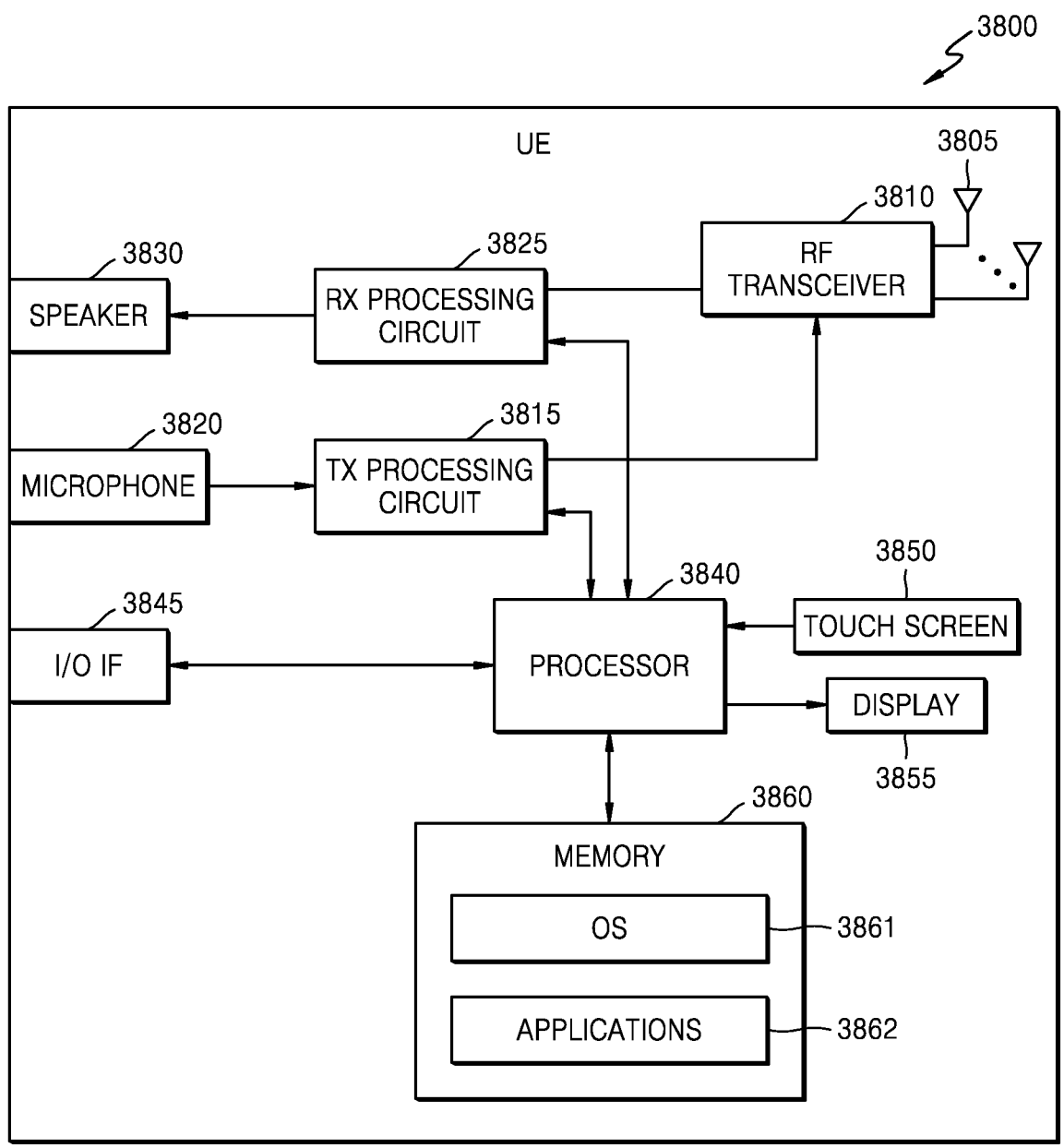
FIG. 42 is a block diagram schematically illustrating a structure of an example terminal, according to an embodiment of the disclosure.

FIG. 42 is a block diagram schematically illustrating a structure of an example UE, according to an embodiment of the disclosure.

An embodiment of a UE 3800 illustrated in FIG. 42 is for illustration only, and accordingly, FIG. 42 does not limit the scope of the disclosure to any particular implementation of the UE.

Referring to FIG. 42, the UE 3800 includes an antenna 3805, an RF transceiver 3810, a TX processing circuit 3815, a microphone 3820, and a RX processing circuit 3825. The UE 3800 also includes a speaker 3830, a processor 3840, an input/output (I/O) IF 3845, a touch screen 3850, a display 3855, and a memory 3860. The memory 3860 includes an OS 3861 and one or more applications 3862.

The RF transceiver 3810 receives, from the antenna 3805, an input RF signal transmitted by a base station of a network. The RF transceiver 3810 down-converts the input RF signal to generate an IF or baseband signal. The IF or baseband signal is transmitted to the RX processing circuit 3825, and the RX processing circuit 3825 filters, decodes, and/or digitizes the IF or baseband signal to generate a processed baseband signal. For further processing, the RX processing circuit 3825 transmits the processed baseband signal to the speaker 3830 (for voice data) or the processor 3840 (for web browsing data).

The TX processing circuit 3815 receives analog or digital voice data from the microphone 3820, or receives other output baseband data (e.g., web data, email, or interactive video game data) from the processor 3840. The TX processing circuit 3815 encodes, multiplexes, and/or digitizes the output baseband data to generate a processed IF or baseband signal. The RF transceiver 3810 receives the processed IF or baseband signal output from the TX processing circuit 3815, and up-convert the IF or baseband signal into an RF signal to be transmitted through the antenna 3805.

The processor 3840 may include one or more processors or other processing devices. In order to control overall operations of the UE, the processor 3840 may execute the OS 3861 stored in the memory 3860. As an example, the processor 3840 may control the RF transceiver 3810, the RX processing circuit 3825, and the TX processing circuit 3815 to receive downlink channel signals and transmit uplink channel signals according to well-known principles. In some embodiments of the disclosure, the processor 3840 includes at least one microprocessor or microcontroller.

In various embodiments of the disclosure, as an example, the processor 3840 may control overall operations associated with the operation, performed by the UE, of selecting the satellite to be used for access, as described above in the first and second embodiments of the disclosure.

The processor 3840 may also execute other processes and programs resident in the memory 3860. The processor 3840 may move data into or out of the memory 3860 as required by a running process. In some embodiments of the disclosure, the processor 3840 is configured to execute the applications 3862 based on the OS 3861 or in response to signals received from base stations or an operator. Also, the processor 3840 is connected to the I/O IF 3845, and the I/O IF 3845 provides the UE with the capability to connect to other devices such as laptop computers and handheld computers. The I/O IF 3845 is a communication path between these accessories and the processor 3840.

The processor 3840 is also connected to the touch screen 3850 and the display 3855. The operator of the UE may input data to the UE by using the touch screen 3850. The display 3855 may be a liquid crystal display, a light-emitting diode display, or other displays, which are capable of rendering text and/or at least limited graphics from web sites.

The memory 3860 is connected to the processor 3840. A portion of the memory 3860 may include RAM, and the remaining portion of the memory 3860 may include flash memory or other ROM.

Although FIG. 42 illustrates an example of the UE, various modifications may be made to FIG. 42. As an example, in FIG. 42, various components may be combined, may be further divided, or may be omitted. Additional components may be added according to special needs. Also, as a particular example, the processor 3840 may be divided into a plurality of processors, such as one or more central processing units (CPUs) and one or more graphics processing units (GPUs). Also, in FIG. 42, the UE is configured as a mobile phone or a smartphone, but the UE may be configured to operate as other types of mobile or stationary devices.

A method of a UE in a communication system, according to various embodiments of the disclosure includes: selecting at least one of a first scheme by which the UE determines timing-related information used to control an uplink timing or a second scheme by which a base station and/or a satellite determines the timing-related information, as a final scheme of determining the timing-related information; and determining the timing-related information based on the final scheme.

In various embodiments of the disclosure, the method further includes controlling the uplink timing based on the determined timing-related information.

In various embodiments of the disclosure, the process of selecting at least one of the first scheme or the second scheme as the final scheme includes: selecting the second scheme as the final scheme by default; and, when the base station and/or the satellite transmits first information relating to the second scheme in a state in which the second scheme is selected as the final scheme, changing the final scheme from the second scheme to the first scheme.

In various embodiments of the disclosure, the process of selecting at least one of the first scheme or the second scheme as the final scheme includes: receiving first information relating to a scheme to be selected by the UE as the final scheme from among the first scheme and the second scheme through the base station and/or the satellite; and selecting at least one of the first scheme or the second scheme as the final scheme based on the first information.

In various embodiments of the disclosure, the process of selecting at least one of the first scheme or the second scheme as the final scheme includes selecting at least one of the first scheme or the second scheme as the final scheme based on UE capability.

In various embodiments of the disclosure, the process of selecting at least one of the first scheme or the second scheme as the final scheme includes selecting at least one of the first scheme or the second scheme as the final scheme based on reliability of a signal transmitted from the satellite.

In various embodiments of the disclosure, the process of selecting at least one of the first scheme or the second scheme as the final scheme includes selecting at least one of the first scheme or the second scheme as the final scheme based on reliability of a signal transmitted from the satellite and whether the satellite is configured.

In various embodiments of the disclosure, the process of selecting at least one of the first scheme or the second scheme as the final scheme includes selecting at least one of the first scheme or the second scheme as the final scheme based on whether a serving cell is provided through a satellite network or whether a serving cell is provided through a terrestrial network.

In various embodiments of the disclosure, the method further includes reporting the determined timing-related information and the final scheme-related information to the base station and/or the satellite.

A method of a base station in a communication system, according to various embodiments of the disclosure, includes receiving, from a UE, information about a final scheme used by the UE to determine timing-related information used to control an uplink timing, and the timing-related information. The final scheme is selected as at least one of a first scheme by which the UE determines the timing-related information or a second scheme by which the base station and/or the satellite determines the timing-related information.

In various embodiments of the disclosure, the second scheme is selected as the final scheme by default, or the final scheme is selected based on UE capability or reliability of a signal transmitted from the satellite.

In a communication system according to various embodiments of the disclosure, the UE includes a processor and a transceiver. The processor is configured to: select at least one of a first scheme by which the UE determines timing-related information used to control an uplink timing or a second scheme by which the base station and/or the satellite determines the timing-related information, as a final scheme of determining the timing-related information; and determine the timing-related information based on the final scheme.

In various embodiments of the disclosure, the processor is further configured to control the uplink timing based on the determined timing-related information.

In various embodiments of the disclosure, the processor is configured to: select the second scheme as the final scheme by default; and, when the base station and/or the satellite transmits first information relating to the second scheme in a state in which the second scheme is selected as the final scheme, change the final scheme from the second scheme to the first scheme.

In various embodiments of the disclosure, the transceiver is configured to receive first information relating to a scheme to be selected by the UE as the final scheme from among the first scheme and the second scheme through the base station and/or the satellite, and the processor is configured to select at least one of the first scheme or the second scheme as the final scheme based on the first information.

In various embodiments of the disclosure, the processor is configured to select at least one of the first scheme or the second scheme as the final scheme based on UE capability.

In various embodiments of the disclosure, the processor is configured to select at least one of the first scheme or the second scheme as the final scheme based on reliability of a signal transmitted from the satellite.

In various embodiments of the disclosure, the processor is configured to select at least one of the first scheme or the second scheme as the final scheme based on reliability of a signal transmitted from the satellite and whether the satellite is configured.

In various embodiments of the disclosure, the processor is configured to select at least one of the first scheme or the second scheme as the final scheme as the final scheme based on whether a serving cell is provided through a satellite network or whether a serving cell is provided through a terrestrial network.

In various embodiments of the disclosure, the transceiver is further configured to report the determined timing-related information and the final scheme-related information to the base station and/or the satellite.

A base station in a communication system, according to various embodiments of the disclosure, includes a transceiver and a processor. The transceiver is configured to receive, from a UE, information about a final scheme used by the UE to determine timing-related information used to control an uplink timing, and the timing-related information. The final scheme is selected as at least one of a first scheme by which the UE determines the timing-related information or a second scheme by which the base station and/or the satellite determines the timing-related information.

In various embodiments of the disclosure, the second scheme is selected as the final scheme by default, or the final scheme is selected based on UE capability or reliability of a signal transmitted from the satellite.

On the other hand, the embodiments of the disclosure, which are described in this specification and drawings, are merely presented as specific examples so as disclosure easily explain the technical idea of the disclosure and help the understanding of the disclosure and are not intended disclosure limit the scope of the disclosure. That is, it will be obvious to those of ordinary skill in the art that other modifications based on the technical idea of the disclosure may be made. Also, the respective embodiments of the disclosure may be operated in combination with each other as necessary. For example, the first and second embodiments of the disclosure may be applied in combination. In addition, the embodiments of the disclosure may be implemented in other modifications based on the technical idea of the embodiments of the disclosure, such as LTE systems, 5G systems, and the like.

One aspect of the disclosure may provide a method and apparatus for controlling an uplink timing in a communication system.

Another aspect of the disclosure may provide a method and apparatus for controlling an uplink timing when a UE transmits and receives signals to and from a base station through a satellite in a communication system.

Another aspect of the disclosure may provide a method and apparatus for a UE to directly determine a TA value to control an uplink timing in a communication system supporting a non-terrestrial network (NTN).

Another aspect of the disclosure may provide a method and apparatus for a UE to control an uplink timing by indicating a TA value by a base station or a satellite in a communication system supporting an NTN.

Another aspect of the disclosure may provide a method and apparatus for controlling an uplink timing by adaptively selecting a scheme by which a UE controls a timing by directly determining a TA value in a communication system supporting an NTN and a scheme by which the UE controls an uplink timing by indicating a TA value by a base station or a satellite.

Another aspect of the disclosure may provide a method and apparatus for a UE to report information about a TA value or a method used for determining the TA value in a communication system supporting an NTN.

According to various embodiments of the disclosure, the UE may access the base station through the satellite, the base station may indicate a time offset to the UE, and the UE may compensate for the time offset, so that signals may be effectively transmitted and received between the base station and the UE.

One aspect of the disclosure may provide a method and apparatus for selecting a satellite to be used for access when a UE accesses a base station through a satellite in a communication system.

According to various embodiments of the disclosure, in a process of performing an initial access procedure or handover, the UE may select a satellite to be accessed based on the distance and time from the satellite, thereby reducing the latency of access and handover.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for a user equipment (UE) to perform handover in a wireless communication system, the method comprising:
receiving, from a base station (BS), a first message indicating at least one condition for starting handover, wherein the at least one condition includes a condition based on a distance between the UE and a satellite used for current access;
identifying whether the condition is satisfied based on a distance between the UE and the satellite used for current access; and
performing a procedure for handover based on the condition being satisfied.

2. The method of claim 1, further comprising:
receiving, from the BS, information about a location of the satellite used for the current access.

3. The method of claim 2, wherein the identifying of whether the condition is satisfed comprises:
determining the distance between the UE and the satellite used for current access based on the location of the satellite used for the current access; and
identifying whether the distance between the UE and the satellite used for current access is larger than a threshold.

4. The method of claim 3, wherein the threshold is obtained based on the first message received from the BS.

5. The method of claim 2, wherein the identifying of whether the condition is satisfied comprises:
determining an increase rate of the distance between the UE and the satellite used for current access based on the location of the satellite used for the current access; and
identifying whether the increase rate is larger than a threshold.

6. The method of claim 1, wherein the first message is received through RRC signaling.

7. The method of claim 1, wherein the performing of the procedure for handover comprises:
selecting a satellite to access for connecting a base station; and
connecting to the base station through the selected satellite.

8. The method of claim 7, wherein the selecting of the satellite to access comprises selecting a satellite closest to the UE as the satellite to access.

9. The method of claim 7, wherein the selecting of the satellite to access comprises selecting a satellite fastest approaching the UE as the satellite to access.

10. The method of claim 7, wherein the selecting of the satellite to access comprises selecting a satellite predicted to be closest to the UE after a certain time as the satellite to access.

11. The method of claim 7, wherein the selecting of the satellite to access comprises selecting a satellite with the least delay time to the BS as the satellite to access.

12. The method of claim 7, wherein the selecting of the satellite to access comprises selecting a satellite to access based on information about a satellite to be selected during handover, the information being received from the BS.

13. The method of claim 7, wherein the selecting of the satellite to access comprises:
receiving, from the BS, a message indicating a method for selecting a satellite to access; and
selecting a satellite to access according to the indicated method.

14. The method of claim 1, wherein the identifying of whether the condition is satisifed is based on a predicted and precalculated distance between the satellite and the UE after a specific time point.

15. A user equipment (UE) in a wireless communication system, the UE comprising:
a transceiver; and
at least one processor configured to:
receive, from a base station (BS), a first message indicating at least one condition for starting handover, wherein the at least one condition includes a condition based on a distance between the UE and a satellite used for current access,
identify whether the condition is satisfied based on the distance between the UE and the satellite used for current access, and
perform a procedure for handover based on the condition being satisifed.

16. The UE of claim 15, wherein the at least one processor is further configured to receive, from the BS, information about a location of the satellite used for the current access.

17. The UE of claim 15, wherein the at least one processor is configured to identify whether the distance between the UE and the satellite used for current access is larger than a threshold.

18. The UE of claim 17, wherein the threshold is obtained based on the first message received from the BS.

19. The UE of claim 15, wherein the first message is received through RRC signaling.

\* \* \* \* \*